(12) United States Patent
Munro

(10) Patent No.: US 7,202,941 B2
(45) Date of Patent: Apr. 10, 2007

(54) APPARATUS FOR HIGH ACCURACY DISTANCE AND VELOCITY MEASUREMENT AND METHODS THEREOF

(76) Inventor: James F. Munro, 4567 Ontario Center Rd., Walworth, NY (US) 14568

( * ) Notice: Subject to any disclaimer, the term of this patent is extended or adjusted under 35 U.S.C. 154(b) by 75 days.

(21) Appl. No.: 10/722,889

(22) Filed: Nov. 26, 2003

(65) Prior Publication Data

US 2004/0135992 A1     Jul. 15, 2004

Related U.S. Application Data

(60) Provisional application No. 60/429,520, filed on Nov. 26, 2002.

(51) Int. Cl.
   *G01C 3/08* (2006.01)
(52) U.S. Cl. ............ 356/5.01; 356/5.02; 356/5.1; 356/4.1
(58) Field of Classification Search ........... 356/5.01
   See application file for complete search history.

(56) References Cited

U.S. PATENT DOCUMENTS

| | | | |
|---|---|---|---|
| 2,234,329 A | 3/1941 | Wolff | |
| 2,433,667 A | 12/1947 | Hollingsworth | |
| 3,365,717 A | 1/1968 | Holscher | |
| 3,503,680 A | 3/1970 | Schenkerman | |
| 3,614,226 A | 10/1971 | Vergoz | |
| 3,630,616 A | 12/1971 | Everest | |
| 3,652,161 A | 3/1972 | Ross | |
| 3,854,133 A | 12/1974 | Cabion | |
| 3,936,824 A | 2/1976 | Aker | |
| 4,140,060 A | 2/1979 | Brenner | |
| 4,146,328 A | 3/1979 | Hullein | |
| 4,300,824 A | 11/1981 | Tokuda | |
| 4,636,068 A | 1/1987 | Niiho | |
| 4,654,584 A | 3/1987 | Gyles | |
| 4,657,382 A | 4/1987 | Busujima | |
| 4,699,508 A | 10/1987 | Bolkow | |
| 4,829,172 A | 5/1989 | Miller | |
| 4,880,307 A | 11/1989 | Endo | |
| 5,125,008 A | 6/1992 | Trawick | |
| 5,148,178 A | 9/1992 | Holzer | |
| 5,204,732 A | 4/1993 | Ohmamyuda | |
| 5,210,585 A | 5/1993 | Suzuki | |
| 5,260,670 A | 11/1993 | Ainsworth | |
| 5,294,970 A * | 3/1994 | Dornbusch et al. ...... | 356/141.1 |

(Continued)

OTHER PUBLICATIONS

Antoniou et al., "Digital Filters: Analysis and Design," *McGraw-Hill*, 151-154 (1979).

(Continued)

*Primary Examiner*—Thomas H. Tarcza
*Assistant Examiner*—Luke D. Ratcliffe
(74) *Attorney, Agent, or Firm*—Nixon Peabody LLP

(57) ABSTRACT

A system and method for measuring a parameter of a target in accordance with embodiments of the present invention includes transmitting at least one signal towards a target and receiving at least a portion of the transmitted signal back from the target. The measured parameter is one of distance velocity, or reflectivity. The transmitted signal is of the coherent burst waveform, and upon reception is processed with equivalent time sampling, AGC with minimal, if any, error, and a discrete Fourier transform.

51 Claims, 31 Drawing Sheets

U.S. PATENT DOCUMENTS

| | | | |
|---|---|---|---|
| 5,311,353 A | 5/1994 | Crawford | |
| 5,359,404 A | 10/1994 | Dunne | |
| 5,585,913 A | 12/1996 | Hariharan | |
| 5,589,928 A * | 12/1996 | Babbitt et al. | 356/4.1 |
| 5,612,883 A * | 3/1997 | Shaffer et al. | 701/300 |
| 5,619,317 A | 4/1997 | Oishi | |
| 5,652,651 A | 7/1997 | Dunne | |
| 5,745,437 A | 4/1998 | Wachter | |
| 5,751,406 A * | 5/1998 | Nakazawa et al. | 356/3.03 |
| 5,767,409 A * | 6/1998 | Yamaguchi | 73/602 |
| 5,870,180 A * | 2/1999 | Wangler | 356/4.01 |
| 5,880,822 A | 3/1999 | Kubo | |
| 5,889,490 A | 3/1999 | Wachter | |
| 5,898,490 A * | 4/1999 | Wachter et al. | 342/127 |
| 5,977,905 A | 11/1999 | LeChevalier | |
| 6,288,776 B1 * | 9/2001 | Cahill et al. | 356/5.1 |
| 6,450,267 B2 * | 9/2002 | Ohtomo et al. | 172/4.5 |

OTHER PUBLICATIONS

Born et al., "Principles of Optics," *Pergamon Press*, 291 (1983).

Bracewell et al., "The Fourier Transform and its Applications," *McGraw-Hill*, 356-362 (1978).

Woodbury et al., "Noninvasive Tank Gauging with Frequency-Modulated Laser Ranging," *Sensors*, 27-31 (1993).

Neter et al., "Applied Linear Regression Models," *Richard D. Irwin, Inc.*, Chapter 14, 466-485 (1983).

"Real-Time Versus Equivalent-Time Sampling," Tektronix, Inc., [Retrieved from the internet http://www.tek.com/Measurement/App_Notes/RTvET/ap-RTvET.html], 1-18 (2003).

"Code of Federal Regulations Title 21 (eye-safety requirements and regulations)," *U.S. Food and Drug Administration—Center for Devices and Radiological Health*, [Retrieved from the internet http://www.accessdata.fda.gov/scripts/cdrh/cfdocs/cfcfr/CFRSearch.cfm?FR=1040.10] Part 1040, 1-20 (2002).

Stone, "Index of Refraction of Air," *NIST's Engineering Metrology Toolbox WaveLength Calculator*, [Retrieved from the internet] http://patapsco.nist.gov/mel/div821/Wavelength/Documentation. asp, 1-17 (2001).

Payne et al., "Rangefinder With Fast Multiple Range Capability," *Review of Scientific Instruments*, 63:3311-3316 (1992).

* cited by examiner

| SNR | Std Dev (J=1) | P(E) < 1mm (J=1) | Std Dev (J=10) | P(E) < 1mm (J=10) | Std Dev (J=100) | P(E) < 1mm (J=100) | Std Dev (J=1000) | P(E) < 1mm (J=1000) | Std Dev (J=10,000) | P(E) < 1mm (J=10,000) |
|---|---|---|---|---|---|---|---|---|---|---|
| 10 | 49.0mm | 1.63% | 15.5mm | 5.14% | 4.90mm | 16.2% | 1.55mm | 48.1% | 0.490mm | 95.9% |
| 20 | 24.5mm | 3.26% | 7.75mm | 10.3% | 2.45mm | 31.7% | 0.775mm | 80.3% | 0.245mm | 99.995% |
| 50 | 9.80mm | 8.13% | 3.10mm | 25.3% | 0.980mm | 69.3% | 0.310mm | 99.8% | 0.098mm | >99.999% |
| 100 | 4.90mm | 16.2% | 1.55mm | 48.1% | 0.490mm | 95.9% | 0.155mm | >99.999% | 0.049mm | >99.999% |
| 200 | 2.45mm | 31.7% | 0.775mm | 80.3% | 0.245mm | 99.995% | 0.078mm | >99.999% | 0.0245mm | >99.999% |
| 500 | 0.980mm | 69.3% | 0.310mm | 99.8% | 0.098mm | >99.999% | 0.031mm | >99.999% | 0.0098mm | >99.999% |
| 1000 | 0.490mm | 95.9% | 0.155mm | >99.999% | 0.049mm | >99.999% | 0.0155mm | >99.999% | 0.0049mm | >99.999% |

FIG. 10

APPARATUS FOR HIGH ACCURACY DISTANCE AND VELOCITY MEASUREMENT AND METHODS THEREOF

The present invention claims the benefit of U.S. Provisional Patent Application Ser. No. 60/429,520, filed Nov. 26, 2002, which is hereby incorporated by reference in its entirety.

FIELD OF THE INVENTION

The present invention relates to an apparatus and method for measuring the distance to a remote target and also for measuring the velocity of the target relative to the apparatus.

BACKGROUND OF THE INVENTION

A profound need exists in many trades, disciplines, and industries for a truly accurate non-contact distance-measuring system. For example, the construction trades would benefit from a handheld device that emitted a visible laser beam that when aimed at a target, would measure the distance from the device to the target in less than one second, with accuracy better than one-sixteenth of an inch, independent of ambient temperature and other environmental constraints, and do so with readily available and inexpensive electronic components. To reach a wide audience and range of applicability, the distance measuring technology should be amenable to implementations incorporating infrared, microwave, millimeter-wave, or other electromagnetic wave carriers, as well as acoustic. Regardless of the carrier chosen, safety requirements, in particular eye safety, must be addressed.

There are four predominant electro-optical methods for active distance measurement: interferometric, triangulation, pulsed time-of-flight (TOF), and phase measuring. Interferometric methods result in accuracies of less than one micrometer over ranges of up to several millimeters. Triangulation techniques result in devices with accuracy in the micrometer range, but can only measure distances out to several inches. Devices based upon pulsed TOF and phase-measuring equipments, as well as equipments based upon a heretofore obscure technology called coherent burst, measure distances and velocities of similar magnitude to the present invention, but of significantly lesser accuracy and greater cost. Each of these are described below.

Pulsed TOF

In this method, a pulse of light, usually emitted from a laser, is transmitted to a target, and a portion of the light pulse reflected from the target is collected at the source location. The round trip transit time of the light pulse is measured, and the distance from the rangefinder to the target is $d=ct/2$, where d is the distance, c is the speed of light, t is the round trip transit time, and the factor of two accounts for the distance having to be traversed two times by the light pulse.

The pulsed TOF art is quite rich. An illustrative embodiment is depicted in FIG. 1, which is a block diagram simplification of a distance measuring circuitry 10. In this circuit, a start command input and a pulse generator 12 are coupled to the inputs to a transmitter 14. An output of the transmitter 14 is coupled to the input of a driver 16 and an input to the constant current source 24. An output of the driver 16 is coupled to the transmitting element 18. A receiving element 20 is positioned to receive light reflected back from target T. An output from the receiving element 20 is coupled to receiver 22 which has an output coupled to an input of the constant current source 24 and an input to a delay 26. An output of the delay 26 is coupled to an input to an analog-to-digital (A/D) converter 28 which has an output coupled to a digital processor. A capacitor 29 is coupled in parallel to a reset switch 30 and one terminal of the capacitor 29 and one terminal of the reset switch 30 is coupled to the constant current source 24 and the A/D converter 28.

In FIG. 1, the circuitry 10 has the pulse generator 12 that generates pulses that are gated by a start command at the AND gate 14 and passed to a laser driver 16 that is used to drive an emitter 18 of electromagnetic energy radiation for the duration of each of the pulses generated by the pulse generator 12. These short pulses of electromagnetic energy are directed to the remote target T, and a portion of the electromagnetic energy is reflected from the target T and received by a receiving element 20. Nominally the transmitting element 18 and the receiving element 20 are substantially collocated. The receiver 22 processes and amplifies the received pulse signal, and forwards the pulse signal onto the constant current source circuit 24.

The constant current source 24 also has as an input the transmit pulse signal output by the AND gate 14. The constant current source 24 creates an output signal that is a constant current, the start of the constant current beginning with the rising edge of the output of the AND gate 14, and ends with the rising edge of the pulse output by the receiver 22. Therefore, the duration of the constant current signal is proportional to the round trip travel time of the pulse energy transmitted to the remote target T by the transmitting element 18 and received by the receiving element 20, after subtracting off the electronic delays of the associated circuitry.

Next, the output of the constant current source 24 is fed to an integrating capacitor 29 which accumulates a charge and produces a voltage ramp at its output terminal. With this charging method, the capacitor 29 obtains a voltage at the end of the constant current signal output by the constant current source 24 that is proportional to the distance from the transmitting element 18, to the target T, and back to the receiving element 20. The voltage on capacitor 29 is directed an analog to digital (A/D) converter for downstream computer processing. The output of the receiver 22 is routed through a delay circuit 26, whose output in turn is routed to the start conversion input of the A/D converter 28. This signal causes an A/D conversion to commence well after the voltage on capacitor 29 has plateaued.

There are variations on the basic pulse TOF architecture. For example, one type of architecture teaches how the capacitor voltage can be downward sloping as the capacitor is discharged with a constant current source between the start and stop pulses. Instead of generating a voltage ramp, another type of architecture describes how a high-speed digital counter can be continuously incremented with a high frequency clocking signal after the start pulse occurs, and then terminates when the stop pulse occurs. This eliminates the need for an A/D converter as the output of the counter is already in a digital format. However, this counter approach has quantization errors, which is remedied by random dithering or interpolation methods. The counter or pulse TOF methods can be used for coarse range estimates, while phase measuring TOF, discussed below, is used for more precise range estimates. Alternately, a series of N pulses could be transmitted, in which a subsequent pulse is transmitted after the previous one is received, and the total time for these N pulses to be sent and received is measured. Thereafter, the time is divided by N to obtain a more precise estimate of a round trip transit time. A pulse train of a predetermined timing sequence could be used. An electronic correlation function is used to compare the delayed transmit sequence to the received sequence, and when correlation is found the delay has the round trip transit time of the pulse sequence.

All of these pulsed TOF methods are conceptually simple, although their implementation is usually complex and expensive. Specifically, to obtain an accurate distance estimate, the pulses must either be extremely short, or as is usually the case, must have fast low-high and high-low transitions. To obtain accuracies on the order of 0.1", electronic bandwidths on the order of 1.0 gigahertz, or greater, are required in the transmission electronics, including the laser, as well as in the receive electronics, including the photodiode. Such broadband electronic components are expensive, and drive up the overall cost of the system. Furthermore, the distance signal processing is a two-stage affair. First, the distance information is encoded into a capacitor's voltage, and then secondly this voltage is converted into digital format for subsequent processing. A circuit that offers a single stage of processing is likely to be simpler, lower cost, and less error prone than a multi-stage system.

It is also difficult for pulse-TOF systems to measure velocity. One method is to transmit a series of pulses, and then analyze the Doppler shift of the returned pulses. A second way is to compute the velocity from the time rate of change of the estimated distance. Both methods suffer from accuracy problems, and are relatively expensive to implement because they require the use of broadband electronics to ensure the fidelity of the pulses.

However, pulsed TOF systems do offer one important advantage that is retained in the present invention: owing to their low duty cycle emission waveform they can be made eye-safe with visible light emissions, yet can also measure distances well beyond ten meters.

Phase Measuring

In phase measuring rangefinding, a periodic modulation signal, usually a sinusoid, is transmitted to the target, and an echo is received and amplified. The phase of the received signal will be delayed when compared to the phase of the transmitted signal because of the round trip transit time of the signal. The phase difference between the two signals is directly proportional to the distance to the target, according to the expression $d=\phi\lambda/4\pi$, where d is the distance from the rangefinder to the target, and $\lambda$ is the wavelength of the modulating sinusoid (e.g., is 15 meters for a 20 MHz signal), and $\phi$ is the phase difference in radians. A range ambiguity arises every $\lambda/2$ meters of distance, in which the phase of the modulating signal is identical every $N\lambda/2$ meters. This is one of the major drawbacks of phase measuring methods.

Another drawback is that since the modulation occurs in a continuous-wave fashion, the average power of the carrier must be high in order to be able to obtain a significant received signal for large target distances. High average carrier powers in the visible spectrum are not eye-safe. Yet another drawback concerns undesirable phase delay changes of the electronic circuitry with changes in ambient environmental conditions, especially temperature. Also, gain changes in AGC (Automatic-gain-control) circuitry will cause changes in phase as well, and these changes cannot be reliably calibrated and subtracted out with commonly used on-board reference methods.

For all these disadvantages, phase measuring rangefinders offer better intrinsic accuracy and lower cost than their pulsed TOF counterparts, arising primarily from their narrowband electronics.

There are two primary technologies used in phase measuring rangefinders: homodyne and heterodyne. Each of these are discussed below:

Heterodyne

A heterodyne demodulator is one in which a high frequency signal is mixed with a signal of a different frequency, and the resulting signal has components of the sum and the difference of the two frequencies. Typically the frequency difference between the two mixed signals is a constant known frequency. The resulting higher frequency, corresponding to the sum of the frequencies is usually ignored and removed through filtering. The lower frequency signal is amplified in a bandpass amplifier resulting in a signal that has a good signal to noise ratio owing to the fact that all out of band noise is filtered by the bandpass amplifier. This amplified signal is mixed yet again with another signal, this time having the same frequency, and low pass filtered, resulting in a low-noise DC component whose amplitude is proportional to the phase of the received signal. Alternately, if the target is moving, the DC signal will not be present, but instead a low frequency AC signal will be present, and the frequency of this signal is proportional to the velocity of the target because of the Doppler shift.

A functional block diagram of a heterodyning phase-measuring rangefinder 40 is shown in FIG. 2. A clock 42 is coupled to the inputs of a frequency synthesizer 44, a frequency synthesizer 56, and a divider 60. An output of the frequency synthesizer 44 is coupled to the input of the laser driver 46. An output of the frequency synthesizer 56 is coupled to the input of the mixer 54 and an output of the divider circuit 60 is coupled to the input of the mixer 62. The output of the laser driver 46 is coupled to the input of a laser diode 48. A photodiode 50 is positioned to receive light reflected from the target T. An output of the photodiode 50 is coupled to an input of a preamplifier 52 which has an output coupled to the mixer 54. An amplifier 58 is coupled between the mixer 54 and the mixer 62 and an output of mixer 62 is coupled to an input of an A/D converter 64 which has an output coupled to a digital processor.

In FIG. 2, a 3.64 MHz Clock 42 provides a reference frequency. A first frequency synthesizer 44 up converts this 3.64 MHz clock frequency to a frequency 455 kHz above 93 MHz. This sinusoidal frequency is then forwarded to a laser diode driver 46 which creates an electronic drive signal having the correct power and voltage characteristics required by the laser diode 48 so that the laser diode 48 emits an optical signal, the modulated light out. This modulated light out is directed to the remote target T by the operator, and a portion of the reflected modulated light is reflected back to the device by the remote target T. The phase of the reflected modulated light at the receiving photodiode 50 is different than the phase of the transmitted modulated light at the laser diode 48 owing to the round-trip propagation time delay of the optical signal. Further, the magnitude of the phase change is directly proportional to the distance between the remote target T and the rangefinder 40, provided the laser diode 48 and the photodiode 50 are substantially collocated. The photodiode 50 converts the received reflected modulated light optical signal into an electrical signal, and this weak electronic signal is amplified by a preamplifier 52.

The signal output by the preamp 52 is input to a first mixer 54 which has as a second input a 93.0 MHz signal generated by a second frequency synthesizer 56. The result of the mixing operation within the first mixer 54 is a 0.455 MHz signal. This frequency is nominally constant and is low enough to be economically filtered in the intermediate-frequency (IF) amplifier stage. That is, the IF amplifier 58 will amplify the 0.455 MHz signal and filters out all other signals not at the 0.455 MHz passband and thereby improves the signal to noise ratio of the 0.455 MHz signal at the output of amplifier 58. This filtered signal from amplifier 58 is used as an input to a second mixer 62 that has as a second input a 0.455 MHz signal generated by a divider circuit 60. The divider circuit 60 simply divides the 3.64 MHz signal generated by 3.64 MHz clock by a factor of eight to generate the 0.455 MHz signal. Since the two signals being mixed together within the second mixer 62 have the same frequency, the output signal will be a DC voltage whose amplitude is proportional to the cosine of the phase difference between the two signals input to the second mixer 62, which in turn means that the target distance is also proportional to the cosine of the DC signal. This DC signal is then input to an A/D converter 64 which converts the DC signal to a digital format for further digital processing.

While conceptually simple, this analog method of distance measurement is intrinsically incapable of measuring phase to the picosecond level needed for sub-millimeter accuracy. This arises primarily from non-linearities within the mixers and amplifiers, and from drift in gain and electronic signal delay times due to changes in ambient environmental conditions. Furthermore, since the DC signal is proportional to the cosine of the phase difference, there will be certain phase differences that result in imprecise phase estimation owing to the slow rate of change of the cosine function, most noticeably at $n\pi$ phase differences, where n is an integer. When the transmitted modulated light has a modulation frequency of 93.455 MHz, the wavelength of the modulation is $\lambda=3\times10^8/93,455,000=3.210$ meters, and the distances of poor precision are centered around 3.210n/4=0.8025n meters. In other words, whenever the distance to the target is approximately 802.5n millimeters, the precision of the distance measurement is questionable.

There is yet another problem with the signal output from the mixer. Not only is it proportional to the cosine of the phase difference, but it is also a function of the amplitude of each of the signals being mixed together. If one of the signals amplitude unexpectedly changes due to noise or fluctuations in the return signal, then the interpretation of the mixer's output can lead to serious distance estimate inaccuracies.

Homodyne

A similar demodulation method utilizes homodyne electronic processing, in which the received signal is mixed with a signal having the same frequency. This is different than the heterodyne system described above where the received signal is first mixed with a signal having a different frequency. The result of homodyne mixing is that the first mixing stage results directly in the phase or low frequency AC signal for distance or velocity estimation. The second heterodyne mixing is eliminated, meaning less electronic components are utilized which translates into a cost savings, but typically the SNR is somewhat poorer than heterodyne-based distance and velocity measurement.

The homodyne phase measuring rangefinder has the same drawbacks of the heterodyning rangefinder, especially as related to nonlinearities within the electronic functions, particularly the phase splitter and the mixers, as well as the imprecision at distances proportional to $n\pi$ phase difference, and gain and delay drifts with changes in environmental conditions. Their mixer's outputs are also a function of the input signal amplitudes, and suffer from the same problems as discussed previously.

Both the homodyne and heterodyne methods suffer from the aforementioned range ambiguity problem, which can be remedied by utilizing a second, lower, operating frequency whose first ambiguity is beyond the operating range of the device. Lastly, since the laser is amplitude modulated for a relatively long period of time, and since the average laser output power must be limited to 1 mW for eye-safety considerations, the maximum range for visible laser emissions is therefore limited as well.

Other phase measuring include a phase measuring distance measuring system that uses light as the modulation carrier. A homodyne mixer can be used for electronic signal processing, while still incorporating an optical modulation carrier. Multiple modulation frequencies can be used to resolve the ambiguity problem and to improve the accuracy of the distance estimate. Heterodyne electronic signal processing methods can also be used in conjunction with two or more modulation frequencies.

Coherent Burst

Coherent burst technology is a significant improvement over the phase measuring and pulse-TOF distance measuring methods. Specifically, the coherent burst modulation waveform allows the maximum range to be increased without compromising eye safety, and since the modulation is bandlimited the resulting low cost circuitry and measurement accuracy is similar to that of the phase measuring methods. Coherent burst technology accomplishes this by combining the best of the phase-measuring and pulse-TOF methods, wherein a short series of bursts of amplitude modulated light is transmitted to the target. FIG. 4 illustrates the envelope of the coherent burst emission waveform, and FIG. 5 presents a magnified, and abbreviated, diagram of the coherent burst emission. The short bursts have pulse-like properties, in that they have a starting edge and a trailing edge, and a burst transmission can be used to start a counter or voltage ramp, and its reception from the target can be used to stop the counter or the voltage ramp, as described in the pulse TOF prior art discussion, above. This method can be used to provide a coarse estimate of the range, and therefore resolve the range ambiguity problem associated with phase measuring methods.

The coherent burst, being a short duration burst of amplitude modulated light, will also work with phase measuring methods, provided that the electronics comprising these phase measuring methods can respond and settle within the duration of a burst. Increasing the amplitude modulation frequency of a burst allows for increased measurement accuracy. Furthermore, by spacing the coherent bursts in time, high burst powers can be realized while maintaining an eye-safe average power, and long distances can be measured.

An illustrative functional diagram for a conventional embodiment of the coherent burst distance measuring method is presented in FIG. 3. A pulse generator 72 and a master oscillator 74 are coupled to inputs of an AND gate 76. An output of the AND gate is coupled to an input to a laser driver 78 which has an output coupled to an input to a laser diode 80. An output of a photo diode 82 is coupled to an input to a preamplifier 84. An output of preamplifier 84 is coupled to an input of bandpass filter and amplifier 86. An output of bandpass filter and amplifier 86 is coupled to inputs of multipliers 90 and 92. A phase shifter 88 has an input coupled to an output of master oscillator 74 and has outputs coupled to multipliers 90 and 92. Outputs of multipliers 90 and 92 and an output of pulse generator 72 are coupled to inputs of processor circuit 94.

In FIG. 3, a master oscillator 74 oscillates at the burst frequency, and whose signal is gated by an AND gate 76 by the pulses output of a pulse generator. The pulses correspond to the bursts, and the signal generated by the master oscillator 74 corresponds to the amplitude modulation within the burst. The composite burst signal is then input to a laser driver 78 which creates electronic signals suitable for driving a laser diode 80 in accordance with burst signal. The laser light is then directed onto a target T by the operator, whereupon a portion of it is reflected back by the target T to the photodiode 82 which is substantially collocated with, but offset from, the laser diode 80. The photodiode 82 converts the received optical signal into an electronic signal, which is then amplified by a preamplifier 84. The output of the preamplifier 84 is then directed to a bandlimited filter-amplifier 86 which amplifies the signal further, but also rejects all out of band noise thereby improving the signal to noise ratio of the signal. This signal is then fed to two multipliers 90 and 92 for subsequent processing. The master oscillator 74 has a second output, synchronized with the first output, that is directed to a phase shifter 88. The phase shifter 88 then has as an output two signals that are in sync with the input signal, but whose outputs have a 90° phase difference between them. One of these output signals is then fed to the second input of the In-Phase multiplier 92 and the other output signal is fed to the second input of the Quadrature multiplier 90. As with the second mixer of FIG. 2, the output of both multipliers 90 and 92 are DC voltages, assuming a stationary target, because the input frequencies are the same for both. Multipliers 90 and 92 together constitute a quadrature phase detector and their outputs are directed to a processing circuit 94 which converts the first and second quadrature signals into a phase estimate. The pulse signal is also input to the processor circuit 94 for ambiguity resolution according to the pulse-TOF methods described earlier.

Doppler shift of a coherent burst waveform can be used for target velocity estimation. More recently, a homodyne coherent burst system with quadrature electronic signal processing can be used for velocity estimation. Digital signal processing methods can also use coherent burst velocity estimation based upon the Doppler shift.

While the coherent burst method seems to intrinsically solve many of the problems of eye-safe distance measurement, some problems still remain. For example, the non-linearities found in phase-measuring amplifiers and mixers still remain. Secondly, the multiplexer circuit which generates the two signals having 90° phase differences must generate these signals with exactly 90° phase differences between them. Any errors in these differences will cause an uncalibratable distance error. Thirdly, the output of the mixers are still a function of the amplitude of the input signals, and, lastly, uncalibrated phase delays are introduced when Automatic-gain-control methods are employed. This topic is addressed in detail, below. In sum, these errors make it very difficult to economically achieve accuracy better than 0.1" in a compact or hand-held distance measuring unit.

AGC Considerations

Unlike pulsed TOF ranging technology where the electronic signals are nominally saturating, gain controlling means are required for phase measurement ranging to prevent the electronic signals from saturating, yet keep the signals large enough to be usable. For phase measurement ranging, AGC is particularly problematic because when the gain of an electronic amplification circuit is changed, an RC time constant or semiconductor junction delay time within that circuit is also usually changed, meaning the delay of the signal through that circuit is also changed. When dealing with energy velocities at the speed of light, phase changes below 1 ps are required to keep the system measurement accuracy better than 1 mm. Further, since it is unknown what the correct AGC gain should be a priori it is extremely difficult to accurately calibrate this AGC-induced variable delay and subtract it from the distance measurement. This is a subtle yet important defect in the prior art.

Several automatic-gain-controlling means exist. For example, an electronic means to compress high amplitude electronic signals, but yet not compress low amplitude signals which arise from distant or non-reflective targets have been described. Electronic circuits of this type commonly introduce phase variations as their electronic gain changes, and these variations will not be referenced out by a reference optical path because the referencing will typically be made at a gain setting different than that used for the actual distance measurement. A variable gain amplifier can also be used as an AGC, but this type of circuit will also generally introduce more than one ps of varying signal delay.

An alternate way to maintain a constant amplitude electronic signal is to control the power output of the emitting device, such as with a laser diode. The power of the electromagnetic wave carrier can also be controlled in non-laser devices to accomplish the same end. But these methods just move the phase error problem from the receive signal path to the transmitter signal path. When the power levels of the emissive devices are changed, their operating characteristics change, and they will generally introduce several picoseconds of signal delay change. Furthermore, these errors will not be calibrated because the calibration will occur at one level of emission, and the actual distance measurement operation will occur at a different level having a different phase delay. Also, if the transmitted signal is attenuated too much, the emission will not be visible on the target and pointing accuracy will suffer.

Two emissive devices, one emitting a high power for longer distances or less reflective targets, and the other emitting a lower power, can also reduce the need for gain control elsewhere in the system. But this has the obvious disadvantage of increased cost and size, and reduced reliability.

Yet another means to circumvent the AGC problem is to use a resistor ladder in the receive path in which the electronic signal, at several different amplitudes, is presented to an electronic switch. The appropriate signal level is then selected for further processing. However, this approach also tends to be complex and costly.

A variant of this method involves one or more receive amplification paths which are implemented in parallel, and the electronic signal created by the path with the optimal fixed gain is selected for further processing. This method also suffers from increased complexity and cost.

Two photodiodes, a near PD and a far PD, can be used with their downstream amplification means to reduce the amount of variable gain control needed. But doubling the number of receive paths obviously comes with increased cost and complexity, and reduced reliability. Most of these methods also suffer from serious electronic signal delay calibration problems.

There are also ways to implement an optical AGC, which will not introduce unwanted changes in phase with signal amplitude or changes in gain. It is well known to those skilled in the art that light from a distant source will be brought to a focus at the focal plane of a lens. As the source is brought closer to the lens, the focus spot blurs and becomes larger in size at the focal plane. If a light detector of finite size is placed at the focal point, all of the light reflecting from a distant target and collected by the lens will be incident upon it. However, as the target is brought closer to the lens, the blur spot overfills the detector, and substantially less light, as a percentage of that collected by the lens, is incident upon the light detector. Indeed, in a compact optical arrangement, optical AGC can provide three orders of magnitude of gain control. This is a passive open-loop mechanism, requiring no control components, and is therefore highly desirable for its simplicity, low cost, and reliability.

An alternate optical AGC provides a means to reduce the diameter, and hence the power, of the laser beam by mechanically placing different apertures in front of the laser. This method does successfully implement an optical AGC function, but suffers from the common problems of increased cost and complexity.

Lastly, partial blocking of the collection lens can work as an optical AGC, but it too has increased complexity, reduced reliability, and should not be relied upon in and of itself because of its limited dynamic range.

SUMMARY OF THE INVENTION

A method for measuring a parameter of a target in accordance with embodiments of the present invention includes transmitting at least one signal towards a target. At least one of a return signal sent in response to a detection of the transmitted signal at the target and at least a portion of the transmitted signal back from the target is received and at least one portion of the received signal is sampled. A discrete Fourier transform is used to determine at least one of an amplitude of the sampled signal and a phase difference between the transmitted signal and the sampled signal. A measured parameter is determined based on at least one of the amplitude of the sampled signal and the phase difference between the transmitted signal and the sampled signal.

A system for measuring a parameter of a target in accordance with embodiments of the present invention includes a transmission system, a receiving system, a sampling system and a parameter processing system. The transmission system transmits at least one signal towards a target and the receiving system receives at least one of a return signal sent in response to a detection of the transmitted signal at the target and at least a portion of the transmitted signal back from the target. The sampling system samples at least one portion of the received signal. The parameter processing system uses a discrete Fourier transform to determine at least one of an amplitude of the sampled signal and a phase difference between the transmitted signal and the sampled signal and determines a measured parameter based on at least one of the amplitude of the sampled signal and the phase difference between the transmitted signal and the sampled signal.

A method for measuring a parameter of a target in accordance with embodiments of the present invention includes transmitting at least one signal towards a target. At least one of a return signal sent in response to a detection of the transmitted signal at the target and at least a portion of the transmitted signal back from the target is received and at least one portion of the received signal is sampled. A curve fitting algorithm is used to determine at least one of an amplitude of the sampled signal and a phase difference between the transmitted signal and the sampled signal. A measured parameter is determined based on at least one of the amplitude of the sampled signal and the phase difference between the transmitted signal and the sampled signal.

A system for measuring a parameter of a target in accordance with embodiments of the present invention includes a transmission system, a receiving system, a sampling system and a parameter processing system. The transmission system transmits at least one signal towards a target and the receiving system receives at least one of a return signal sent in response to a detection of the transmitted signal at the target and at least a portion of the transmitted signal back from the target. The sampling system samples at least one portion of the received signal. The parameter processing system uses a curve fitting algorithm to determine at least one of an amplitude of the sampled signal and a phase difference between the transmitted signal and the sampled signal and determines a measured parameter based on at least one of the amplitude of the sampled signal and the phase difference between the transmitted signal and the sampled signal.

A method for measuring a parameter of a target in accordance with embodiments of the present invention includes transmitting at least one signal towards a target and receiving at least one of a return signal sent in response to a detection of the transmitted signal at the target and at least a portion of the transmitted signal back from the target. At least one portion of the received signal is sampled and a amplitude of the sampled signal is adjusted. At least one of an amplitude of the sampled signal and a phase difference between the transmitted signal and the sampled signal is determined and a measured parameter is determined based on at least one of the amplitude of the sampled signal and the phase difference between the transmitted signal and the sampled signal.

A system for measuring a parameter of a target in accordance with embodiments of the present invention includes a transmission system, a receiving system, a sampling system, a gain control system, and a parameter processing system. The transmission system transmits at least one signal towards a target and the receiving system receives at least one of a return signal sent in response to a detection of the transmitted signal at the target and at least a portion of the transmitted signal back from the target. The sampling system samples at least one portion of the received signal and the gain control system adjusts an amplitude of the sampled signal. The parameter processing system determines at least one of an amplitude of the sampled signal and a phase difference between the transmitted signal and the sampled, an amplitude adjusted signal and determines a measured parameter based on at least one of the amplitude of the sampled signal and the phase difference between the transmitted signal and the sampled, amplitude adjusted signal.

A method for measuring a parameter of a target in accordance with embodiments of the present invention includes transmitting at least one signal towards a target, receiving at least one of a return signal sent in response to a detection of the transmitted signal at the target and at least a portion of the transmitted signal back from the target, and equivalent time sampling of at least one portion of the received signal. The measured parameter is based on at least one of an amplitude of the sampled signal and a phase difference between the transmitted signal and the sampled signal.

A system for measuring a parameter of a target in accordance with embodiments of the present invention includes a transmission system, a receiving system, a sampling system, a gain control system, and a parameter processing system.

The transmission system transmits at least one signal towards a target, the receiving system receives at least one of a return signal sent in response to a detection of the transmitted signal at the target and at least a portion of the transmitted signal back from the target, and the equivalent time sampling system samples at least one portion of the received signal. The parameter processing system determines a measured parameter based on at least one of an amplitude of the sampled signal and a phase difference between the transmitted signal and the sampled signal.

The present invention is an improved method and apparatus that utilizes the coherent burst waveform to measure distance and velocity accurately and economically. It does this by replacing much of the analog signal processing found in the prior art with digital methods and incorporates pre-existing equivalent time sampling technology to facilitate an economical analog to digital conversion process. Furthermore, the electronic AGC function has been moved from that part of the analog signal processing train that contributes to uncalibrated phase changes to that part of the signal processing train where it cannot contribute to phase changes and errors.

In the present invention, a central timing or clocking function generates the coherent burst waveform, and sends this signal to a laser diode driver. This driver low pass filters the signal and reformats the signal by adding appropriate voltage offsets and amplification so that the laser diode can be suitably driven to reproduce the electronic coherent burst signal on an amplitude modulated electromagnetic energy. This modulated light is then focused by a lens and directed onto the target by the operator.

A portion of the electromagnetic energy is reflected by the target back to the device, where it is collected by a lens and focused through a bandpass filter, that lets only the carrier energy through, onto a detector. The detector then converts the received coherent burst modulated electromagnetic energy, which is received some time after it was transmitted, into an electronic signal. This electronic signal is then amplified in a tuned narrowband filter amplifier, and applied to the input of the equivalent time sampler. This sampler periodically samples the burst portion of the waveform using timing signals originating at the central timing generator, and subsequently holds the sampled voltage until it can be processed. The held sampled signal is applied to an AGC function, which amplifies the signal based upon the average amplitude of the signal, before it is presented to the A/D converter. Furthermore, the reference voltage of the A/D converter can also be controlled such that the A/D performs as a second stage of AGC. The A/D converter then converts the analog voltage into a digital representation of that signal, whereupon it is collected and stored by a digital processor for subsequent processing.

After several samples have been taken over several portions of the burst, the digital processor will execute a discrete Fourier transform algorithm and extract the phase information of the received coherent burst signal. The phase estimates are stored in memory, and averaged together with other estimates computed from subsequent and prior bursts to improve the accuracy of the final distance estimate.

This system will normally be used in conjunction with an internal calibration path of known length, over which a coherent burst waveform is transmitted, and whose phase is measured to establish the zero phase reference datum.

This method and apparatus retains all of the benefits of the coherent burst technology discussed in the background, but improves upon the measurement accuracy, the cost of the device, and the physical volume that the device occupies.

Accordingly, the present invention provides a compact, eye-safe, low-cost, distance measuring system having 1 mm accuracy or better and also a compact, low-cost, eyesafe, velocity measuring system.

BRIEF DESCRIPTION OF THE DRAWINGS

FIG. 10 presents a table of measurement standard deviations as a function of SNR and averaging, table entries being generated with computer simulations;

DETAILED DESCRIPTION

Figure 6:
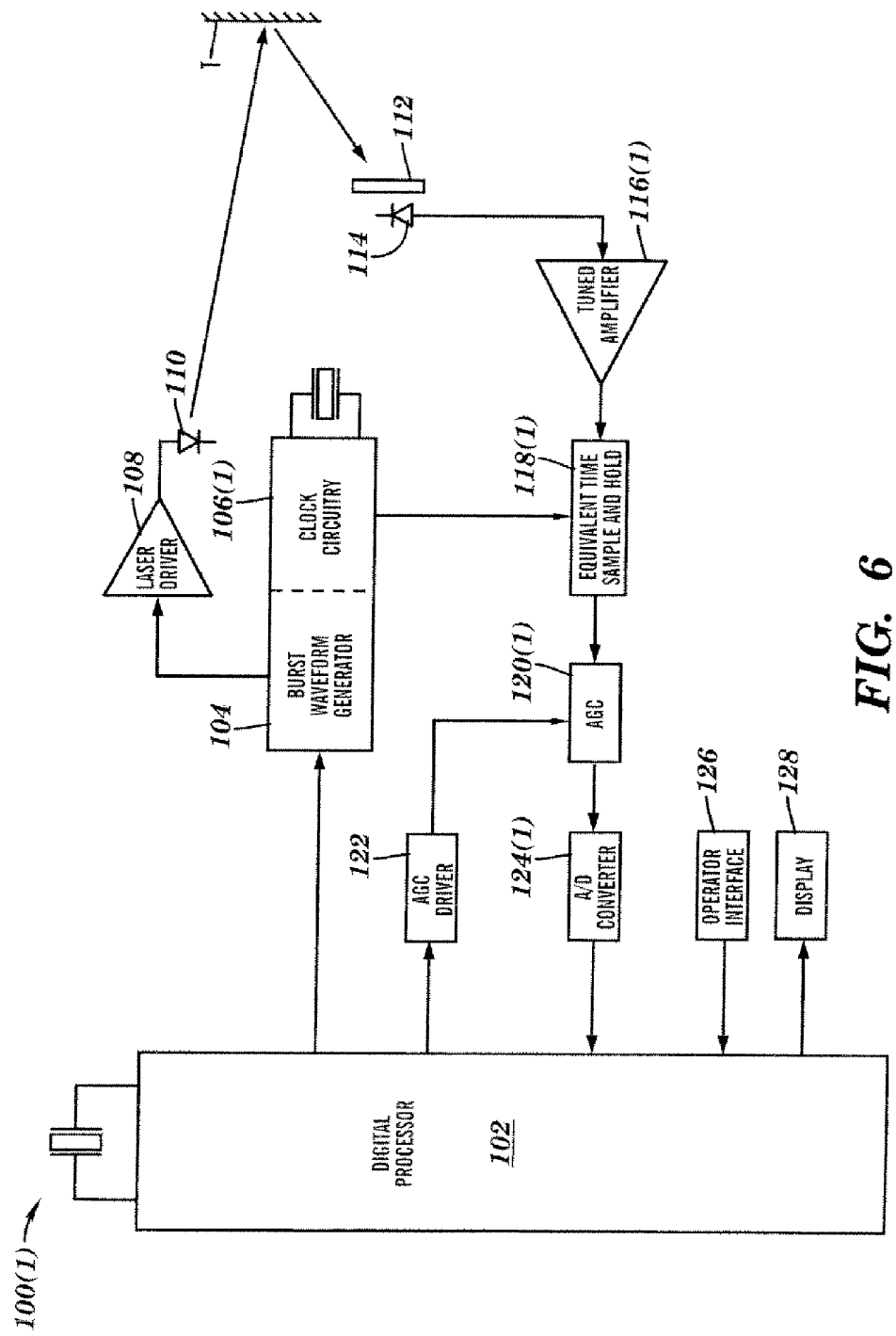
FIG. 6 is a block diagram of a measuring system in accordance with embodiments of the present invention.

A measuring system 100(1) in accordance with embodiments of the present invention is illustrated in FIG. 6. The measuring system 100(1) includes a digital processing system or digital processor 102, a burst waveform generator 104, clock circuitry 106(1), a laser driver 108, a laser diode 110, a focusing system 112, a photo diode 114, a tuned amplifier 116(1), an equivalent-time-sample-and-hold circuit 118(1), an automatic-gain-control circuit 120(1), automatic-gain-control driver 122, a analog-to-digital (A/D) converter 124(1), an operator interface 126, and a display 128, although measuring system 100(1) can comprise other numbers and types of components in other configurations. The present invention provides a compact, eye-safe, low-cost, distance measuring system having one mm accuracy or better and also a compact, low-cost, eyesafe, velocity measuring system.

Referring to FIG. 6, the digital processor 102 has outputs coupled to an input to the burst waveform generator 104, an input to the automatic-gain-control driver 122, and an input to the display 128 and has inputs coupled to outputs from the A/D converter 124(1) and from the operator interface 126. The digital processor 102 includes a processing unit and a memory, although the digital processor 102 can have other numbers and types of components in other configurations. The memory stores programmed instructions and data for measuring a parameter as described and illustrated herein, including the methods described with reference to FIGS. 25–30, for execution by the processing unit, although some or all of these instructions and data may be stored elsewhere. A variety of different types of memory storage devices, such as a random access memory (RAM), a read only memory (ROM) or a floppy disk, hard disk, CD ROM, or other computer readable medium which is read from and/or written to by a magnetic, optical, or other reading and/or writing system coupled to the processing unit, can be used for the memory. By way of example only, the digital processor 102 could be a conventional microprocessor with an external memory or it can be a microcontroller with all memory located onboard. In another example, the digital processor 102 could be a digital signal processor (DSP) integrated circuit, which is a microcomputer that has been optimized for digital signal processing applications, including Fourier transforms. However, the Fourier transforms of the present invention are not very computational intensive, and a DSP will only be required for more demanding distance and/or velocity computations. The DSP could be as simple as a sixteen bit integer device for low-cost applications, or it can be a thirty-two bit, or higher, floating point device for higher performance when cost is not an issue.

The burst waveform generator 104 is coupled to an output of the digital processor 102 and to inputs to the clock circuitry 106(1) and the laser driver 108. The burst waveform generator 104 generates a burst waveform by dividing an 80 MHz clock signal from the clock circuitry 106(1) by four and then gating the 20 MHz signal ON for 25 μs bursts and OFF for 600 μs between bursts, although burst waveform generator 104 could generate a signal in other manners and other types of signal generators could be used. The burst waveform generator 104 also has a low pass filter which converts the burst waveform into a sinusoidal signal as opposed to a binary signal, and then sends the signal to the laser driver 108, although other types of filters could be used or the signal could be sent to the laser driver 108 without any filtering.

The clock circuitry 106(1) generates the clock signal which is used by the burst waveform generator 104 to generate the waveform. In this particular embodiment, the clock circuitry 106(1) generates an 80 MHz clock signal, although other types of clock signals could be generated and used.

The laser driver 108 reformats the electronic burst signal from the burst waveform generator 104 to a format suitable for driving the laser diode 110 so that the laser diode 110 emits the burst waveform with good fidelity. The laser diode 110 is coupled to the laser driver 108 and converts the electronic signal output by the laser driver 108 into visible light whose amplitude is modulated according to the burst waveform input to the laser diode 110, although the signal from the burst waveform generator 104 could be converted to a signal for transmission towards the target T in other manners. The laser diode 110 is pointed at the target T by an operator so that light emitted from the laser diode 110 is directed onto a target T. When taking a distance measurement, it is the distance from the device to that location on the target T where the light emitted from the laser diode 110 strikes that is measured. Although a laser diode 110 is shown, other types of transmitting devices to emit a signal towards a target T can be used, such as an acoustic transmitter.

A focusing system can be used to direct the emitted light from the laser diode 110 towards the target T, although other types of systems for directing the emitted light can be used or the focusing system could be left out. This focusing system can be adjusted for minimal laser beam divergence for pinpoint aiming or for wider divergence angles which increases the field of view and increases the probability that the emitted energy will impinge on the target T. A wider divergence angle is especially useful in collision avoidance applications and in search radar applications. The wider divergence angle is also beneficial when the target T is specularly reflective because it increases the probability that a portion of the reflected energy will be returned to another focusing system 112 and be processed in accordance with the present invention. A variety of different types of one or more lenses could be used for this focusing system, such as a low-cost, injection, compression, or compression-injection molded plastic lens, a gradient index (GRIN) lens, or a spherical, aspherical, or molded glass lens, although other types of optical devices made of other materials also could be used The target T can be comprised of any solid, liquid, gas, or mixture thereof that acts to reflect, either diffusively or specularly, the transmitted energy back to the photodiode 114 or other receiver. The target T can be highly reflective, or absorptive, because even the most non-cooperative absorptive target will usually reflect 4% of the transmitted light due to fresnel reflection, provided there is no light trapping at the target T, and a portion of this light will be reflected back to the photodiode 114, provided the target T does not have specular properties that reflect the light entirely into an alternate direction. To increase the amount of light back-reflected to the device by the target T, retroreflective tape can be attached to the target T. Retroreflective tape or retroreflectors in a non-tape format can increase the received optical signal by a factor of one-hundred or more and increase the maximum usable range a corresponding amount. Additionally, an active transponder (not shown) can be located at the target T, which receives the coherent burst waveform from the device, and transmits a second burst waveform synchronous to the first back to the photodiode 114 or other receiving element. This arrangement could lead to usable ranges on the order of several kilometers for the measuring system 100(1).

The focusing system 112 is a lens which is used to focus light reflected back from the target T on to the photo diode 114, although other types of collection optics or systems could be used or the collection optics could be left out. The collection lens for the focusing system 112 is plastic lens, made with an injection, compression, or compression-injection molding processes, although other types of lens made of other materials, such as glass, could be used. A fresnel lens is especially suitable for use as the focusing system 112, particularly when it is oriented with the fresnel grooves being the inside surface of the lens which will help to keep dirt and debris from settling in the fresnel grooves. The focusing system 112 could also act as the focusing system for laser diode 110 and thus could handle the emitted light from the laser diode 110 and the reflected light received back from the target T simultaneously, by way of a beamsplitter, without allowing any portion of the transmitted light to be back-scattered or back-reflected into the photodiode 114. The collection lens for the focusing system 112 can have a tint or dye material in the collection lens to filter out unwanted optical wavelengths that the photodiode 114 is sensitive to, thereby improving the signal to noise ratio of the received signal. In addition to the tinted or dyed collection lens, the focusing system 112 can also include a filter which is placed before the photodiode 114 and blocks unwanted optical signals. This filter is typically a narrow-band interference filter, although other types of filters can be used, such as a second piece of tinted or dyed material.

The photodiode 114 is positioned to capture at least a portion of the emitted signal reflected back from the target T. Although a photodiode 114 is shown, other types of devices for capturing at least a portion of the reflected signal can be used, such as a radiation detection element suitable for converting received electromagnetic or acoustic energy of interest into an electronic signal. For optical wavelengths, the photodiode 114 can be a common low-cost PN photodiode, or a PIN photodiode, an avalanche photodiode (APD), or a photomultiplier tube (PMT). For RF and microwave wavelengths, other types of receiving elements can be used for the photodiode 114, such as an antenna structure a parabolic dish, or horn could be used. A preamplifier stage may be located in the same housing as the photodiode 114 to make the weak receive electronic signal produced by the photodiode less susceptible to noise from radio frequency interference (RFI) and electromagnetic interference (EMI). If two or more photodiodes 114 are used, the primary one being located on the optical axis of the collection lens for the focusing system 112, and the secondary ones being located immediately adjacent to it, then at short target distances the defocus blur of the received light will illuminate one or more of the secondary detectors, and thus serve to resolve the ambiguity problem for short distances. This can be especially useful in camera auto-focusing applications.

The tuned amplifier 116(1), also known as a resonant filter amplifier, is coupled to an output of the photodiode 114 and to an input to the equivalent-time-sample-and-hold circuit 118(1). The tuned amplifier 116(1) amplifies and filters the signal received by the photodiode 114, although the received signal can be processed in other manners, for example the filtering may not be needed or could be performed by the digital processor 102 using well-known routines such as the Infinite-Impulse-Reponse (IIR) filter, Finite-Impulse-Reponse (FIR) filter, or even the Discrete Fourier Transform.

If the tuned amplifier 116(1) is not overdamped, the tuned amplifier 116(1) can be made to ring in sympathy with the received pulse train, which presents another avenue for coarse distance measurement. For example, if thirty pulses of the 200 MHz square-wave modulated signal are emitted by the laser diode 110, followed by an OFF time of 150 ns for eye-safety, the tuned amplifier 116(1) will amplify the 200 MHz signal that it is tuned to and then ring for a short time afterward while the laser diode 110 is OFF. As this sequence happens over time, a signal whose envelope has a period of 150 ns+150 ns=300 ns, and a frequency of 3.33 MHz, is available at the output of the tuned filter amplifier. This 3.33 MHz signal will also be shifted in phase relative to that transmitted by the laser diode 110, and can be further processed to yield a coarse estimate of the distance.

An output of equivalent-time-sample-and-hold circuit 118 (1) is coupled to an input of the automatic-gain-control circuit 120(1) which is coupled to an output of the automatic-gain-control driver 122. The sample equivalent-time-sample-and-hold circuit 118(1), the sample-and-hold-circuit sometimes being know as a track and hold circuit, comprises an analog amplifier or buffer that is coupled to a hold capacitor through an analog switch, although the equivalent-time-sample-and-hold circuit 118(1) can comprise other numbers and types of components in other configurations. The output of the hold capacitor in the equivalent-time-sample-and-hold circuit 118(1) is directed to the automatic-gain-control circuit 120(1) with high input impedance so that the voltage on the hold capacitor is unperturbed while in the hold mode. In operation, the analog amplifier in the equivalent-time-sample-and-hold circuit 118(1) has enough power to reproduce its input signal on the hold capacitor, with good fidelity, through the analog switch. While the amplifier is driving the hold capacitor, the analog switch is in the ON state, meaning that the analog switch has very low resistance. When the clock circuitry 106(1) determines that a sample must be taken, the analog switch equivalent-time-sample-and-hold circuit 118(1) is placed into the OFF state, meaning that it now has a very high resistance. This switching must occur in a very short time in order to ensure than the sampled voltage on the hold capacitor is a true representation of the received signal at the instantaneous moment of sampling. Once the analog switch is switched OFF, the voltage on the hold capacitor will nominally be held constant at the sampled voltage, as there will be no paths for current flows to change the capacitor's voltage, although in reality leakage currents and the non-infinite input resistance of the automatic-gain-control circuit 120(1) will cause the voltage to droop over time.

While the sampled voltage is being held on the hold capacitor in the equivalent-time-sample-and-hold circuit 118(1), the automatic gain control circuit 120(1) will amplify the held signal an appropriate amount so that it is at least 50%, but less than 100% (i.e., non-saturating) of the full scale conversion capability of the A/D converter 124(1). For example, if the peak signal voltage on the hold capacitor in the equivalent-time-sample-and-hold circuit 118(1) is 50 mV, and the maximum non-saturating input voltage that the A/D converter 124(1) can handle is 5.0 volts, then the automatic-gain-control circuit 120(1) should provide enough gain to supply a maximum signal voltage of between 2.5 and 5.0 volts at the input to the A/D converter 124(1). If the desired voltage is 3.5 volts, the automatic-gain-control gain will be 3.5/0.05=70.

The automatic-gain-control driver 122 comprises a digital potentiometer located in the feedback path of an amplifier stage, although the automatic-gain-control driver 122 can comprise other numbers and types of components in other configurations. The digital potentiometer in the automatic-gain-control driver 122 receives as input digital information that in turn controls the amount of resistance between two terminals of the device. This digitally controlled resistance, when placed in the feedback path of an operational amplifier, can control the gain of the amplifier. The digital information received by the digital potentiometer in the automatic-gain-control driver 122 is sent to it by the digital processor 102. When the digital processor 102 is processing the sampled data, it will have access to the raw data output by the A/D converter 124(1). If one or more of the data samples are too large (saturating), then the digital processor 102 will command the automatic-gain-control driver 122 to produce a lower amount of gain within the automatic-gain-control circuit 120(1). Alternately, if the digital processor 102 determines that the average value of the samples is less than 25% of the full-scale output of the A/D converter 124(1), for example, then the digital processor 102 will command the automatic-gain-control driver 122 to produce a larger amount of gain within the automatic-gain-control circuit 120(1).

An input of the A/D converter 124(1) is coupled to an output of the automatic-gain-control circuit 120(1) and the output of the A/D converter 124(1) is coupled an input to digital processor 102. Although an equivalent-time-sample-and-hold circuit 118(1) and an A/D converter 124(1) are shown other configurations could be used, such as replacing the equivalent-time-sample-and-hold circuit 118(1) and an A/D converter 124(1) with an A/D converter with internal track-and-hold functions that operate at the required track-and-hold speeds and are extremely fast A/D converters, which would allow for sampling at or above the Nyquist rate.

An output of the operator interface 126 is coupled to an input to the digital processor 102 and enables an operator to enter requests and information or data into the digital processor 102. The operator interface 126 can comprise something as simple as an on-off switch, or be more complex, such as a keypad or computer mouse for entering in commands or data to be encoded and transmitted by the digital processor, or even a connection to a remote computer.

The display 128 has an input coupled to an output of the digital processor 102 and enables an operator to view information or data about the measuring operation, such as the distance to the target T, the velocity of a target T, or a decoded message. A variety of different types of devices can be used for display 128, such as a graphical user interface or printer. The display 128 generally displays the measured distance, but can display other information such as error messages and low battery indications.

A power supply system is coupled to the components in the measuring system 100(1) that require power. For ease of illustration, the power supply is not shown. A variety of different types of power supply systems can be used, such as AC power from a standard outlet or batteries which is regulated by power supply control circuitry. If batteries are used, the batteries will age, their internal resistance will increase, and the amount of power they can provide will decrease. This process is generally a slow process, and the power conditioning circuitry will condition the DC power to ensure that components in the measuring system 100(1) receive the required voltage and current levels throughout the aging process. However, at times during the aging process the performance of the batteries can quickly and unexpectedly change, and the power conditioning circuit must be able to accommodate these spurious changes as well. Lastly, the electrical demands of the device itself can vary, as for example when the laser is turned on or off, and the power conditioning circuitry provides a regulation function to keep voltage levels constant as the circuit loads change. An additional function of this circuit is that it can provide a low battery signal to the digital processor 102, which information can then be shown on the display 128 for the operator to view. If an AC source of power is used, this power conditioning circuitry will provide a regulation function to keep voltage levels constant as the circuit loads change and as the source voltage varies. Additionally this circuit will provide protection to the powered circuitry by suppressing spurious noise spikes that occur on many public utility power lines.

The operation of the measuring system 100(1) in accordance with embodiments of the present invention will also be described with reference to FIGS. 6, 7 and 25. In step 200 of FIG. 25, the operator with the operator interface 126 initiates a measurement by signaling the digital processor 102. In step 202, the measuring system 100(1) performs a phase computation on data collected with equivalent time sampling from a reference waveform or signal to obtain a baseline, reference offset phase. The baseline, reference offset phase can be zero or any other baseline established by the operator or from programmed instructions and data. Step 202 will be described in greater detail with reference to FIG. 8 and is an optional step in this example.

Referring back to FIGS. 6, 7, and 25, in step 204 the digital processor 102 generates a signal to the burst waveform generator 104 that enables the generation of a measurement burst waveform. This measurement burst waveform is generated from a master 80 MHz clock circuit 106(1), where the 80 MHz clock is divided by four in the burst waveform generator 104 and then the 20 MHz signal is gated ON for 25 µs bursts, and OFF for 600 µs between bursts also within the burst waveform generator 104, although other types of signals could be generated. The resulting measurement burst waveform is then low pass filtered within the burst waveform generator 104, so that the measurement burst waveform is sinusoidal as opposed to binary, and is then sent to the laser driver 108. The laser driver 108 reformats the measurement burst waveform to a measurement signal that is suitable for driving the laser diode 110.

The laser diode 110 also converts the measurement signal output by the laser diode driver 108 into visible light whose amplitude is modulated according to the measurement signal, although other types of signals could be output towards the target, such as an acoustic signal. The emitted measurement light is directed onto a target T by the operator. The measurement is made from the measuring system 100(1) to the location on the target T where the emitted measurement light strikes.

A portion of the emitted measurement light from the laser diode 110 is reflected or otherwise returned by the target T back to the device 100(1). This returned measurement light is collected by a focusing system 112 which focuses the returned measurement light onto the photodiode 114. The returned measurement light still retains the waveform of the emitted measurement light, but an amplitude of the returned measurement light is reduced compared to the emitted measurement light. Furthermore, the waveform of the returned measurement light has been delayed in time as compared to the emitted measurement light because of the nonzero length of time it takes for the emitted measurement light to reach the target T and then make its way back to the photodiode 114. The photodiode 114 converts the returned measurement light into a returned, coherent burst, measurement signal which is output to the tuned amplifier 116(1).

The tuned amplifier 116(1) is a narrow band band-pass filtering amplifier that allows the 20 MHz signal to pass, but nominally blocks all other frequencies and in effect improves the signal to noise ratio. The tuned amplifier 116(1) filters and amplifies the returned, coherent burst, measurement signal which is then routed to the equivalent time sampling circuit 118(1). Also input to the equivalent time sampling circuit 118(1) is a sample clock signal that also originates at the clock circuit 106(1), is synchronous with the 80 MHz master clock signal, and is used by the equivalent time sampling circuit 118(1) to control the rate of sampling the returned, coherent burst, measurement signal.

The sampled voltage from the returned, coherent burst, measurement signal is sent to an automatic-gain-control circuit 120(1) whose gain is controlled by way of the automatic-gain-control driver 122 which in turn is controlled by the digital processor 102. The signal output from the automatic-gain-control circuit 120(1) is sent to the A/D converter 124(1) where it is converted to a digital representation and routed to the digital processor 102. This post-sampling automatic-gain-control function does not affect the phase of the returned, coherent burst, measurement signal—only the amplitude. After several samples of the reference, coherent burst, measurement signal have been digitized by the A/D converter 124(1) and stored in memory in the digital processor 102, the digital processor 102 executes a discrete Fourier transform on the sampled data and computes measurement phase estimate which can be from zero or any other established baseline.

The Fourier transform is a well-established mathematical method for extracting the frequency, and more importantly, the phase information of an arbitrary signal. In this example, the signal undergoing the Fourier transform is the Sampled Signal depicted in FIG. 7. The Fourier transform is defined to be:

$$X(m) = \sum_{k=0}^{k=N-1} x(k)[\cos(2\pi mk/N) + i\sin(2\pi mk/N)] \quad (1)$$

where x(k) is the k'th sample of the burst signal
  k is the sample counter, runs from 0 to 3 for a four point transform
  X(m) is the frequency domain signal, and is a complex number
  m is the frequency counter
  N is the number of signal samples used in calculating the transform. N is four for a
  four point transform.
  i is the square root of negative one.

As mentioned above, X(m) is a complex number, and can be restated as
  X(m)=Re(m)+iIm(m), where Re is the real part and Im is the imaginary part.

The magnitude of the m'th frequency component is $$A(m)=(Re(m) \times Re(m)+Im(m) \times Im(m))^{1/2} \quad (2)$$

And the phase of the m'th frequency is $$\phi(m)=\tan^{-1}(Im(m)/Re(m)). \quad (3)$$

For distance estimation, only the phase of the fundamental frequency, 20 MHz, for which m=1, is required, which simplifies the expression for X(m) to the following:

$$X(1) = \sum_{k=0}^{k=N-1} x(k)[\cos(2\pi k/N) + i\sin(2\pi k/N)] \quad (4)$$

Further simplifications can be made by designing the equivalent time sampling hardware such that the samples are precisely 90° (that is, precisely P/4) apart in equivalent time. For a four point transform, where N=4 and k=0,1,2, and 3, X(1) simplifies further to:

$$X(1) = \quad (5)$$
$$x(0)[\cos(2\pi 0/4) + i\sin(2\pi 0/4)] + x(1)[\cos(2\pi 1/4) + i\sin(2\pi 1/4)] +$$
$$x(2)[\cos(2\pi 2/4) + i\sin(2\pi 2/4)] + x(3)[\cos(2\pi 3/4) + i\sin(2\pi 3/4)]$$

Which again simplifies further to $$X(1) = x(0)[\cos(0) + i\sin(0)] + x(1)[\cos(\pi/2) + i\sin(\pi/2)] + \quad (6)$$
$$x(2)[\cos(\pi) + i\sin(\pi)] + x(3)[\cos(\pi 3/2) + i\sin(\pi 3/2)]$$

$$X(1)=x(0)+ix(1)-x(2)-ix(3), \quad (7)$$

Where $$Re(1)=x(0)-x(2), \quad (8)$$

and $$Im(1) = x(1) - x(3), \quad (9)$$

And the phase is $$\phi = \tan^{-1}[(x(1)-x(3))/(x(0)-x(2))]. \quad (10)$$

When computing the phase, the arithmetic within the inverse tangent function can be readily accomplished with low-end microcomputers, and the inverse tangent function itself can be implemented by way of a look-up table (LUT) stored in non-volatile memory. For additional precision, entries between values within the LUT can be computed with interpolation if desired. To mitigate the effects of residual noise within the signal, several phase estimates can be averaged together. Continuing with the above example, if there are 1600 bursts per second, meaning there are 1600 computed phase estimates per second, and if it is desired to complete the measurement within one second, then the averaging formula is:

$$\phi_{avg} = \sum_{j=1}^{j=1600} \phi(j)/1600 \quad (11)$$

Again, this arithmetic can be readily implemented on a low-end microcomputer. Furthermore, averaging can be performed on the arguments, x(0), x(1), etc., of the arctangent function. This allows for additional flexibility in computing and optimizing the phase estimate.

The phase measurement, once completed, must be converted to a distance before being of use to the operator. Neglecting calibration offsets and other errors, and assuming that the index of refraction of the traversed medium is unity, the distance is computed via the equation:

$$D = \lambda(\Delta\Phi)/(4\pi) \quad (12)$$

provided that the wavelength of the burst modulation, $\lambda$, is greater than twice the distance D. $\Delta\Phi$ is the change in phase of the burst modulation incurred over the round trip travel time from the unit to the target T and back to the co-located receiver.

Yet another processing algorithm that can be used in place of the discrete Fourier transform for phase estimation is the use of non-linear regression curve fitting, such as the Gauss-Newton method. This method requires more sample points for processing, and is significantly more computationally intensive than the DFT, but can have performance advantages in some instances. A significant advantage of both the non-linear regression and DFT signal processing methods is that they compute the phase, $\phi$, directly, and not the cosine of $\phi$ as in the analog methods discussed in the prior art. Therefore, the periodic precision problems of the prior art, in which the rate of change of the cosine of the phase becomes zero at certain distances, does not exist with the DFT and regression methods. Indeed, a primary advantage of the present invention is that the digital processing acts upon data collected from the received signal itself, as opposed to inventions in the prior art where the digital processing acts upon data taken from a proxy that represents the round-trip travel time, the proxy commonly being an electronic voltage or current, or the count of a counter.

Next, in step 206, a running average of multiple measurements of the distance taken in step 204 is periodically updated. In step 208, if the average measured distance is changing by more than a set percentage, then the digital processor 102 determines that measurement is not stable and the No branch is taken back to step 204. The set percentage of change can be entered by the operator or stored in memory in the digital processor 102. If the average measured distance is not changing by more than a set percentage in step 208, then the digital processor 102 determines that measurement is stable and presumed to be accurate and the Yes branch is taken to step 210. Having a stable distance measurement is analogous to having a zero target velocity.

Next, in step 210 the coarse distance data is collected so that the phase ambiguity can be resolved. Step 210 will be described in greater detail below with reference to FIGS. 7 and 8 and is an optional step in this example. In step 212, the baseline, reference offset phase determined in step 202 is subtracted from the target phase to get the phase shift associated with the measured distance of the target T. Next, in step 214 the phase estimate is directly converted to distance by the use of equation (12). In step 216, a beeper (not shown) beeps to provide an indication to the operator that the measurement is complete, although other type of signaling systems could be used, such as a message on display 128. In step 218, the measured distance is presented by the digital processor 102 on the display 128.

Figure 7:
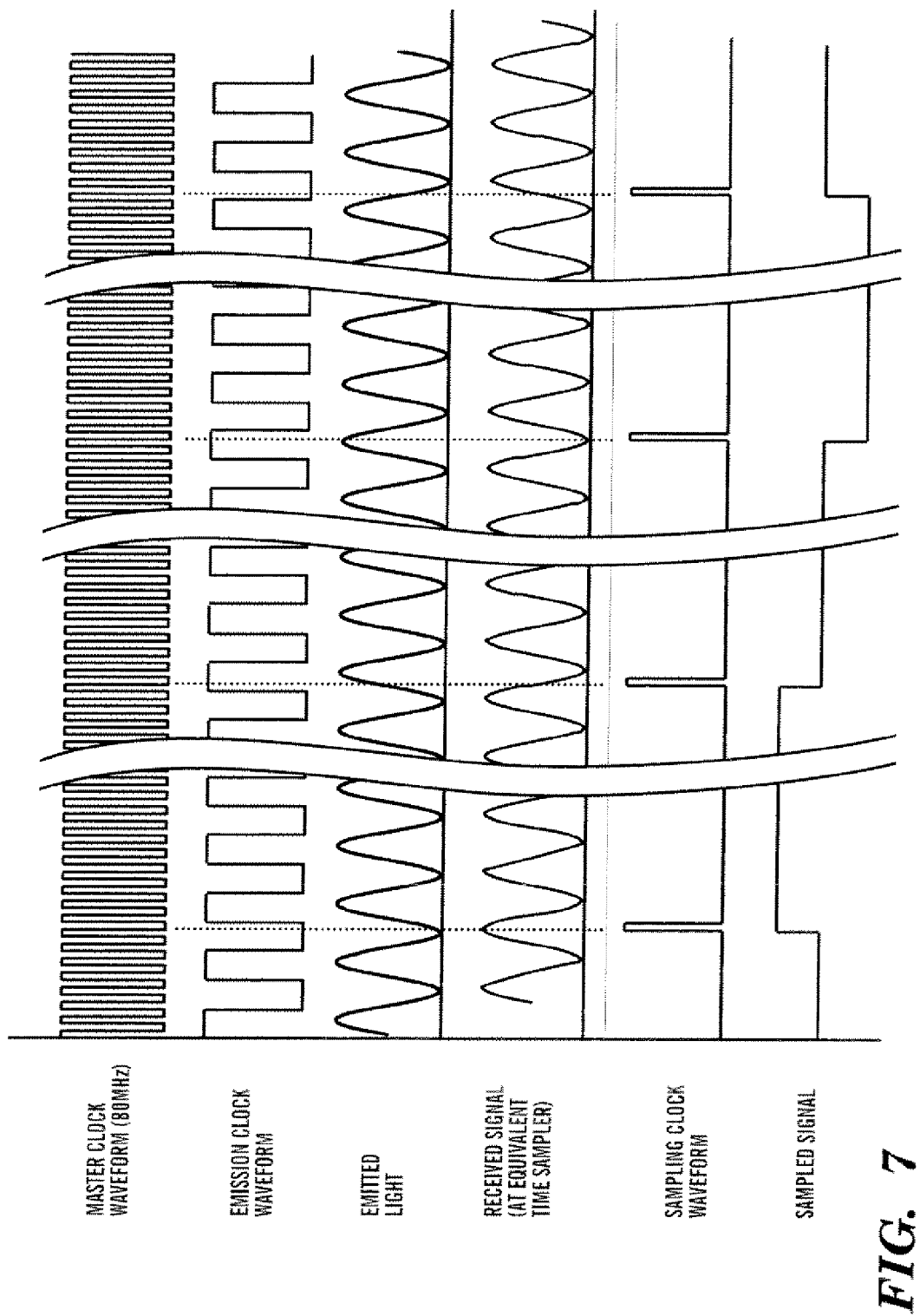
FIG. 7 is a timing diagram of the signals within the present invention.

Referring to FIG. 7, a timing diagram showing the timing relationships between the various digital and analog signals within a burst is illustrated. First, an 80 MHz Master Clock Waveform is generated from a free running crystal oscillator in clock circuitry 106(1). The frequency of 80 MHz was chosen to be four times the burst modulation frequency so that quarter-period sampling signals, that is P/4, are available. The 80 MHz master clock is then simply divided by four to make the Emission Clock Waveform by burst waveform generator 104. The Emission Clock Waveform is then gated to make the bursts, low pass filtered, routed to the laser driver, and then emitted as light as described above, and shown as the Emitted Light Waveform in FIG. 7. Also, a portion of the emitted light reflects off of the target T and is collected by the focusing system 112 onto the photodiode 114 and is filtered and amplified by the tuned amplifier 116(1). The resulting signal, the Received Signal, is time delayed with respect to the Emitted Light Waveform. The amount of the delay is proportional to the distance to the target T, after ignoring internal signal propagation delays and multi-half-period ambiguities. This Received Signal is presented to the analog input of the equivalent-time-sample-and-hold circuit 118(1). Also presented to the equivalent-time-sample-and-hold circuit 118(1) is a digital signal, shown as the Sampling Clock Waveform in FIG. 7, which is created in the clock circuitry 106(1), and is asserted every NP+P/4 seconds, where N is an integer, typically 100, and P is the period of the Received Signal, 50 ns in this example. When the Sampling Clock is asserted (goes high in this example) the Received Signal is sampled, and presented, unvarying, at the output of the equivalent-time-sample-and-hold circuit. This signal is the Sampled Signal waveform as shown at the bottom of FIG. 7, and is periodic, but much lower in frequency than the Received Signal.

In conventional waveform sampling systems, the waveform is sampled at a rate higher than twice the highest frequency present in the waveform. This is the Nyquist condition, and it allows for the complete representation in digital format of the sampled analog signal. However, the burst signal to be sampled is substantially of a single frequency, being 20 MHz in this example, and can be sampled in equivalent time to reduce the speed requirements, and the cost, of the analog to digital conversion system. If it is required by the digital processing system 102 that four samples are obtained per cycle of the 20 MHz signal, every P/4 seconds where P is the period of the 20 MHz signal, then the sampling rate in conventional sampling systems would be 80 MHz. But in equivalent time sampling this requirement is relaxed provided that each sample is NP+P/4 seconds apart, where N is an integer. For example, if N=100, and noting that P=50 ns, then 100P+P/4=5.0125 µs, for a sampling frequency of 199.50 kHz. This low sampling speed is amenable to low A/D costs, and high A/D resolution. Four samples would then require approximately 20.05 µs to collect, which is comfortably less than the 25 µs burst duration given at the start of the example.

Figure 8:
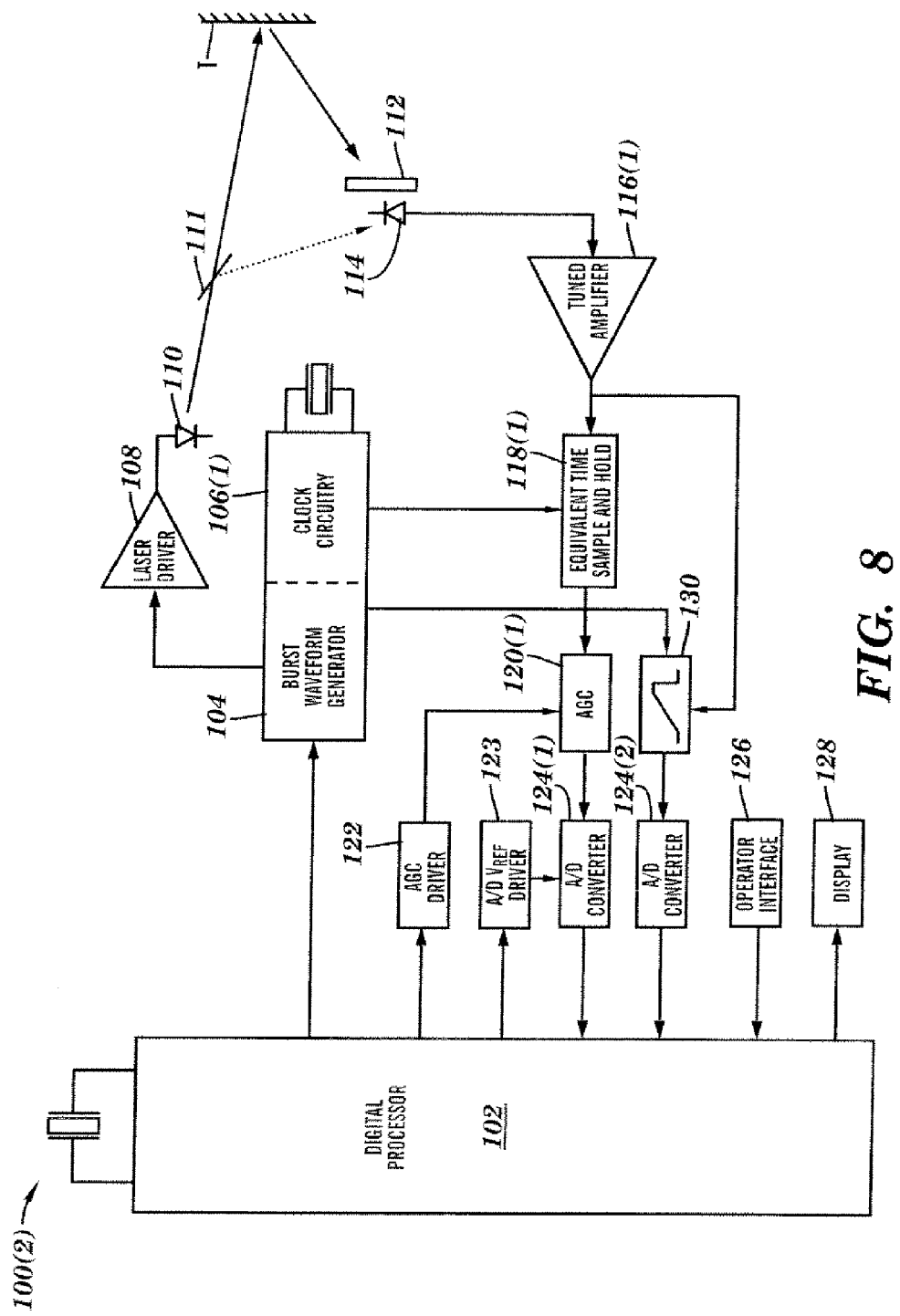
FIG. 8 is a block diagram of another measuring system capable of measuring long distances in accordance with embodiments of the present invention.

Referring to FIG. 8, a measuring system 100(2) in accordance with other embodiments of the present invention is illustrated. The structure and operation of the measuring system 100(2) is the same as described earlier for the measuring system 100(1), except as described below. Elements in FIG. 8 which are like elements shown and described in FIGS. 6 and 8 will have like numbers and will not be shown and described in detail again here.

Referring to FIG. 8, the pulse TOF distance measuring circuit 130 has an input coupled to an output of the tuned amplifier 116(1) and to an output of the burst waveform generator 104. A blocking and redirecting device 111 can be moved into and out of the path of emitted light from the laser diode 110 to redirect emitted light towards the photodiode 112. The distance from the laser diode 110 to the photodiode 114 via the blocking and redirecting device 111 is known and stored in memory in the digital processor 102. The digital processor 102 can be coupled to the blocking and redirecting device 111 to provide commands to move the blocking and redirecting device 111 into and out the path of the emitted light from laser diode 110. The output of the pulse TOF distance measuring circuit 130 is coupled to the input of an A/D converter 124(2) which has an output coupled to an input of the digital processor 102.

As discussed earlier, the operation of measuring system 100(2) is the same as described earlier for the operation of the measuring system 100(1), except as described below with reference to FIGS. 7, 8, and 25. Since all internal electronic signal propagation times associated with the laser driver 108, laser diode 110, photodiode 114, and tuned amplifier 116(1) contribute phase delays, these delays must be measured and subtracted from the phase measurement used to determine the distance to the target T. Additionally, since these electronic propagation times generally vary with temperature, the referencing should be performed relatively frequently, before, after, or even during the phase measurement used to determine the distance to the target T. As described in step 202 in FIG. 25, in order to improve the accuracy of a distance measurement, a referencing provision should be made in which the reference offset phase associated with a zero or other baseline target distance is measured and subtracted from all distance measurements of the target T.

One method of obtaining the reference offset phase is to block the emitted energy directed to the target T and redirect a portion of it with a blocking and redirecting device 111 directly to the photodiode 114 over a closed optical path of known distance. The manner in which phase of the blocked reference emitted light waveform is measured is in the same manner in which the emitted measurement light is measured as described above in step 204 for determining a distance to the target T. Although the emitted measurement light is used in this example, other signals could be used. For example, because the light is blocked internally to the device, eye safety is not an issue. As a result, a signal, such as a continuous 20 MHz waveform, could be used. Using a continuous 20 MHz waveform would speed up the reference offset phase measurement since the measurement device 100(2) does not have to wait for the OFF time of a burst to pass. After the reference offset phase is measured, the blocking and redirecting device 111 is removed from the transmission path, and a phase for determining the distance to the target T can then be measured. Once the measured phase is determined, then in step 212 the reference offset phase is subtracted from the measured phase to compute the distance to the target T.

Since the modulated waveform within a burst is periodic, in this particular example 20 MHz, an ambiguity problem arises when measuring distances greater than one-half the wavelength of the modulation frequency. For example, a 20 MHz emission has a wavelength of 15 meters, which after accounting for the round trip distance means that the measured phase will be the same for a distance of D meters, a distance of D+7.5 meters, D+15 meters, and so forth. This ambiguity can result in serious distance measurement errors if not properly accounted for in the distance measurement.

Figure 25:
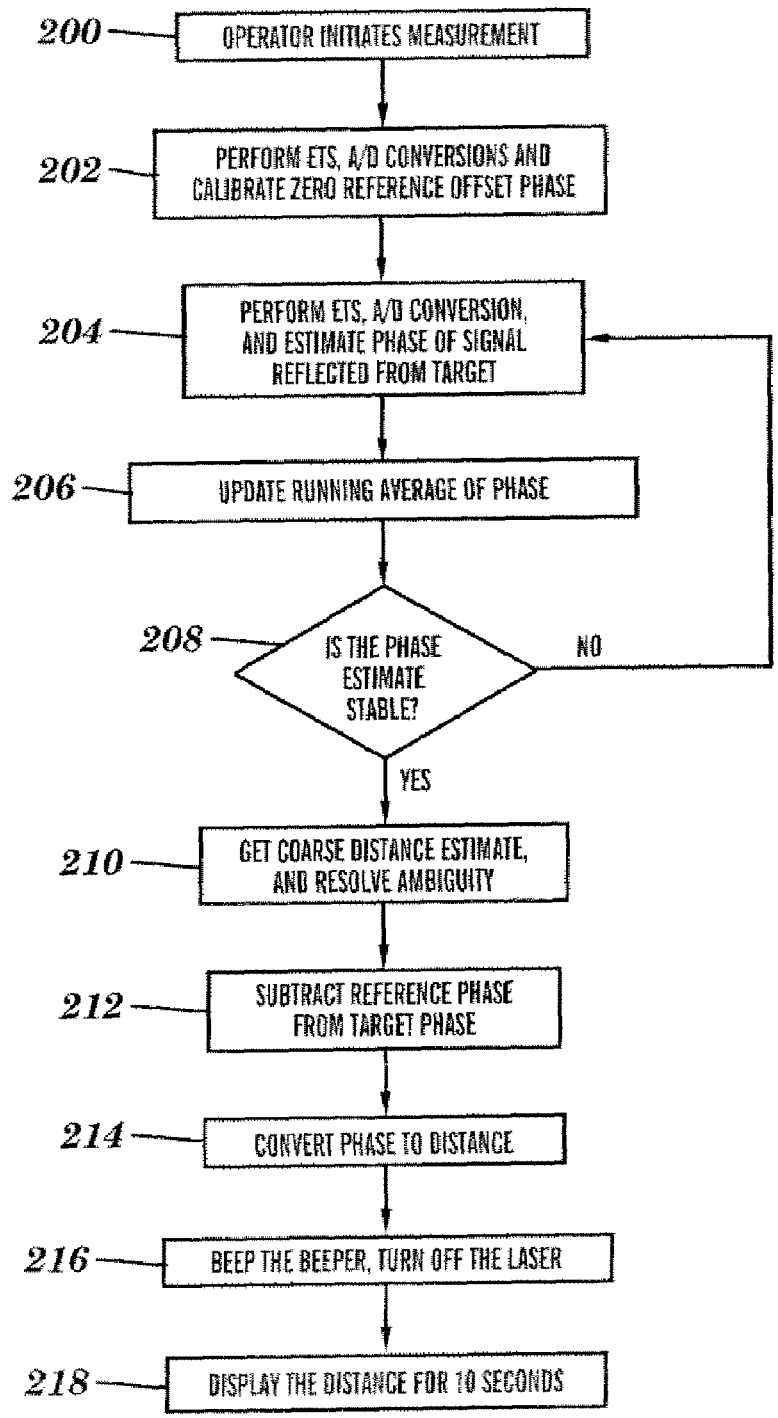
FIG. 25 is a flowchart of the operation of a method for determining a distance to a target in accordance with embodiments of the present invention.

To account for the ambiguity, as described in step 210 in FIG. 25 a coarse distance measurement is performed and then this coarse distance measurement is used to determine how many multiples of the half-wavelength distance need to be added to the distance measurement made with the phase measuring methods. In this particular embodiment, a pulse time-of-flight circuit 130 whose accuracy is on the order of 10% of the half-period distance (being 0.75 meters in this example) and which is coupled to the digital processor 102 is used.

The coarse distance measurement is obtained by routing the output of the tuned amplifier 116(1) to a pulse TOF distance measuring circuit 130. Also input to the pulse TOF circuit 130 is a signal from the burst waveform generator 104 indicating that a burst transmission is commencing. At this time, the pulse TOF distance measuring circuit 130 initiates the generation of a voltage ramp and terminates the ramp when the burst signal is received as seen at the output of the tuned amplifier 116(1). The amplitude of the voltage ramp is proportional to the distance of the target T and this voltage is fed to an A/D converter 124(2) for conversion to digital format for further utilization by the digital processor 102 in computing the appropriate half-wavelength distance to be added to the distance measurement. Although one example of a coarse distance measurement is shown, other coarse distance measurement systems and methods can be used provided they have sufficient accuracy to measure the half-wavelength ambiguity.

During the phase measuring process, it may become necessary to control the AGC circuit 120(1) for optimal signal amplitude for conversion by the A/D converter 124(1). An alternative to including the automatic-gain-control circuit 120(1) or a system and method that augments the automatic-gain-control circuit 120(1) is to control the reference voltage, $V_{ref}$, of the A/D converter 124(1) with the A/D $V_{ref}$ driver 123. The A/D $V_{ref}$ driver 123 controls the reference voltage of the A/D converter 124(1). If the digital processor 102 determines that the amplitude of the digital signal output from the A/D converter 124(1) is too low, the digital processor 102 will command the A/D $V_{ref}$ driver 123 to reduce its reference voltage, which will increase the amplitude of the digital signal output by the A/D converter 124(1).

The measuring system 100(2) is suited to longer range measurements because all N phase samples needed for a DFT can be collected during a single burst. A trade-off can be made to allow for even longer range performance without sacrificing eye-safety by reducing the burst repetition frequency (BRF) and increasing the peak power emission. For example, if the peak power needs to be increased to 500 mW to allow for longer distance measurement, then the average power within a burst will be 250 mW. To allow for eye-safety, the duty factor of the burst must then be 1/250. If a burst lasts 25 µs, then it must be off for 249 times 25 µs, or 6.225 ms. The period is then 6.25 ms, and the BRF is 160 Hz.

Also for long-range systems, a telescopic viewing system (not shown) can be used for aiming and added to measuring system 100(2). This becomes necessary because the small spot from the emitted measurement light will become less visible with greater target distance and a telescopic viewing system will be required for target positioning. This telescopic viewing system could be mounted onto the housing for the measuring system 100(2), although other arrangements could be used, such as having the telescopic viewing system separate from the measuring system 100(2).

Another way to improve the visibility of the emitted measurement light at longer distances is to utilize a wavelength that is near or at the peak of the eye's photopic response curve, which is at a wavelength of approximately 555 nm. If a suitable emission sources for emitting emitted measurement light at 555 nm is not available, then a wavelength between about 480 nm and 660 nm to should be used to improve visibility. For example, a laser diode 110 emitting light at 635 nm will yield a more visible emitted measurement light or laser spot than a 670 nm laser spot, provided all other emission parameters are kept equal.

Figure 9:
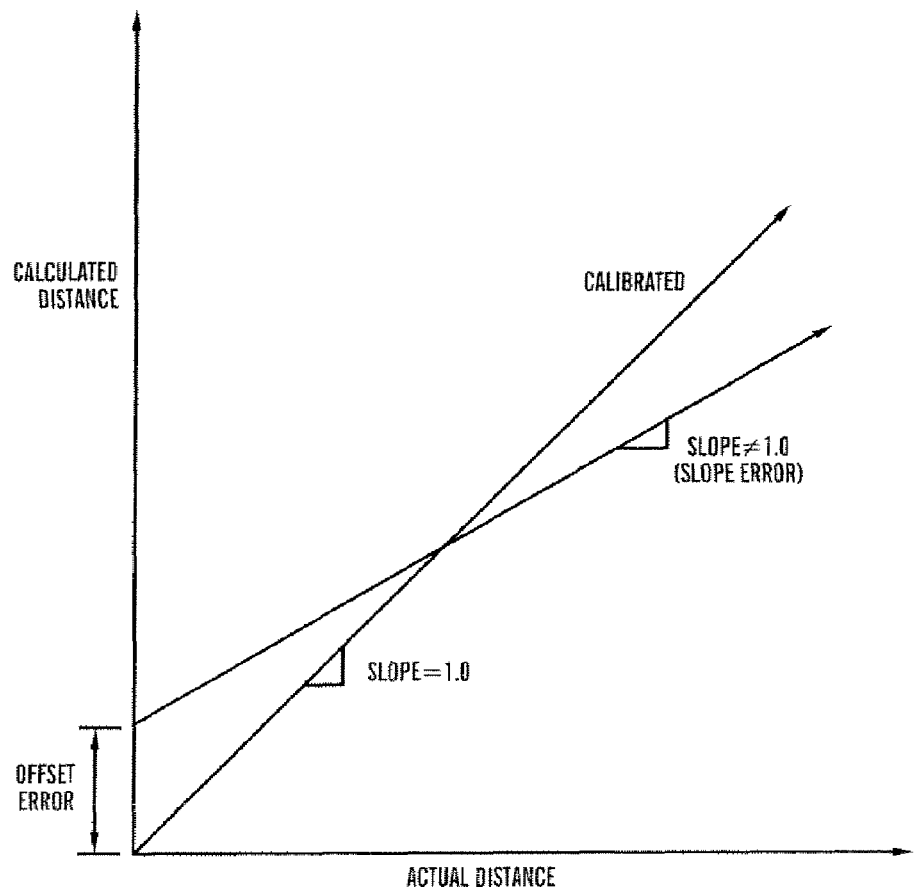
FIG. 9 presents a graph illustrating slope and offset distance measurement errors.

Referring to FIGS. 9–13, the process for removing other error sources to improve overall accuracy is discussed. As shown in FIG. 9, the sources of error can be modeled as two parts: the offset error described above with reference to FIG. 8 and a slope error. The slope error arises from shortcomings in the assumptions underlying the distance measurement.

One underlying assumption concerns the correctness of the burst modulation frequency. If the frequency of the burst modulation is different than what it is assumed to be, then an error will result whose magnitude is proportional to the distance to the target T. This error manifests itself as:

$$\text{Measured Distance} = \text{Actual Distance} \times \text{Actual Burst Freq.}/\text{Assumed Burst Frequency} \quad (13)$$

and the error arises from the frequency term, f, of the phase to distance conversion formula:

$$\text{Distance} = \frac{1}{2} \times [c/(n \times f)] \times (m + \phi/2\pi) \quad (14)$$

where c is the speed of light in a vacuum, $\phi$ is the computed phase in radians, n is the refractive index of the propagating medium, and m represents the integer number of half-period distances to the target T as discussed and remedied with reference to FIG. 8.

As an example, if the actual distance is 10 meters, the assumed burst frequency is 20 MHz, but because of tolerances in the crystal of the clock circuitry 106(1) the actual burst modulation frequency is 20.002 MHz (100 ppm), then the measured distance will be 10.001 meters or an error of 1 mm. This is unacceptably high for many applications and can be remedied by the use of a temperature compensated crystal oscillator (TCXO) within the clock circuitry 106(1).

Although a TCXO in clock circuitry 106(1) is discussed, other frequency sources and standards can be used, such as the low frequency (60 Hz in America) power line, which is readily available in fixed position applications. The 60 Hz frequency can be increased to the burst frequency with the use of a phase-locked-loop (PLL). Other types of frequency sources and standards, such as atomic clocks and signals transmitted by governmental agencies, such as the WWV radio carrier or global positioning signals, can also be used for ultra-precise measurements.

Another source of error in measurements is due to faulty assumptions in the refractive index of the medium through which the coherent burst energy or other signal from the laser diode 110 or other transmitting element propagates. Again, this will produce an error whose magnitude is proportional to the distance to the target T. The error formula is:

$$\text{Measured Distance} = \text{Actual Distance} \times \text{Actual Index}/\text{Assumed Index} \quad (15)$$

It is often assumed that the refractive index of air is 1.0, but in actuality it can vary from 1.00024 to 1.00031 over commonly encountered environmental conditions. This error shows up in the "n" term of the distance formula of equation (14) above. As an example, if the actual refractive index is 1.00031, the assumed refractive index is 1.000000, and the actual target T distance is ten meters, then the measured distance will be 10.0031 meters, which is in error by 3.1 mm. If an average air index is assumed to be 1.000275, which is midway between 1.00031 and 1.00024, and the actual refractive index is 1.00031, then the measured distance will be 10.00035 meters. Again, an error of 0.35 mm can contribute significantly to an overall accuracy error budget, and may not be acceptable for many applications.

It is well known that the refractive index of air varies as a function of temperature, atmospheric pressure and humidity. The refractive index of air has been studied and modeled and up to 95% of the refractive index error can be eliminated in the distance calculation by accounting for just the ambient temperature and atmospheric pressure, and estimating the actual refractive index of air by use of either the Edlen or Ciddor mathematical models.

Adjusting for changes in the refractive index can be accomplished by using on-board temperature and pressure sensors (not shown) whose output is read by the digital processor 102, that in turn computes an estimate of the refractive index of air, and this estimate is used by the digital processor 102 to determine the actual speed of the propagating energy. For example, if temperature and humidity sensors are employed, and the refractive index can be estimated with 5% accuracy, then at most if the air's refractive index is 1.0003100 and it is estimated to be 0.0003065 (i.e., 5% error), then for a 10 m actual distance, the measured distance will be 10.000035, or a measurement error of 0.035 mm.

Even when the above two sources of inaccuracy are removed, noise in the signal at the output of the tuned amplifier can cause an individual distance measurement to be in error. Fortunately, each individual distance measurement can occur in a short period of time and many distance estimates can be averaged together in less than one second. The probability that an averaged distance measurement is within an arbitrary accuracy specification, like 1.0 mm, is therefore a function of the number of averages and the standard deviation of the distribution of the measurements being averaged together. A table of expected accuracy values, for a variety of voltage Signal to Noise Ratio (SNR) and averaging conditions is presented in FIG. 10.

The data of FIG. 10 was computer generated by simulating a four point DFT operating on a 20 MHz sinusoid with non-bandlimited noise according to the SNR column on the left hand side of the table. Measurement error statistics were accumulated over several thousand individual simulations, and from this the data in the standard deviation columns was computed. This was done for J=1, 10, 100, 1,000, and 10,000 averages within a distance measurement. The simulations also assumed a sixteen bit A/D and no slope errors (i.e., mean error is zero when J=∞). Knowing the standard deviation of the measurement errors, and assuming a Gaussian distribution allows the simple computation of the probability of a measurement error to exceed 1.0 mm.

Drawing from the data presented in the table of FIG. 10, it is not unreasonable to expect sub-millimeter accuracy with an SNR between 20 and 50, and between 1,000 and 10,000 averages per measurement. Also, the accuracy is proportional to the burst modulation frequency. For example, if the burst modulation frequency is increased four-fold, then the standard deviations would also be reduced four-fold, with an improved probability of accuracy with less averaging for a given SNR.

Yet another source of error arises from jitter in the sampling clock signal from clock circuitry 106(1). The four point DFT arithmetic assumes that the samples are all taken at precisely NP+90° apart, but in actuality there is some amount of random jitter in the sampling clock from clock circuitry 106(1). The result is that the samples are not taken at the correct time and the resulting samples have some amount of error. The result of the random jitter error is that a new nonrandom error has been introduced into the phase estimate. This jitter error can be mitigated to a certain extent by using a so-called overlapping transform. An example is a six point overlapping DFT, which is given below.

$$X(1)=x(0)[\cos(2\pi 0/4)+i\sin(2\pi 0/4)]+3x(1)[\cos(2\pi 1/4)+i\sin(2\pi 1/4)]+4x(2)[\cos(2\pi 2/4)+i\sin(2\pi 2/4)]+4x(3)[\cos(2\pi 3/4)+i\sin(2\pi 3/4)]+3x(4)[\cos(2\pi 4/4)+i\sin(2\pi 4/4)]+x(5)[\cos(2\pi 5/4)+i\sin(2\pi 5/4)] \quad (16)$$

Which further simplifies to $$X(1)=x(0)[\cos(0)+i\sin(0)]+3x(1)[\cos(\pi/2)+i\sin(\pi/2)]+4x(2)[\cos(\pi)+i\sin(\pi)]+4x(3)[\cos(3\pi/2)+i\sin(3\pi/2)]+3x(4)[\cos(2\pi)+i\sin(2\pi)]+x(5)[\cos(5\pi/2)+i\sin(5\pi/2)] \quad (17)$$

$$X(1)=x(0)+3ix(1)-4x(2)-4ix(3)+3x(4)+ix(5), \quad (18)$$

where $$Re(1)=x(0)-4x(2)+3x(4) \quad (19)$$

and $$Im(1)=3x(1)-4x(3)+x(5), \quad (20)$$

and the phase is $$\phi=\tan^{-1}[(3x(1)-4x(3)+x(5))/(x(0)-4x(2)+3x(4))] \quad (21)$$

Computer simulations show that the magnitude of the jitter-induced measurement error can be as large as 0.1 mm given a four point DFT and 100 ps of jitter on the sampling clock. Using the six point DFT described in equations 16–21, will reduce the magnitude of the error by about 50%, without significantly affecting the standard deviation. In addition to the four point DFT, there are other non-overlapping DFT's that exist, such as a six point or eight point, etc., but an overlapping DFT, such as a five, six, ten, twelve point, or higher, can be used to reduce the sampling clock jitter error.

Other sources of random error are the quantization noise of the A/D converter 124(1) and those effects caused by non-linearities of the laser diode 110. Computer simulations show that quantization errors for a sixteen bit A/D converter are essentially zero, although a fourteen bit A/D converter also works acceptably well. Furthermore, computer simulations show that the errors due to circuit non-linearities are also essentially zero for non-linearities exceeding 5%.

Other errors beside offset and slope errors are typically systemic, predictable, and repeatable, in which case they can be corrected with a look-up-table (LUT) stored in memory in the digital processor 102. For example, at short target distances, the central area of the collection lens in focusing system 112 is most likely to be optically used, whereas at longer distances the entire lens in focusing system 112 is used for light collection. This means that the effective optical path from the lens in focusing system 112 to the photodiode 114 will vary depending upon the distance of the target T. This change in effective optical path length is predictable and repeatable and it's effects can be stored in a LUT in memory in the digital processor 102. After a distance estimate is made by the digital processor 102, a distance correction factor is found by the digital processor 102 in the LUT, and the corrective entry corresponding to that distance is applied to the distance estimate to arrive at a much improved estimate which is then output to display 128 or is output or stored in other manners.

To arrive at an overall accuracy estimate, an accuracy budget is first assembled including the jitter error (0.05 mm), error due to limited averaging or low SNR (0.30 mm), TCXO frequency error (0.2 mm at 10 m), and refractive index estimate error (0.035 mm at 10 m). These errors are generally statistically independent and therefore combine in root-sum-square fashion according to the following formula, assuming a 10 meter target distance:

$$\text{Error}=[(\text{jitter error})^2+(\text{low SNR})^2+(\text{TCXO frequency})^2+(\text{refractive index})^2]^{1/2} \quad (22)$$

Plugging the above numbers into equation (22) yields an error of 0.36 mm, although this does not include the effects of errors made in estimating the zero-offset phase. When this is included, which is made at a much shorter distance and higher SNR, the distance error measurement will be under 0.5 mm for the example and conditions cited above.

Figure 11A:
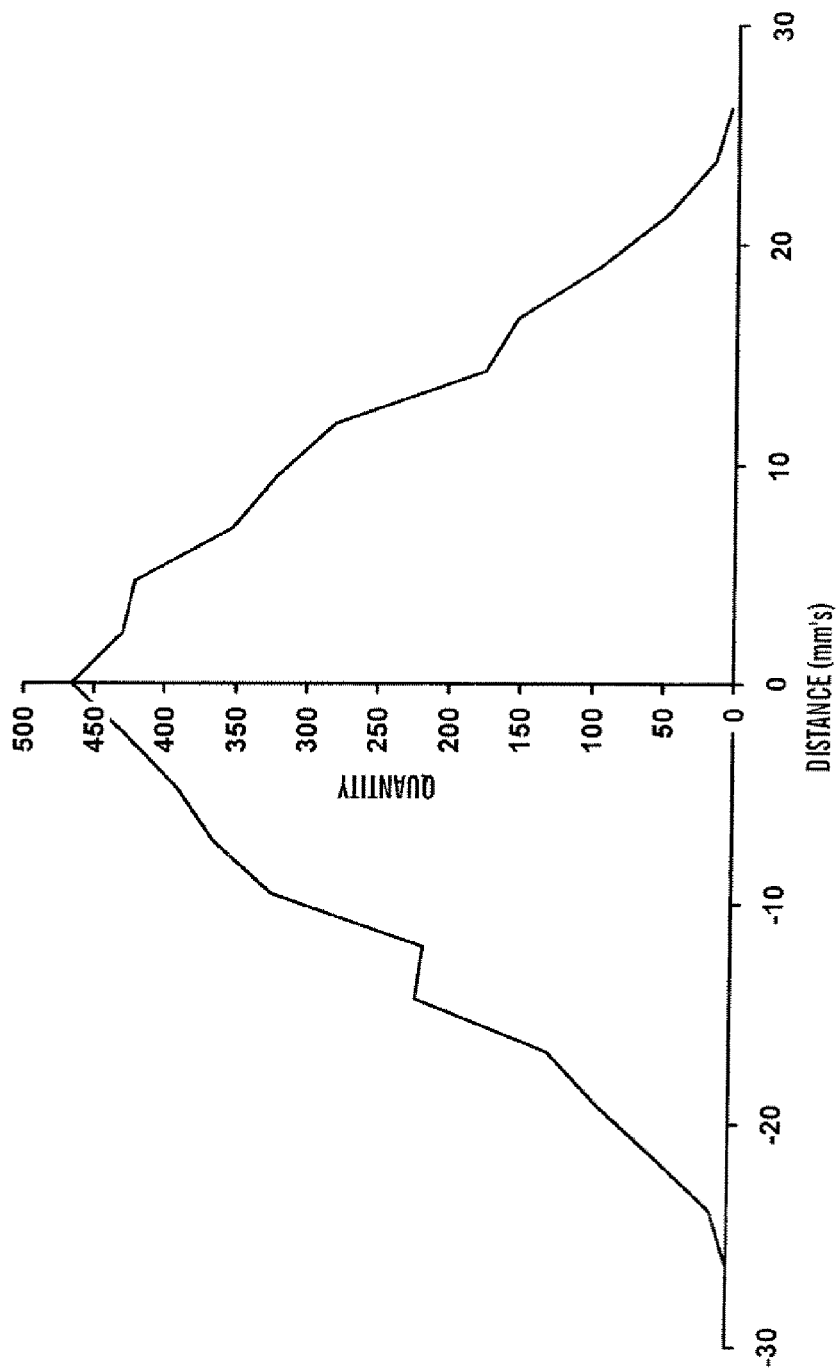
FIG. 11A is a histogram of several phase estimates, generated with computer simulations.
Figure 11B:
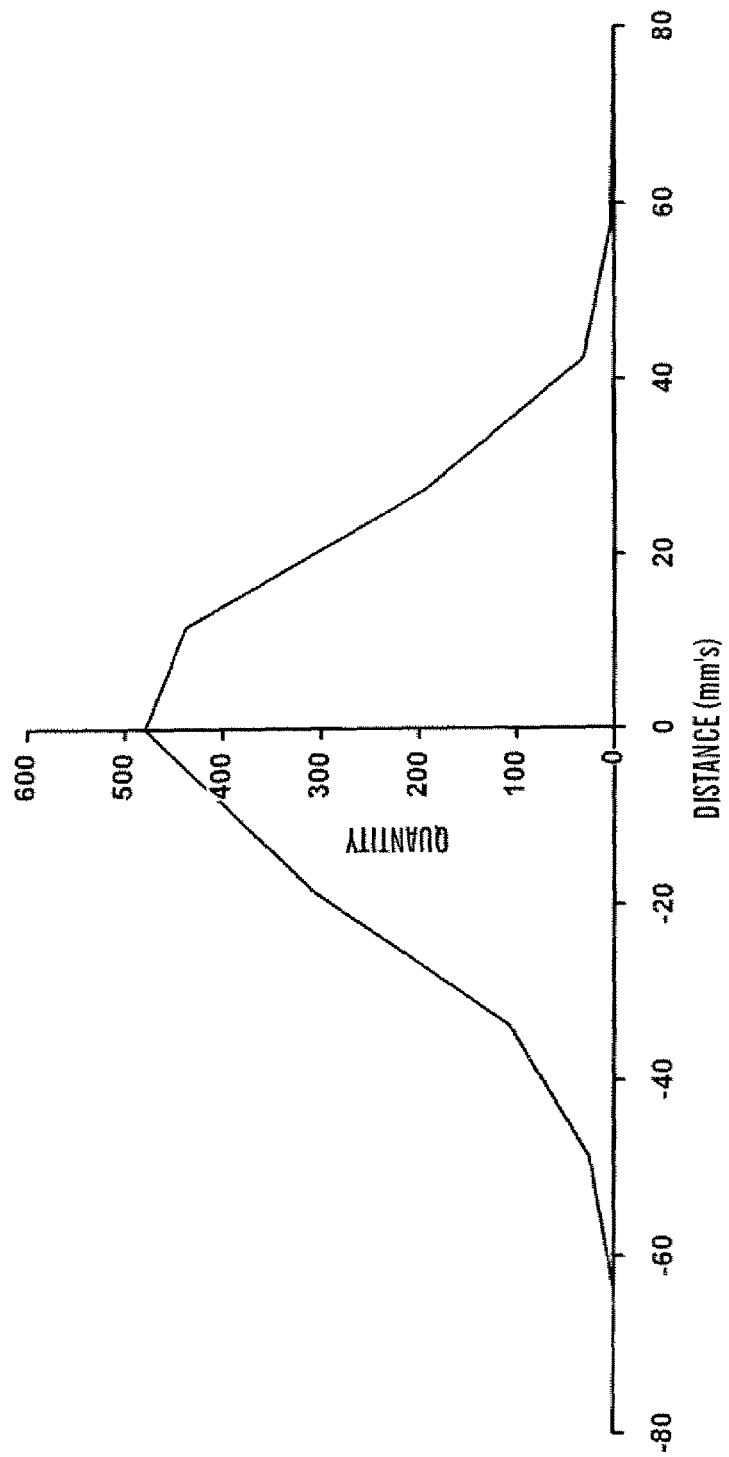
FIG. 11B is a histogram of several phase estimates, generated from an example of taking actual distance measurements using the present invention.
Figure 12:
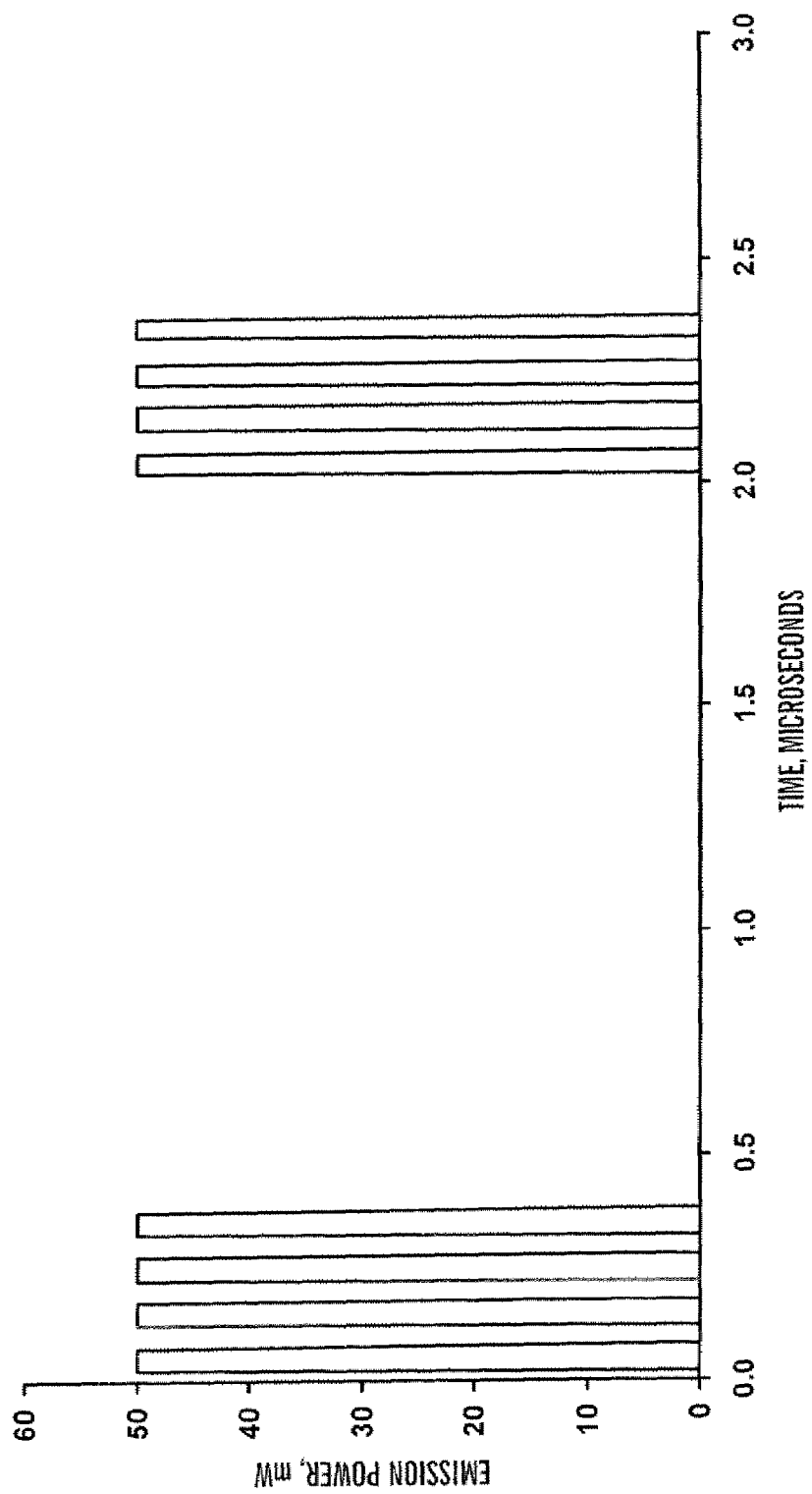
FIG. 12 is a magnified view of a binary emission during an abbreviated burst.
Figure 13:
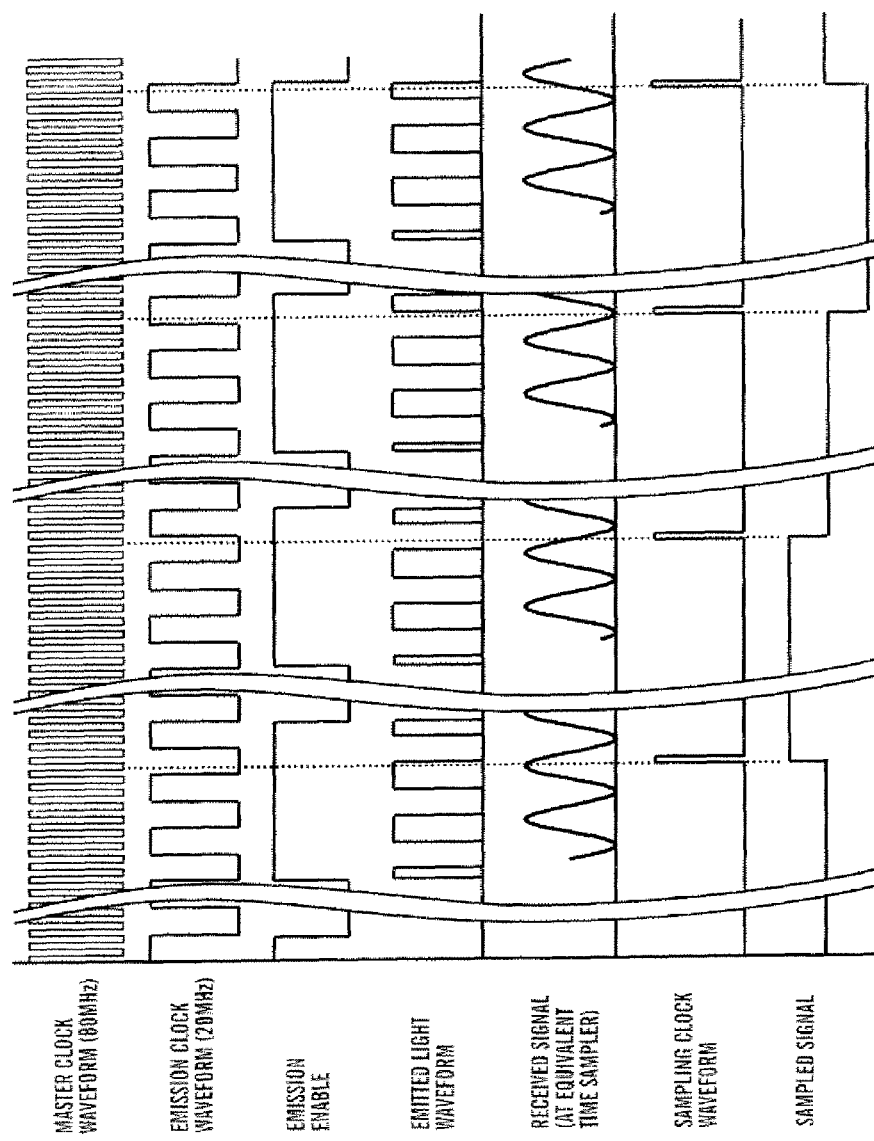
FIG. 13 is a timing diagram of the signals within a lower cost embodiment of the present invention.

Referring to FIG. 11A, a histogram of the measurement error of 5,000 computer simulated distance measurements is illustrated. In the simulations the SNR was fifty, no averaging, four-point DFT, no clock jitter, and the burst modulation frequency was 20 MHz. The standard deviation of the distribution is consistent with the data presented in FIG. 10.

Figure 1:
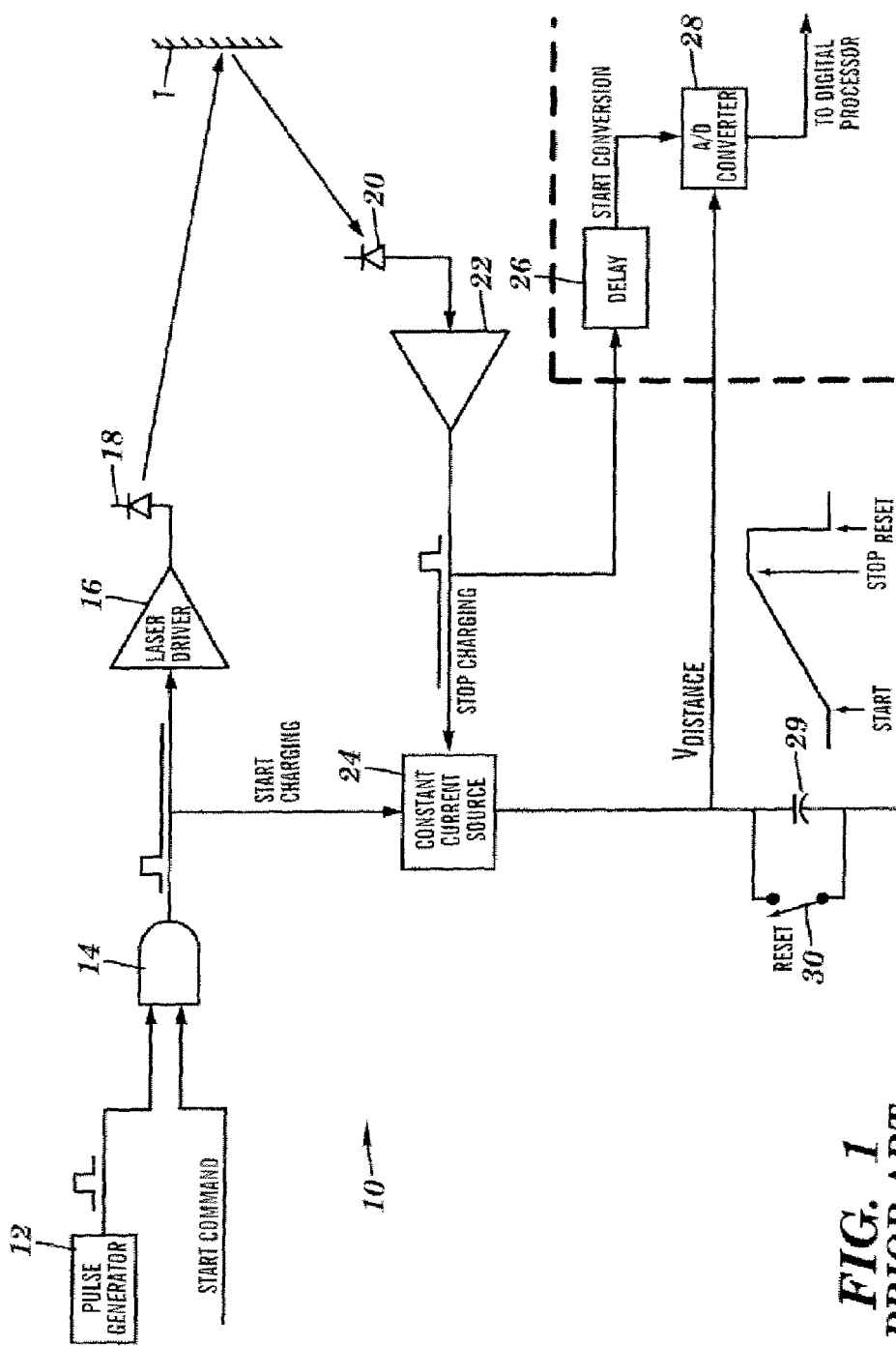
FIG. 1 is a block diagram of a prior art pulsed time of flight distance measuring system.
Figure 2:
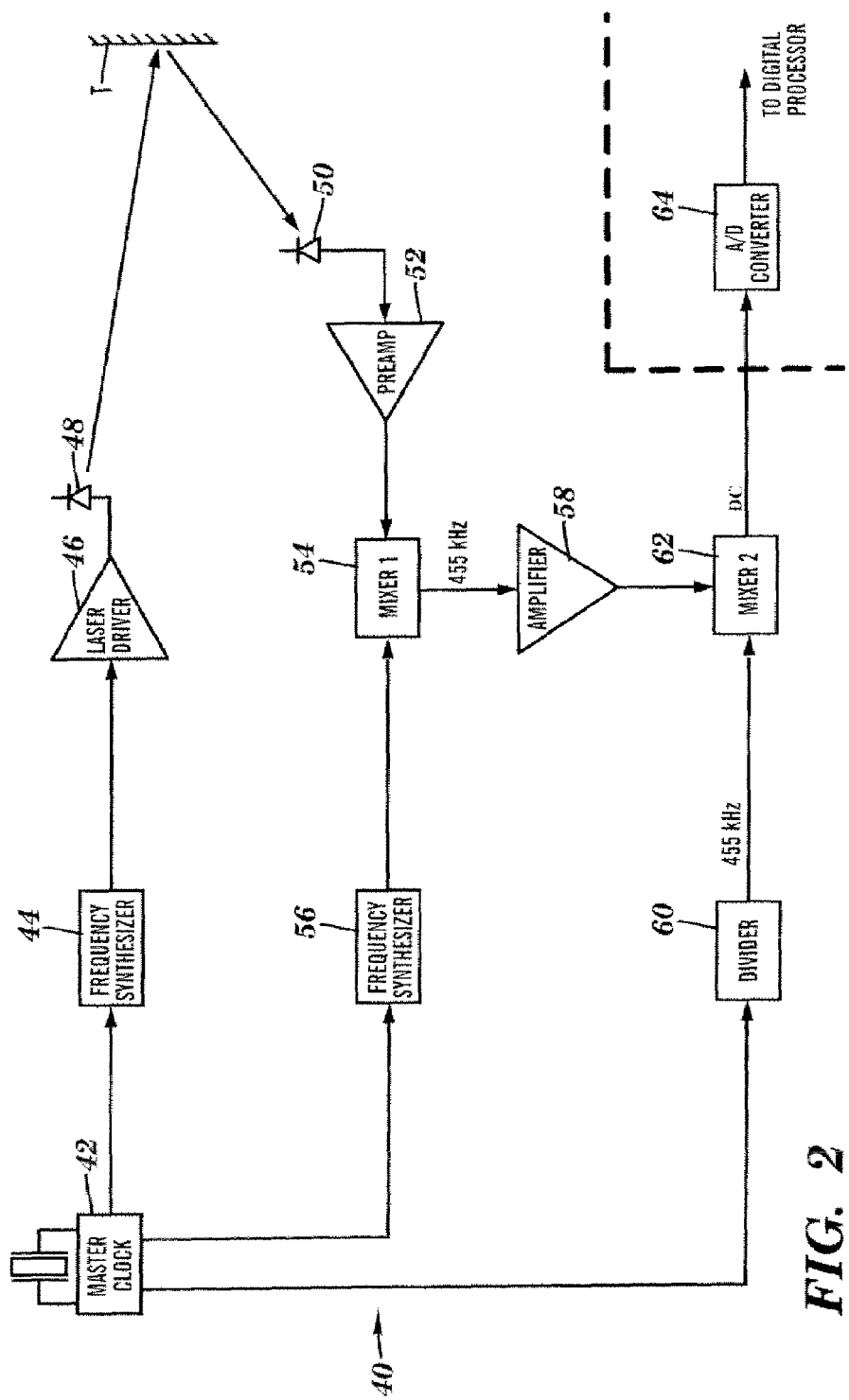
FIG. 2 is a block diagram of a prior art heterodyne phase-measuring distance measuring system.
Figure 3:
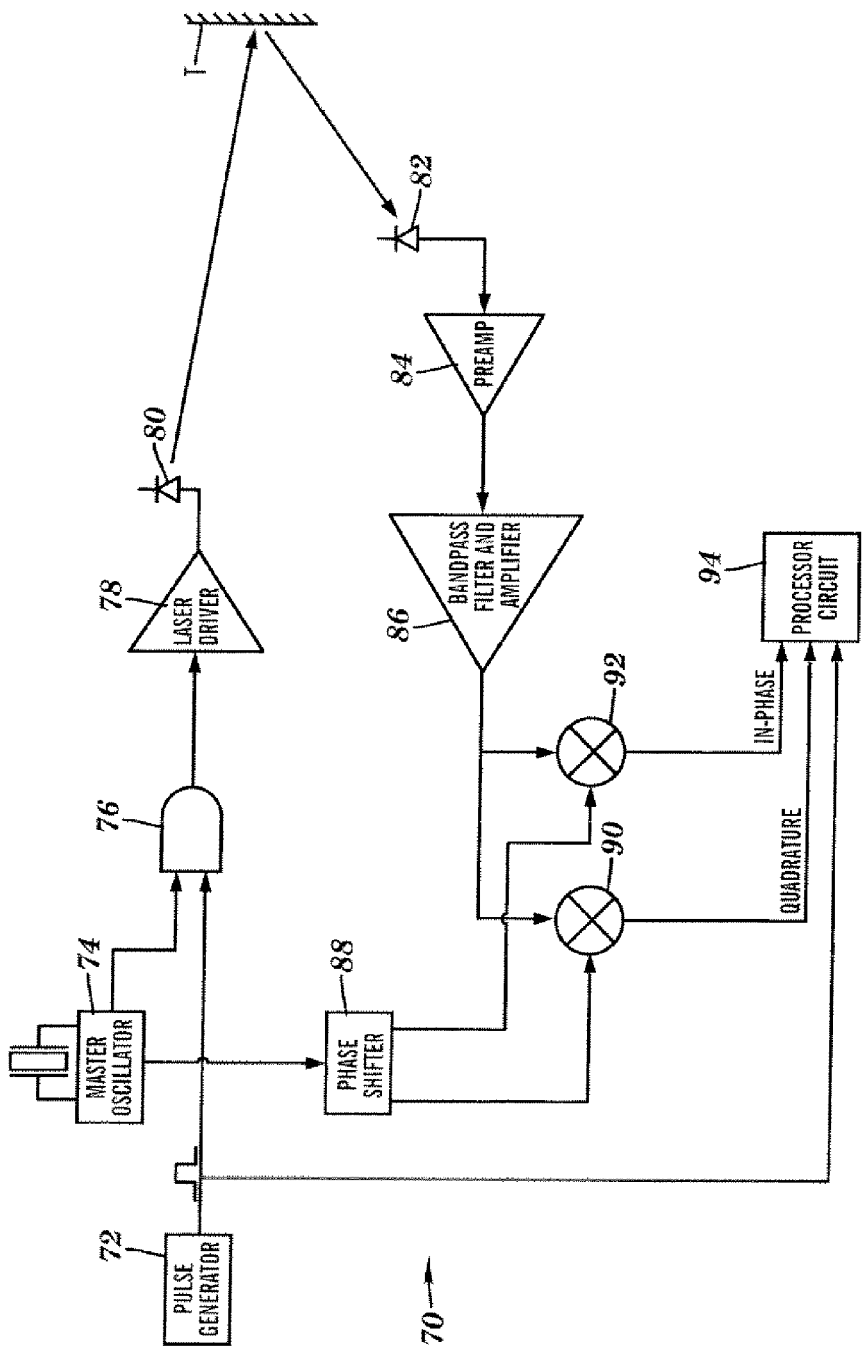
FIG. 3 is a block diagram of a prior art coherent burst distance measuring system.
Figure 4:
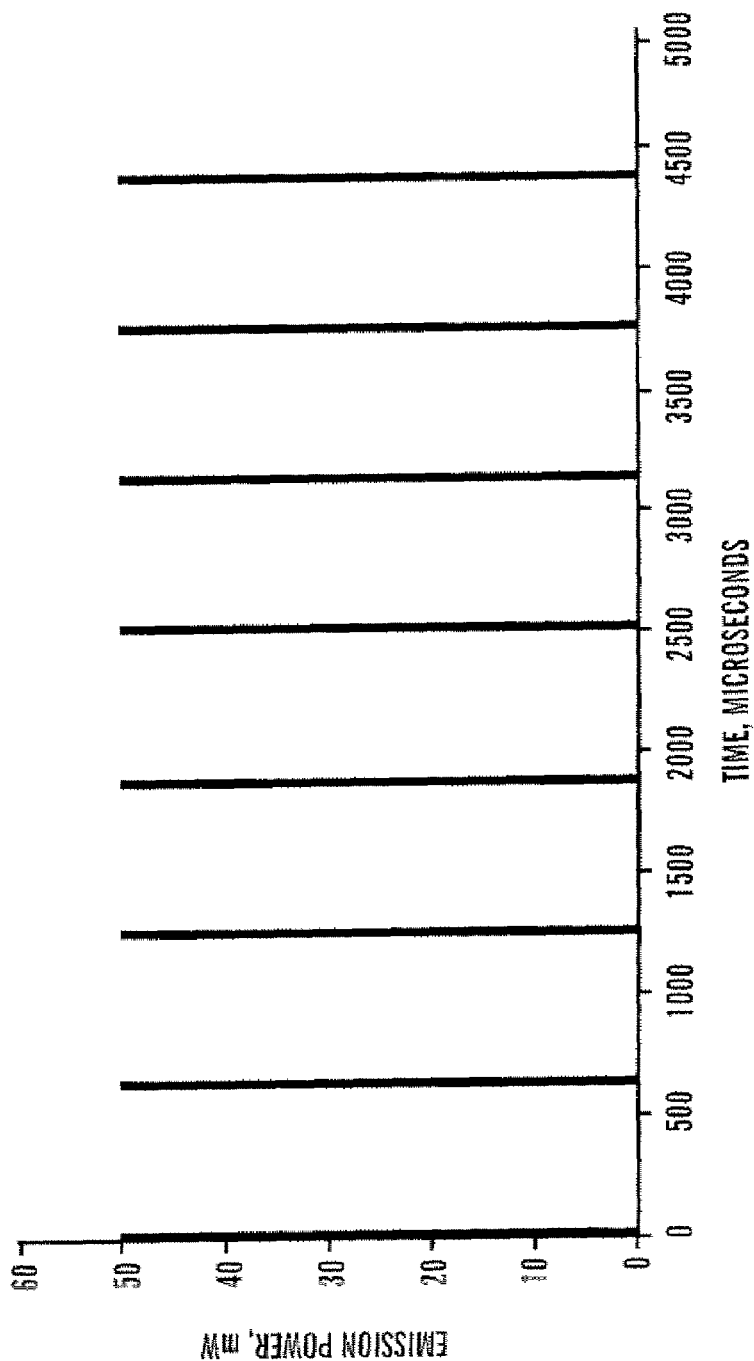
FIG. 4 is a prior art graphical representation of a coherent burst emission.

Referring to FIG. 1B, a histogram of the measurement error of actual distance measurements to a target T which was twelve feet away is illustrated. The measuring device used four-point DFT, no averaging, and a Q 10 MHz burst modulation frequency. The standard deviation of the actual distribution is consistent with the computer simulated data presented in FIG. 10.

An additional way to improve accuracy is to increase the modulation frequency of the burst. If all else is kept constant, increasing the burst frequency by a factor of five, from 20 MHz to 100 MHz, will allow the distance estimate associated with the resulting phase estimate to also be increased by a factor of five. However, not all errors scale with increased burst modulation frequency and an increased modulation frequency will necessarily come with increased costs.

Figure 5:
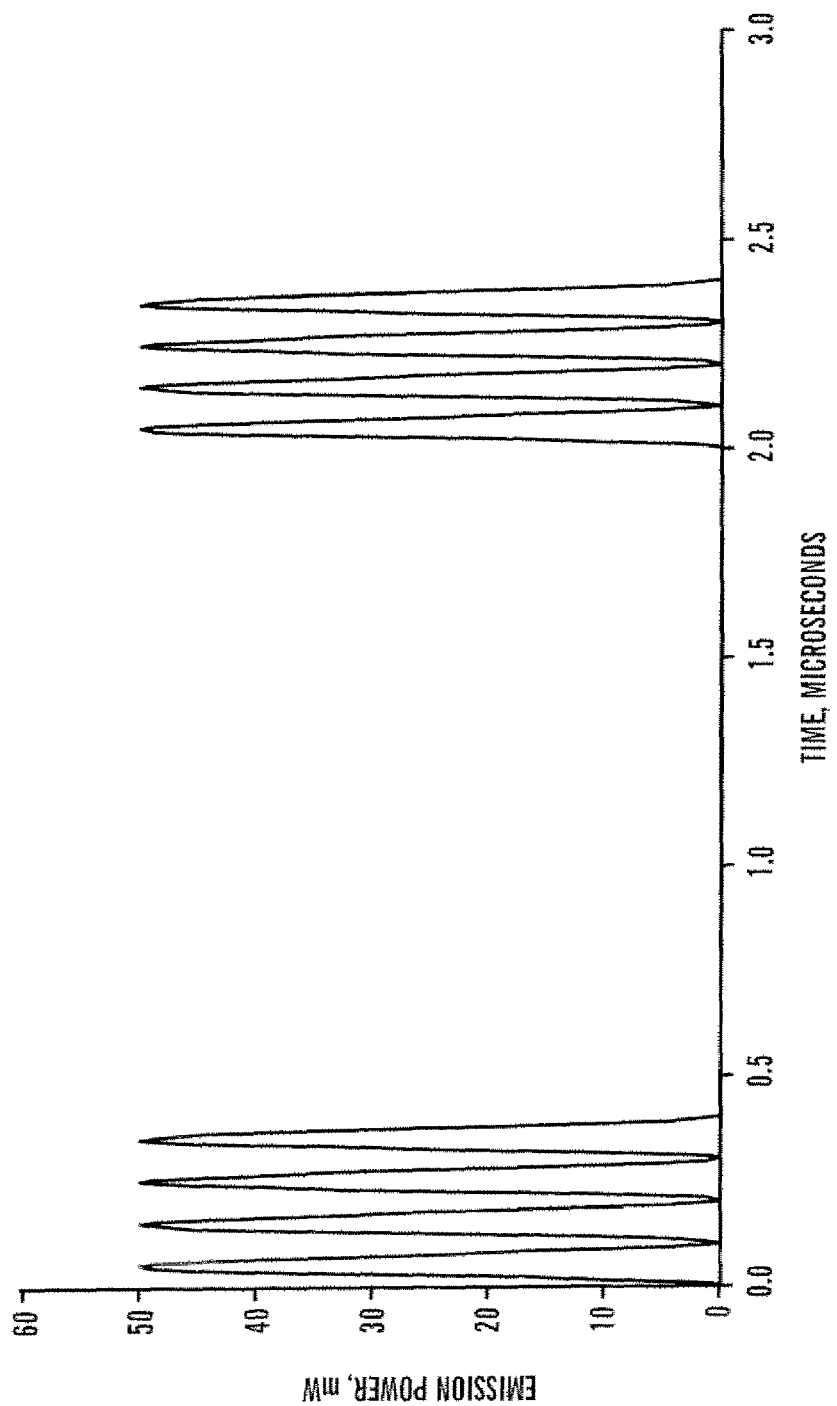
FIG. 5 is a prior art magnified view of the emission during an abbreviated burst.

Another embodiment concerns modifications to the measuring system 100(1) that will result in a lower cost implementation of the present invention. One modification that could be made to the measuring system 100(1) is with the waveform generated by the burst waveform generator 104, which heretofore has been described as sinusoidal and is shown by way of example in an abbreviated form in FIG. 5. The sinusoidal burst waveform is created by low pass filtering the binary signal within the burst waveform generator 104 shown in FIGS. 6 and 8 before the signal is presented to the laser driver 108. However, if the low pass filtering function within the burst waveform generator 104 is removed, then a binary burst waveform is presented to the laser driver 104. A further circuit simplification is to make the laser driver 104 a binary circuit, with appropriate voltage offsets. The result is a digital energy emission from the laser diode 110 which is illustrated in an abbreviated form in FIG. 12. This binary optical energy is transmitted by the laser diode 110 to the target T. A portion of the transmitted optical energy is reflected back onto the photodiode 114 through a collection lens in the focusing system 112, although other types of signals can be received back, such as a return signal sent in response to a detection of the transmitted optical energy at the target T. The output of the photodiode 114 need not reproduce the binary signal with good fidelity and it is beneficial if its bandwidth is restricted to that of the fundamental frequency of the binary burst signal. When the output signal from the photodiode 114 is subsequently filtered by the tuned amplifier 116(1) of FIGS. 6 and 8, all higher order harmonics remaining in the signal will be filtered out, leaving the desired sinusoidal signal, which in turn is directed to the equivalent-time-sample-and-hold circuit 118 (1). The phase of the filtered signal is still indicative of the distance of the target T. This sinusoidal signal is then processed in the usual way with the automatic-gain-control circuit 120(1), A/D converter 124(1), and then the DFT processing functions in the digital processor 102 as described in greater detail earlier.

The binary burst modulation signal can be a square wave, with 50% duty factor, or pulses, where the duty factor is less than 50%. Alternate embodiments where the duty factor is greater than 50%, but less than 100% will also work. Furthermore, the individual pulses comprising the burst do not have to be binary, but can be trapezoidal, triangular, or any other profile in which the rising edges and falling edges are substantially mirror images of each other.

Another modification allows for the use of a significantly slower A/D converter 124(1). Heretofore the A/D converter 124(1) was called upon to collect four samples per burst, where four is the number of points in the DFT algorithm. In the continuing example, the burst duration is 25 μs, meaning that all four samples had to be collected within that 25 μs timeframe, which after allowing for the tuned amplifier to stabilize will be on the order of 20 μs. Therefore, the conversion rate is 4/20 μs=200 kHz, a fairly high conversion rate, especially for sixteen bit A/D converters. If on the other hand the conversion was slowed down, so that there were only one conversion per burst, then substantial A/D converter cost savings would result. This is illustrated in the timing diagram of FIG. 13.

In this configuration, the conversion rate by the A/D converter 124(1) will be substantially the same as the burst frequency, which is 1600 Hz. While the cost of an A/D converter 124(1) that operates at this low speed may be exceptionally inexpensive, there will be only 400 phase estimates per second which will prolong the distance measurement if one thousand averages are required for accuracy. To remedy that, the burst duration can be shorted, to 10 μs for example, and the BRF can be increased to 4,000 Hz without compromising eye-safety, all else being equal. A 4,000 samples per second sixteen bit A/D converter is still quite inexpensive.

As described in earlier embodiments, the ultimate precision of the present invention is a strong function of the amount of averaging performed when computing a distance measurement. To obtain high accuracy with a high level of averaging without driving up the measuring system cost, a lot of data needs to be collected and the digital processor 102 needs to be powerful enough to process it quickly, preferably in real time. Generally, the averaging algorithm is simple and quick, and a low cost digital processor 102 can perform the averaging as quickly as desired. Instead, the data collection, particularly the A/D conversion by the A/D converter 124(1) is the source of the compromise between speed and cost, especially when wide word width, such as sixteen bits, is desired.

Figure 14:
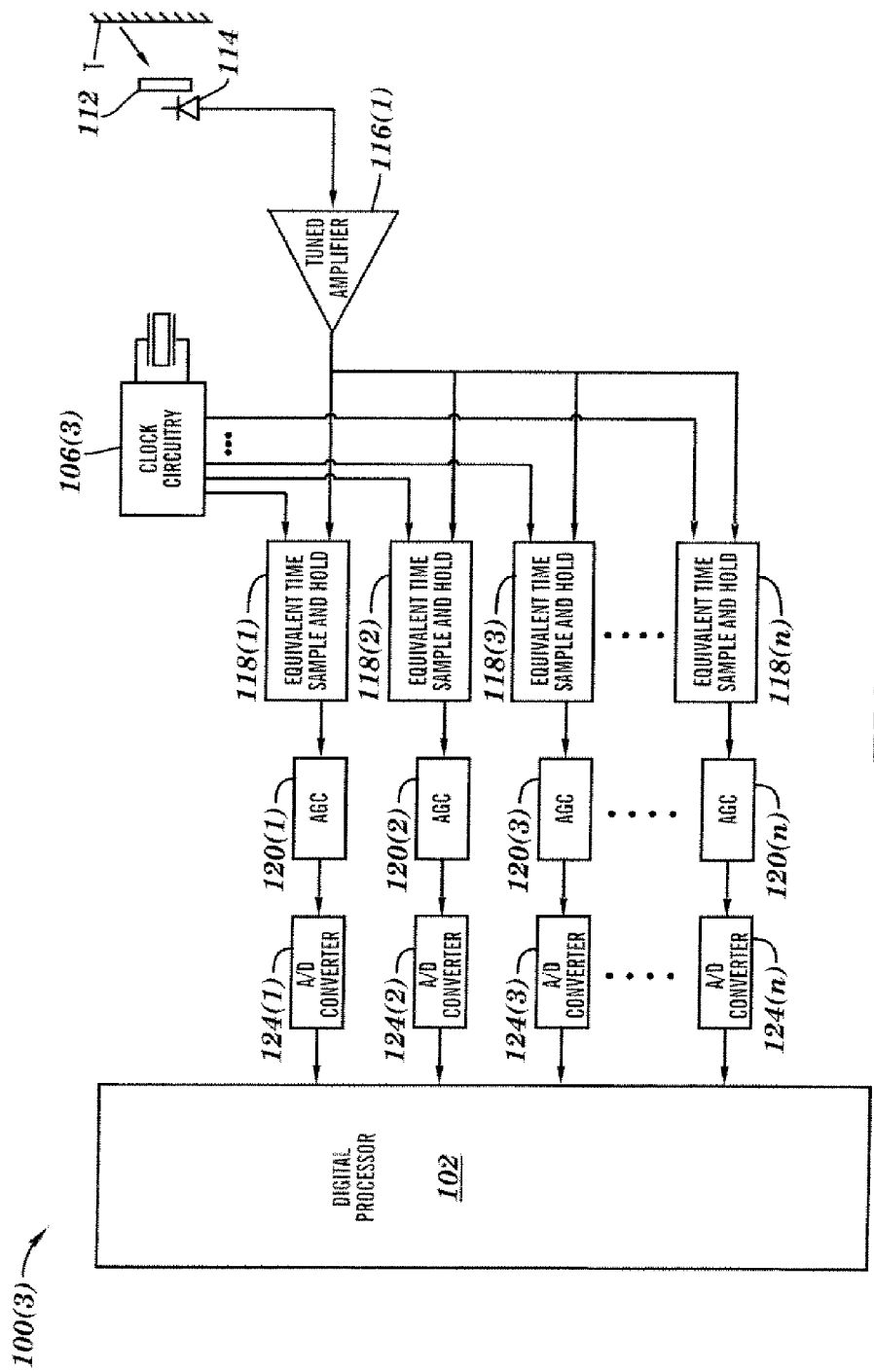
FIG. 14 is a block diagram of a receiving and processing portion of another measuring system capable of high-speed waveform sampling in accordance with embodiments of the present invention.

Referring to FIG. 14, the receiving portion of the measuring system 100(3) is illustrated. The structure and operation of the measuring system 100(3), including the transmitting portion which is not illustrated in FIG. 14, is the same as described earlier for the measuring system 100(1) and 100(2), except as described herein. Elements in FIG. 14 which are like elements shown and described in FIGS. 6 and 8 will have like numbers and will not be shown and described in detail again here.

The measuring system 100(3) includes a plurality of equivalent-time-sample-and-hold circuits 118(1)–118(n) which each have an input coupled to the clock circuitry 106(3) and the tuned amplifier 116(1). An output of each of the equivalent-time-sample-and-hold circuits 118(1)–118(n) is coupled to an input to one of the automatic-gain-control circuits 120(1)–120(n). An output of each of the automatic-gain-control circuits 120(1)–120(n) is coupled to the input of the A/D converters 124(1)–124(n). An output of each of the A/D converters 124(1)–124(n) is coupled to the digital processor 102. The clock circuitry 106(3) is coupled to each of the equivalent-time-sample-and-hold circuits 118(1)–118(n).

In FIG. 14, light reflected from the target T is received by a photodiode 114 and transmitted to the tuned amplifier 116(1) where the received or returned signal is amplified and filtered. The signal output by the tuned amplifier 116(1) is routed to a bank of parallel circuits, where each of the parallel circuits comprises one of the equivalent-time-sample-and-hold circuits 118(1)–118(n) coupled to one of the automatic-gain-control circuits 120(1)–120(n) coupled to one of the A/D converter circuits 124(1)–124(n). The clock circuitry 106(2) is responsible for timing and coordinating the sampling and conversions occurring within each of the parallel circuits. In previous embodiments, a single sampling and conversion circuit 118(1) would process sample one, sample two, etc., whereas in this embodiment the first equivalent-time-sample-and-hold circuit 118(1) would process sample one, a second equivalent-time-sample-and-hold circuit 118(2) would process the second sample, and so on until the nth equivalent-time-sample-and-hold circuit 118(n) processes the nth sample. After the nth equivalent-time-sample-and-hold circuit 118(n) has been invoked, the clock circuitry 106(1) next calls upon the first equivalent-time-sample-and-hold circuit 118(1) for the first sample of the next phase estimate, the second equivalent-time-sample-and-hold circuit 118 (2) would process the second sample of the next phase estimate and the cycle continues for the duration of the distance measurement.

When fully utilized, all nth equivalent-time-sample-and-hold circuits 118(1)–118(n) can be sampling and converting data simultaneously, with an n-fold increase in the effective sample collection rate. In this way, additional data can be collected without suffering a large cost increase associated with using a high performance A/D converter because multiple lower performance A/D converters 124(1)–124(n) operate in parallel.

Another benefit of this measuring system 100(3) is that it allows for an extremely high level of data collection, if cost can be readily traded off. For example, if each cycle within a burst is sampled eight times for an eight point DFT, and the usable burst duration (i.e., that time after which the tuned filter has stabilized) is 20 µs, then there will be 3200 samples/burst. If there are a bank of n=32 sampling and conversion circuits, each will have to perform 100 samples and conversions during the 20 µs burst period, for a conversion speed of 200 ns/conversion or 5 million samples/second (5 MSPS). With a BRF of 1600 Hz, there will be some 5,120,000 samples collected per second, or 640,000 phase estimates per second.

There are several emission sources that cannot be modulated at the 20 MHz rate described in the example above. One class of these sources is the Q-switched laser, which typically produce a series of high power pulses at a rate of 100 kHz. A 100 kHz modulation frequency has a wavelength of three kilometers, and the methods described heretofore will provide accuracies on the order of meters instead of millimeters.

Nonetheless it is desirable to use high-power low-repetition-rate sources because of their availability and reliability in the field. One way that these sources can be used is to take advantage of the higher frequency harmonics that are present in the pulses that they emit. This can be accomplished by noting that a repeating pulse train can be mathematically modeled by the Fourier Series:

$$f(t) = a_0 + \sum_{k=1}^{\infty} a_k [\cos(2\pi kt/P)] + \sum_{k=1}^{\infty} b_k [\sin(2\pi kt/P)] \quad (23)$$

where t is time, f(t) is the periodic function being decomposed into its fundamental and higher harmonics, k is an integer denoting the harmonic (i.e., k=1 is the fundamental, k=2 is the $2^{nd}$ harmonic, and so on), and P is the period of the fundamental (e.g., P=10 µs if the fundamental frequency is 100 kHz). The $a_0$ term represents the average or DC term of f(t) and is of little use in the present application. Also, if the location of the t=0 origin is arbitrarily set so that f(t)=f(−t), then it turns out that the $b_k$ terms are all zero. Furthermore, in determining the terms $a_k$, it is found that the amount of energy present in the higher order terms, for example k=100 and above, is a function of the narrowness of the pulse. If f(t) is a square wave, for example, then there is negligible energy in the higher $a_k$ terms. However, if the pulses comprising f(t) are narrow, with a duty factor of 1% for example, then significant energy will be present in the higher terms. For example, if the pulses comprising a 100 kHz binary signal are made narrow, then significant energy can be found in the k=$100^{th}$ harmonic, or 10 MHz, and this energy can be filtered from the other harmonics, and the phase measured according the methods of the present invention, with accuracies on the order of a few millimeters.

Figure 15:
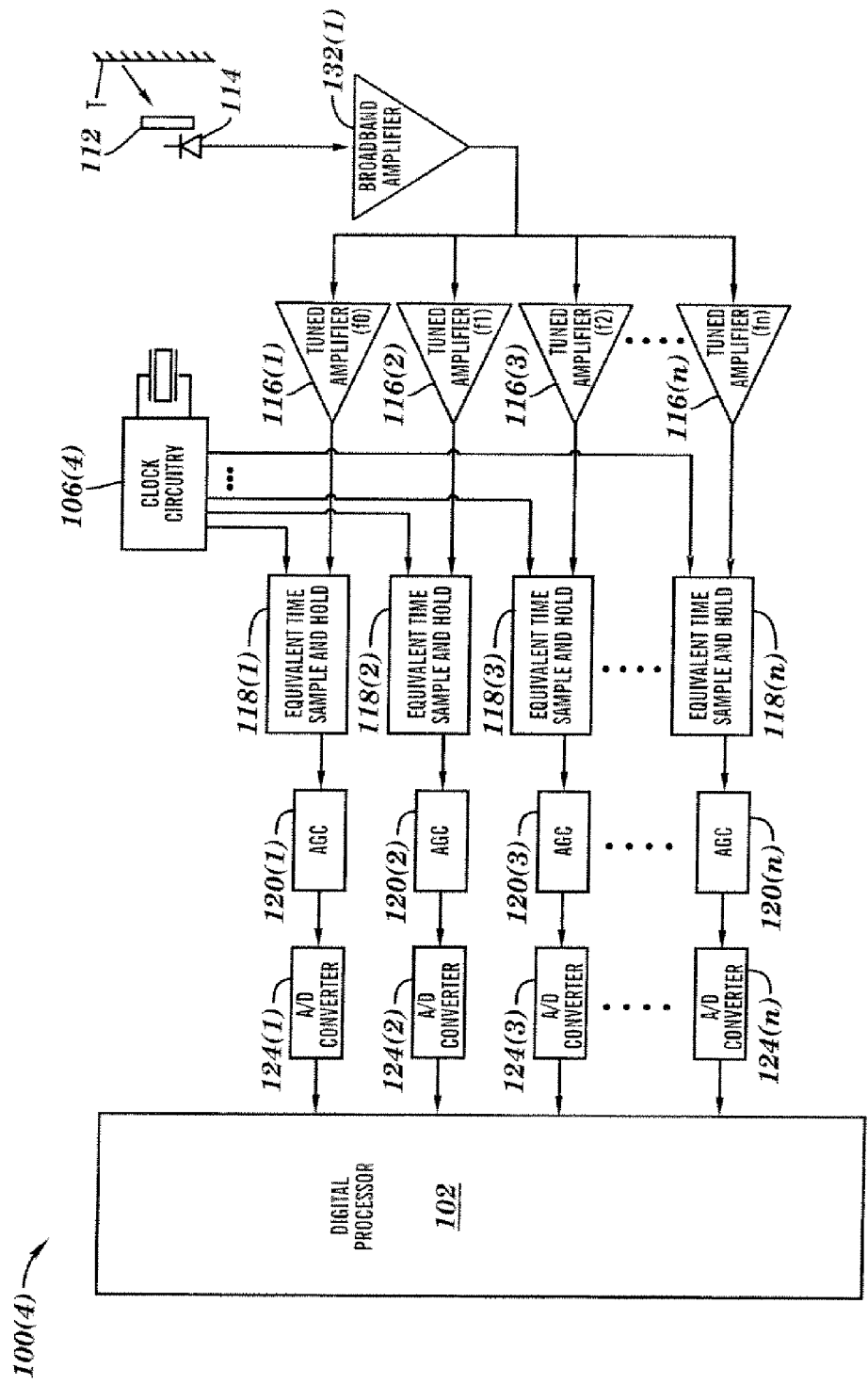
FIG. 15 is a block diagram of a receiving and processing portion of another measuring system based on Fourier series decomposition in accordance with embodiments of the present invention.

Referring to FIG. 15, the receiving portion of the measuring system 100(4) is illustrated. The structure and operation of the measuring system 100(4), including the transmitting portion which is not illustrated in FIG. 15, is the same as described earlier for the measuring systems 100(3), except as described herein. Elements in FIG. 15 which are like elements shown and described in FIG. 14 will have like numbers and will not be shown and described in detail again here.

Referring to FIG. 15, the measuring system 100(4) has an input to a broadband amplifier 132(1) coupled to the output of the photodiode 114. An output of the broadband amplifier 132(1) is coupled to the inputs of tuned amplifiers 116(1)–116(n). The outputs of each of the tuned amplifiers 116(1)–116(n) are coupled to one of the equivalent-time-sample-and-hold circuits 118(1)–118(n). The clock circuitry 106(4) is coupled to each of the equivalent-time-sample-and-hold circuits 118(1)–118(n).

In FIG. 15, the pulse-modulated light reflected or otherwise returned from a target T is received by a photodiode 114 and converted to an electronic signal. This signal is then amplified in a broad-band amplifier 132(1) whose bandwidth is wide enough to amplify all signals, from the lowest harmonic to the highest harmonic, of interest. The output of the broadband amplifier 132(1) is then directed to a bank of one or more receiver circuits, where each of the receiver circuits comprises one of the tuned amplifiers 116(1)–116(n) coupled to one of the equivalent-time-sample-and-hold circuits 118(1)–118(n) coupled to one of the automatic-gain-control circuits 120(1)–120(n) coupled to one of the A/D converter circuits 124(1)–124(n). The center frequency of each of the tuned amplifiers 116(1)–116(n) is tuned to the harmonic of interest, and its output is a sinusoid of that frequency, with the phase of that signal being indicative of the distance of the target T. Higher harmonics will have shorter wavelengths, and therefore they will result in more precise distance estimation. Since there are several harmonics available, each containing signal energy, a bank of receiver circuits is shown so that all these harmonics can be utilized. The clock circuitry 106(3) must be able to provide sampling signals of the appropriate timing, which is different for each of the different equivalent time sampling circuits.

This circuit topology has the added benefits of being able to intrinsically resolve the phase measuring ambiguity problem, at least to 1.5 km with a 100 kHz signal, and since the amplitude of the signal is inversely proportional to its harmonic number, there can also be a wide range of signal amplitudes present which can relieve some of the burden within the AGC circuits. On the other hand, high Q filters 116(1)–116(n) must be utilized as the width of the passband must be 100 kHz or less, in the current example, which could be difficult with a 10 MHz center frequency.

There are certain applications where it is desirable to be able to transmit and even receive digital data as part of the distance measurement operation. In docking applications, being able to transmit and receive information between the two objects being docked could facilitate the docking operation. In circumstances where more than one measuring apparatus is directed onto a target T, digitally encoded data within the burst could allow the measuring devices to distinguish between the various received signals and be able to know which signal is the true echo from the collocated transmitter. This could be useful in battlefield as well as automotive collision avoidance situations.

Yet another application is in IFF (identify friend or foe) transponders, in which a transponder, when illuminated with coherent burst energy containing digital data, responds with an appropriate code embedded in a returned signal that indicates the nationality of the target T being illuminated.

The source apparatus' transmission could have the nationality code embedded within the burst signal as well. Yet another application is to use the embedded digital data to be able to identify false returns, such as those encountered during attempted jamming by an enemy target T.

The digital data within a burst must modulate the burst in some manner, so it is preferable that the data modulation occurs after the samples for the DFT have already been collected. In this way, the portion of the burst signal that is being used for distance measurement will not be altered and thereby affect the accuracy of the distance measurement, although it is possible that some receive circuit arrangements can be implemented to minimize these effects.

Figure 16:
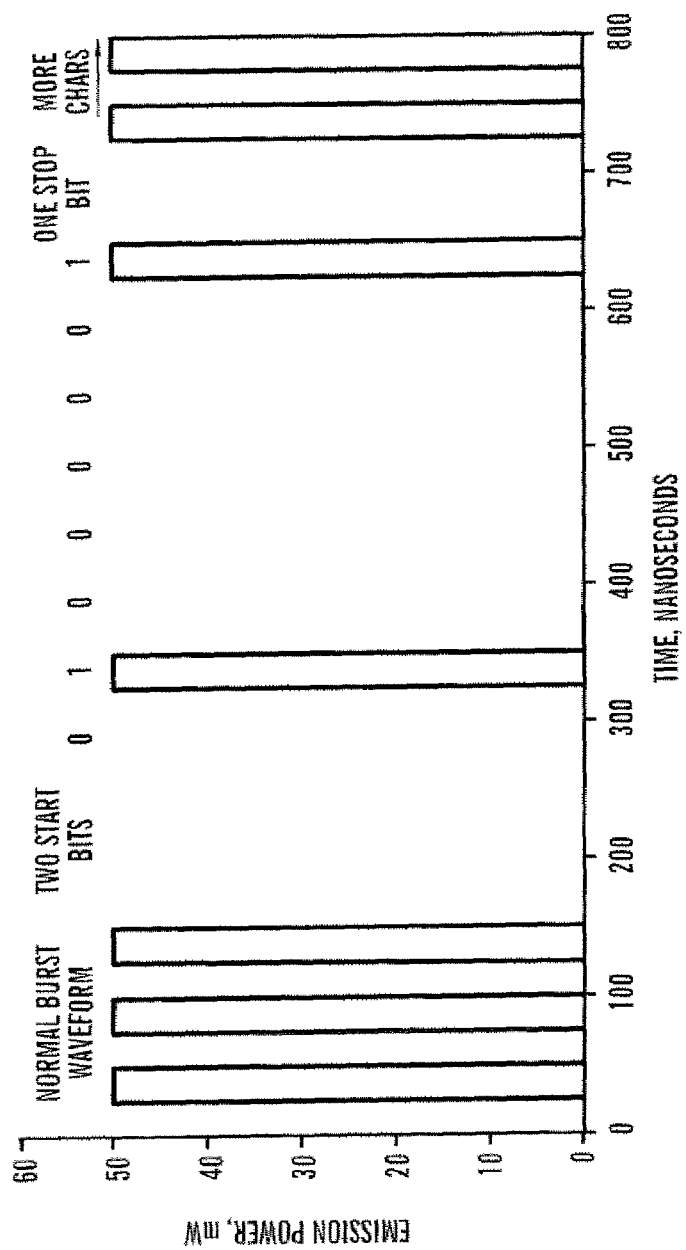
FIG. 16 is a portion of a binary burst emission in which the ASCII letter 'A' is encoded into the emission.

The simplest modulation is amplitude modulation (AM), in which a binary 1 is represented by the presence of the carrier, and a digital 0 is represented by the absence of a signal, although other modulation methods, such as PWM (pulse width modulation) could be used. Referring to FIG. 16, an example of such an AM data transmission, in which the ASCII letter A is transmitted, is illustrated. After the normal burst waveform is transmitted, there are two start bits, which are used to coordinate the data receive circuits and indicate that data is forthcoming. There are eight data bits representing the letter A followed by one stop bit. This is a serial communication and there are other serial communication protocols that can be used instead. After the A is transmitted, there should be up to several more cycles of normal burst waveform so that the clock recovery and timing circuits can recover and ensure good sync with later characters. The timing in FIG. 16 assumes the 20 MHz burst modulation frequency and the bit rate while a data character is being transmitted is 20 Mb/second although the overall bit rate will be reduced because of the start, stop, and interstitial clock recovery bits.

Figure 17:
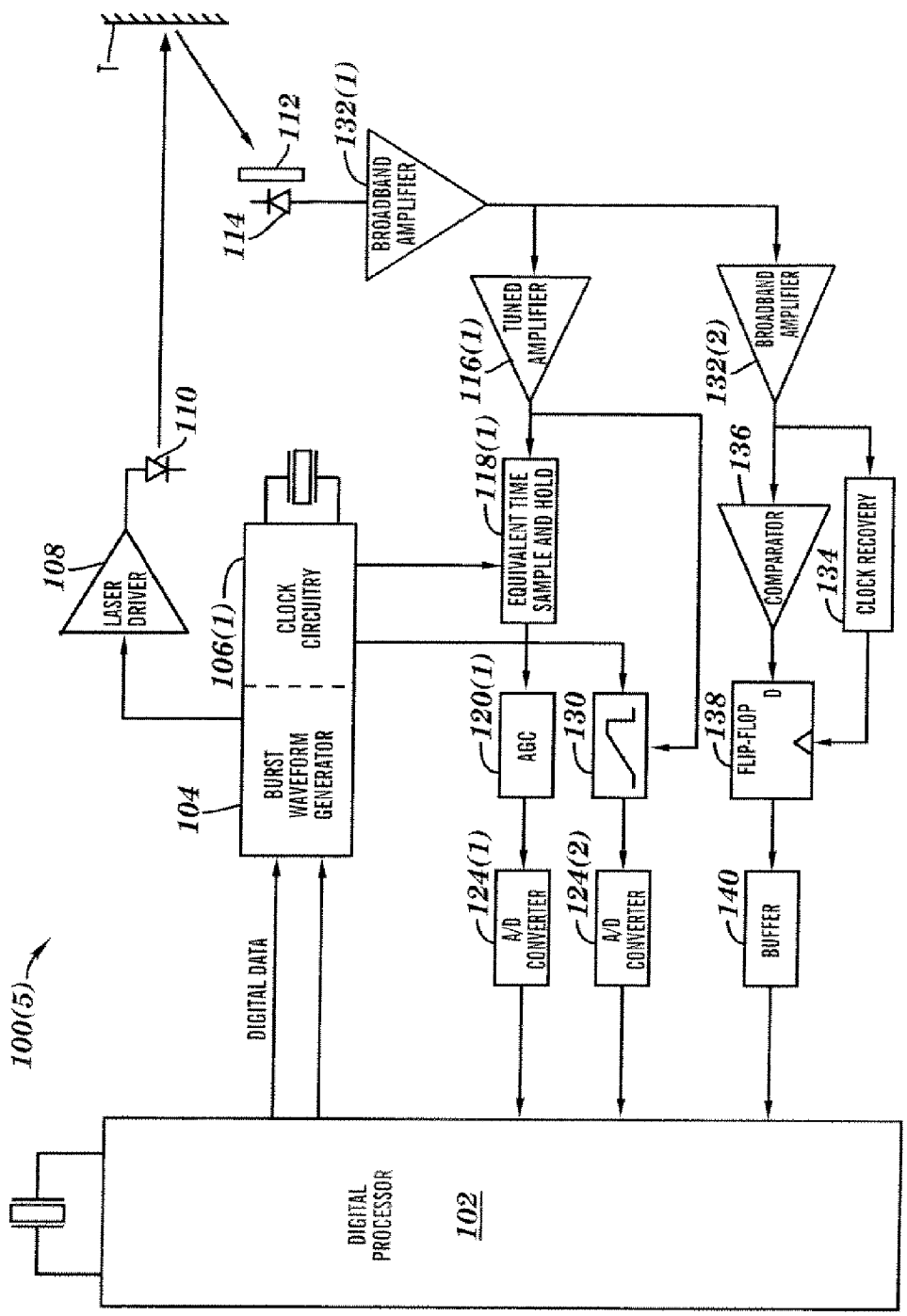
FIG. 17 is a block diagram of another measuring system in accordance with embodiments of the present invention capable of transmitting and receiving data encoded into the received binary burst emission.

Referring to FIG. 17, a measuring system 100(5) in accordance with embodiments of the present invention is illustrated. The structure and operation of the measuring system 100(5) is the same as described earlier for the measuring systems 100(1) and 100(2), except as described herein. Elements in FIG. 17 which are like elements shown and described in FIGS. 6 and 8 will have like numbers and will not be shown and described in detail again here.

Referring to FIG. 17, the measuring system 100(5) has an input of a broadband amplifier 132(1) coupled to the output of a photodiode 114. An output of the broadband amplifier 132(1) is coupled to the input to the tuned amplifier 116(1) and to an input of another broadband amplifier 132(2). The output of the broadband amplifier 132(2) is coupled to the inputs of a comparator 136 and a clock recovery circuit 134. The output of the comparator 136 is coupled to the D input of the flip-flop circuit 138 and the output of the clock recovery circuit 134 is coupled to the clock input of the flip-flop circuit 138. The output of the flip-flop circuit 138 is coupled to an input of a buffer circuit 140. An output from the buffer circuit 140 is coupled to an input to the digital processor 102. The measuring system 100(5) can transmit and receive data depicted in FIG. 16.

In FIG. 17, digital data that is to be encoded onto the burst waveform is transmitted along the additional signal line from the digital processor 102 to the burst waveform generator 104. The reflected or otherwise returned signal off of the target T is received at the photodiode 114 and is then amplified by the broadband amplifier 132(1). The broadband amplifier 132(1) preserves the fidelity of the binary signal. Next, the signal from the broadband amplifier 132(1) is split into two portions, one portion is routed to a receive section for distance measurement as described earlier and a second portion is routed to the data decoding section.

Within the data decoding section, the signal first encounters a second broadband amplifier 132(2) which amplifies the signal further. This fully amplified signal is then routed to a clock recovery circuit 134 whose output is a binary signal whose transitions are centered within the ON periods of the emissions within a burst. The fully amplified signal is also routed to a comparator 136, that has hysteresis, whose output is nominally a clean representation of the binary signal transmitted by the laser diode 110. The output of the comparator 136 is then input to a flip-flop circuit 138, whose gating is controlled by the output of the clock recovery circuit 134. The output of the flip-flop circuit 138 is a serial digital data stream ready for analysis by the digital processor 102, but is first buffered by a buffer circuit 140, which acts as a serial to parallel converter to reduce the data collection demands on the digital processor 102.

In the background of this application, it was noted that the output of a mixer contains both the phase information of the two signals being mixed together, as well as amplitude information of the signals, and that the phase and the amplitude information is confounded and difficult to separate from each other. However, the mixing operation, which has historically been referred to as coherent detection, does offer some benefits as long as the application can withstand the phase and amplitude confounding.

Figure 18A:
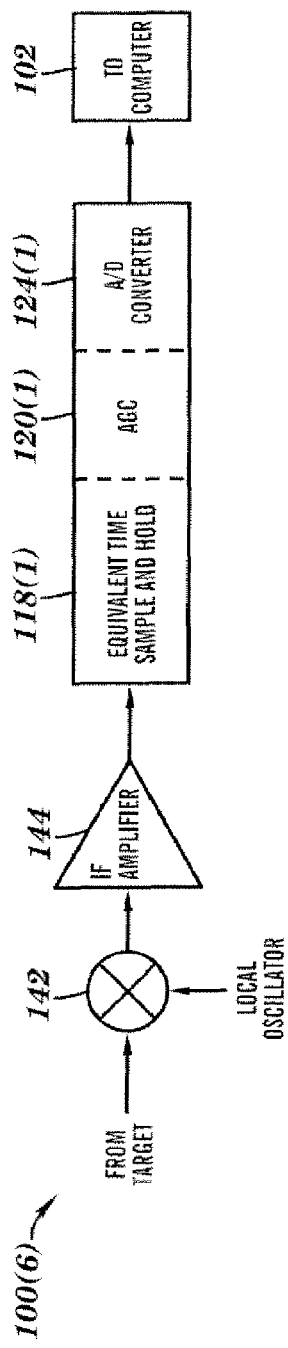
FIG. 18A is a block diagram of a receiving and processing portion of another measuring system using coherent detection in accordance with embodiments of the present invention.

Referring to FIG. 18A, the receiving portion of the measuring system 100(6) in accordance with embodiments of the present invention is illustrated. The structure and operation of the measuring system 100(6), including the transmitting portion which is not illustrated in FIG. 18A, is the same as described earlier for the measuring systems 100(1) and 100(2), except as described herein. Elements in FIG. 18A which are like elements shown and described in FIGS. 6 and 8 will have like numbers and will not be shown and described in detail again here.

Referring to FIG. 18A, the measuring system 100(6) has an input to a detector/mixer 142 is coupled to receive a reflected or returned signal from the target T and to receive an output from a local oscillator. The output of the detector/mixer 142 is coupled to an input to an intermediate frequency (IF) amplifier 144. The output of the IF amplifier is coupled to the input to the equivalent-time-sample-and-hold circuit 118(1) which is coupled to the input to the automatic-gain-control circuit 120(1) which is coupled to the input to the A/D converter circuit 124(1) which is coupled to the input to the digital processor 102.

In FIG. 18A, light having a coherent carrier, such as laser light, that is burst modulated, reflects from a target T and is incident upon a square law detector/mixer 142. Also incident upon the mixer/detector 142 is light from a local oscillator, which could be a second highly coherent laser or a portion of the light from the first laser. These optical signals interact with one another within the square law detector/mixer 142 and the electronic signal that is output from the detector/mixer 142 is proportional to:

$$S=I_T+I_{LO}+2(I_T I_{LO})^{1/2} \cos(\phi_T-\phi_{LO}) \quad (24)$$

where $I_T$ is the intensity of the light received from the target T, $I_{LO}$ is the intensity of the light from the local oscillator, $\phi_T$ is the phase of the carrier of the light received from the target T, and $\phi_{LO}$ is the phase of the light from the local oscillator. Usually, $I_T \ll I_{LO}$, and the product, $I_T I_{LO}$, within the square root is much greater than $I_T$. In effect the local oscillator amplifies the received target signal, although at the expense of confounded phase and amplitude information.

The output of the detector/mixer 142 is an electronic signal that is then amplified by an IF amplifier 144. The output of the IF amplifier 144 is then processed by the equivalent-time-sample-and-hold circuit 118(1), automatic-gain-control circuit 120(1), A/D converter circuit 124(1), and the digital processor 102 as already described herein.

Figure 18B:
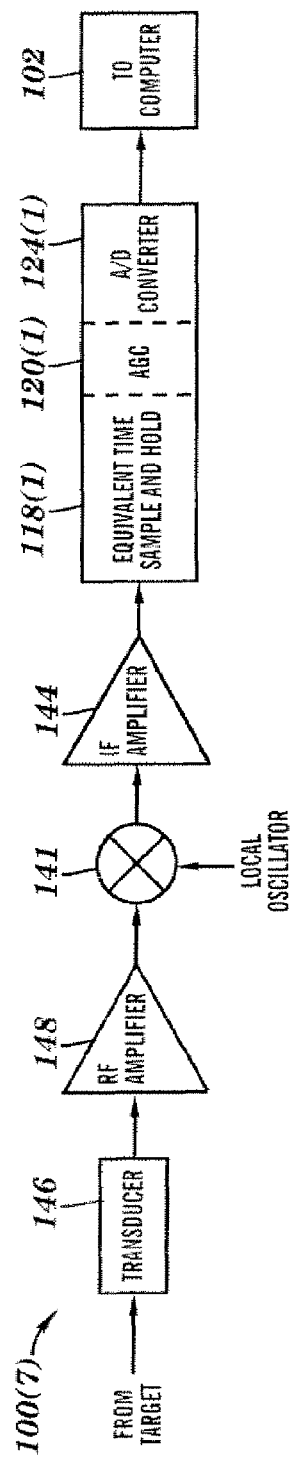
FIG. 18B is a block diagram of a receiving and processing portion of yet another measuring system using coherent detection in accordance with embodiments of the present invention.

Referring to FIG. 18B, the receiving portion of the measuring system 100(7) in accordance with embodiments of the present invention is illustrated. The structure and operation of the measuring system 100(7), including the transmitting portion which is not illustrated in FIG. 18B, is the same as described earlier for the measuring systems 100(1) and 100(2), except as described herein. Elements in FIG. 18B which are like elements shown and described in FIGS. 6 and 8 will have like numbers and will not be shown and described in detail again here.

Referring to FIG. 18B, the measuring system 100(7) has an input to a transducer 146 coupled to receive a reflected or returned signal from the target T. An output of the transducer 146 is coupled to an input to RF amplifier 148. The output of RF amplifier 148 and a local oscillator are coupled to inputs to mixer 141. The output of the mixer 141 is coupled to an input to an intermediate frequency (IF) amplifier 144. The output of the IF amplifier is coupled to the input to the equivalent-time-sample-and-hold circuit 118(1) which is coupled to the input to the automatic-gain-control circuit 120(1) which is coupled to the input to the A/D converter circuit 124(1) which is coupled to the input to the digital processor 102. The measuring system 100(7) is a coherent demodulation system of electromagnetic radiation of non-optical signals such as RF, microwave, or millimeter-wave signals.

In FIG. 18B, the transducer 146 converts electromagnetic signals reflected from the target T into an electronic signal. The electronic signal is then amplified by the RF amplifier 148 before being input to the mixer 141. The output of a local oscillator is also input to the mixer 141 and the time-varying intermodulation output of the mixer 141 is thus:

$$i_o(t) = bV_T v_{LO} \cos((\omega_T - \omega_{LO})t + \phi_T - \phi_{LO}) \quad (25)$$

where $i_o(t)$ is the current of the electronic signal leaving the mixer 141, b is a constant of proportionality, $v_T$ is the amplitude of the signal from the target T at the output of the RF amplifier, $v_{LO}$ is the amplitude of the local oscillator signal, $\omega_T$ is the angular frequency of the carrier of the signal from the target T at the output of the RF amplifier, $\omega_{LO}$ is the angular frequency of the local oscillator, $\phi_T$ is the phase of the carrier of the signal from the target T at the output of the RF amplifier, and $\phi_{LO}$ is the phase of the local oscillator signal. As with optical coherent detection, the local oscillator serves to amplify the signal received from the target T but at the expense of confounded phase and amplitude information. The output of the mixer 141 is an electronic signal that is then amplified by an IF amplifier 144. The output of the IF amplifier 144 is then processed by the equivalent-time-sample-and-hold circuit 118(1), automatic-gain-control circuit 120(1), A/D converter circuit 124(1), and the digital processor 102 as already described herein.

Although in the embodiments described above, the projected energy has been described as being electromagnetic in nature, other types of signals can be transmitted towards the target T, such as acoustic. With ultrasonic energy, the duration of the emission towards a target T can be continuous, as opposed to being in bursts, because eye safety is not a concern. Furthermore the carrier need not be modulated, but is already of a wavelength that is suitable for equivalent time sampling. An exemplary ultrasonic frequency is 40 kHz, which propagates at 345 meters/sec in air, and therefore has a wavelength of 8.625 mm. For a 10 meter target distance, the round trip travel time is 58 ms, so the maximum emission repetition frequency is about 17 Hz.

Because of the relatively short wavelength, however, the ambiguity problem is somewhat more difficult than that encountered with modulated electromagnetic carriers. One way to solve this is by emitting the ultrasonic signal envelope seen at the top of FIG. 20. In this emission the duty factor is approximately 80% to 90%, with the OFF period used for coarse round trip timing that is used to resolve the phase ambiguity. When the ultrasonic emission begins, a voltage ramp is initiated, shown at the bottom of FIG. 20. When the ultrasonic echo from the target T is first received, the voltage ramp-up is immediately terminated. The magnitude of the ramp's voltage is then proportional to the distance. Although a voltage ramp is used to obtain a coarse distance estimate in this example, other systems and methods for obtaining a coarse or rough distance measurement can be used, such as using counters or multiple ultrasonic frequencies.

Figure 19:
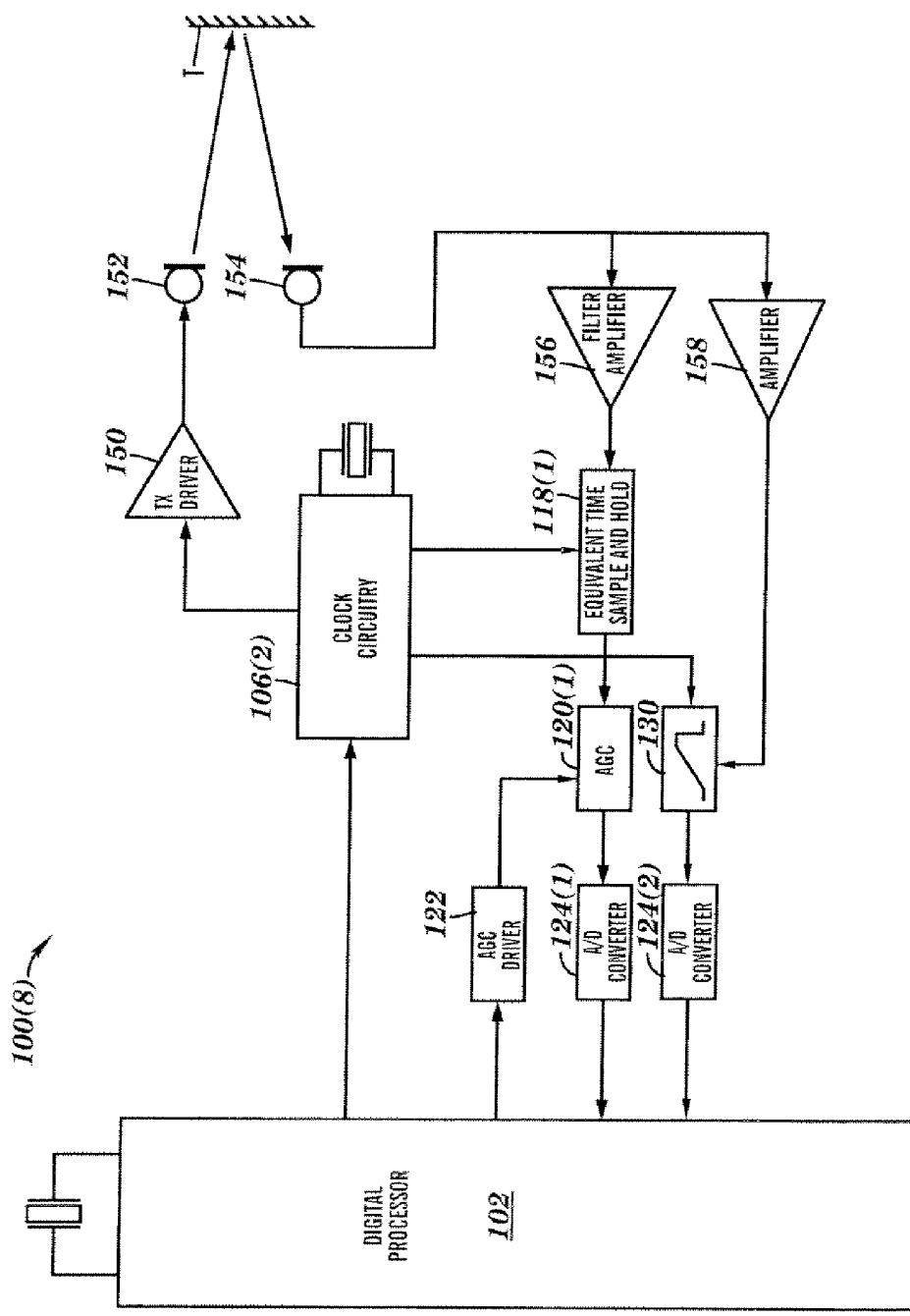
FIG. 19 is a block diagram of another measuring system utilizing ultrasonic energy in accordance with embodiments of the present invention.

Referring to FIG. 19, a measuring system 100(8) in accordance with embodiments of the present invention is illustrated. The structure and operation of the measuring system 100(8) is the same as described earlier for measuring systems 100(1) and 100(2), except as described herein. Elements in FIG. 19 which are like elements shown and described in FIGS. 6 and 8 will have like numbers and will not be shown and described in detail again here.

In FIG. 19, the measuring system 100(8) has an output of the digital processor 102 coupled to an input of clock circuitry 106(2). An output of the clock circuitry 106(2) is coupled to an input of a transmitter driver 150 whose output is coupled to an input of an transmitting transducer 152. An receiving transducer 154 is positioned to receive a reflected or otherwise returned acoustic signal from the target T. An output of the receiving transducer 154 is coupled to an input to filter amplifier 156 and to an input to amplifier 158. The output of the filter amplifier 156 is coupled to an input of the equivalent-time-sample-and-hold circuit 118(1). The output of the amplifier 158 is coupled to an input to the pulse TOF distance measuring circuit 130. The clock circuitry 106(2) also has an output coupled to an input to the pulse TOF distance measuring circuit 130.

Figure 20:
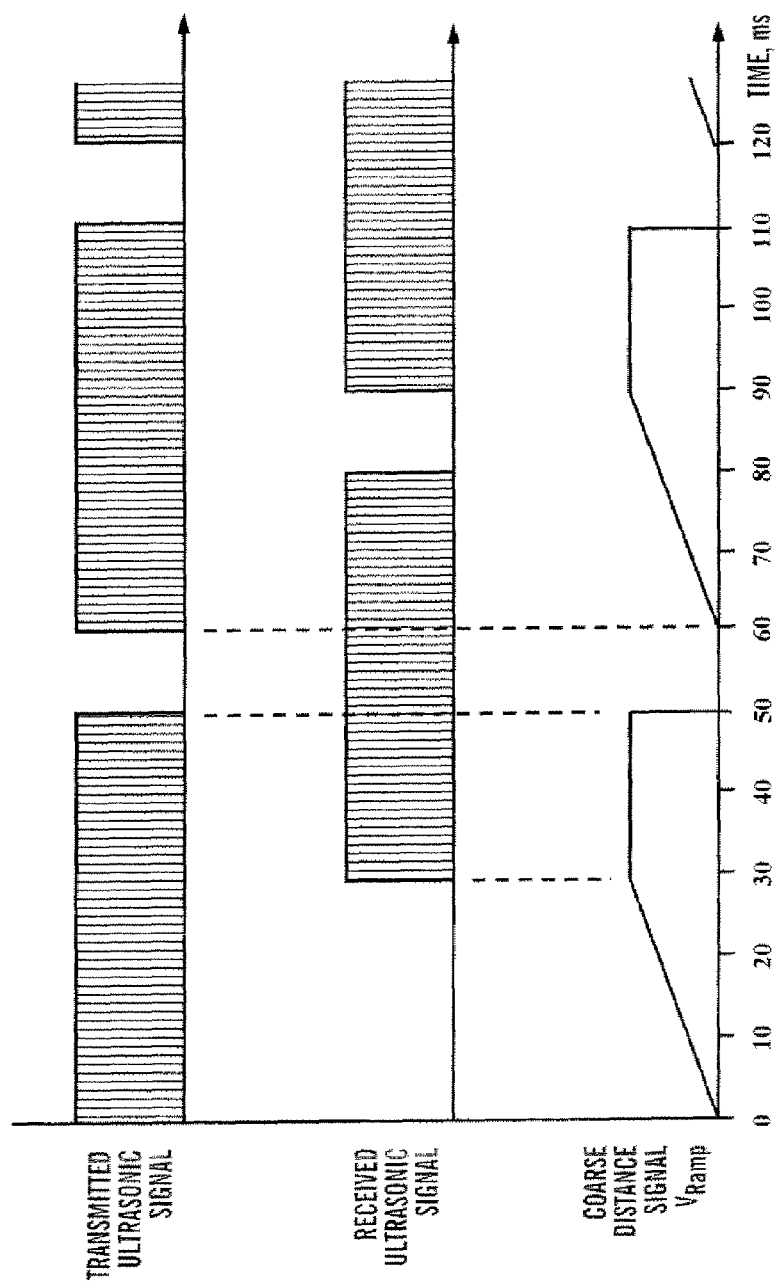
FIG. 20 is a timing diagram of the signals within an embodiment utilizing ultrasonic energy.

In FIG. 19, the transmitting and receiving transducers 152 and 154 are designed to work with acoustic energy and the transmitter driver 150 is designed to interface electronically with the transmitting transducer 152. Additionally, the clock circuitry 106(2) is modified, such that its output to the transmitter driver 150 will produce longer bursts of lower frequency. In FIG. 20 it was seen that the ON time can typically last 50 ms, with 2000 cycles of 40 kHz signal comprising the signal during the ON time.

The equivalent time sampling rate can also be slower, depending on the precision desired. Since the ultrasonic emission wavelength was said to be 8.625 mm in the above example, even a relatively poor phase estimate or one whose standard deviation is up to 1% of the wavelength, will yield accuracies better than 1 mm. On the other hand, since the duty factor is 80% or higher, there is ample opportunity for many samples to be collected over the 2000 cycles within an ON time, and for significant averaging to occur that can greatly improve the resulting distance estimate.

The physical hardware of the present invention can be small enough to fit into a hand-held package for short-range applications, into fixed position packages, or it can be mounted in a platform that has azimuthal and elevational rotational motions for scanning applications.

Figure 21:
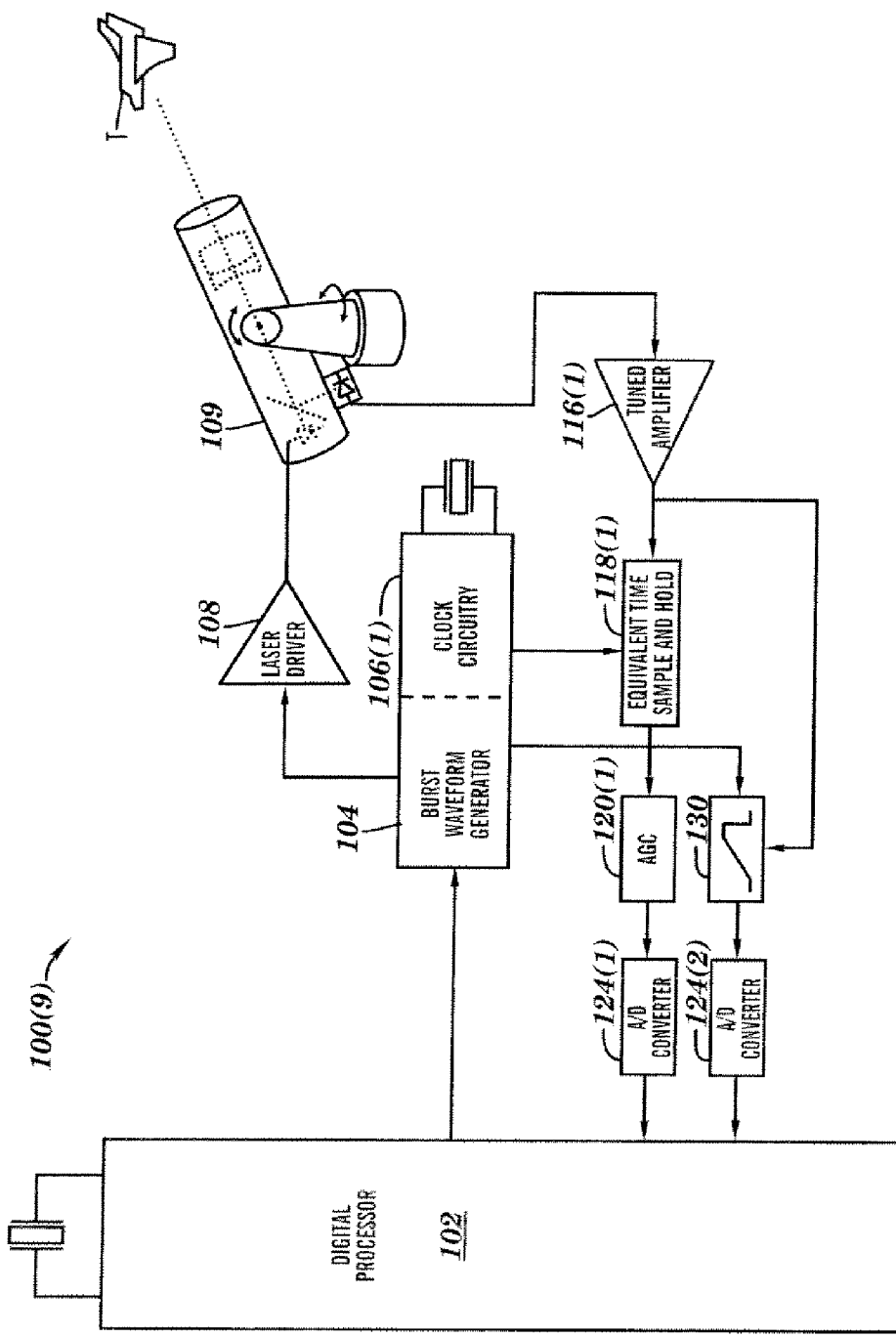
FIG. 21 is a block diagram of another measuring system where the transmitter and receiver are coaxially scanned in accordance with embodiments of the present invention.

Referring to FIG. 21, a measuring system 100(9) in accordance with embodiments of the present invention is illustrated. The structure and operation of the measuring system 100(9) is the same as described earlier for the measuring system 100(1), except as described herein. Elements in FIG. 21 which are like elements shown and described in FIG. 6 will have like numbers and will not be shown and described in detail again here. In FIG. 21, the measuring system 100(9) has a transmitting element and a receiving element which are coaxially mounted in the same platform to form a transmit/receive system 109. The transmit/receive system 109 transmits the emitted signal and also receives the reflected or otherwise returned signal form the target T.

Figure 22A:
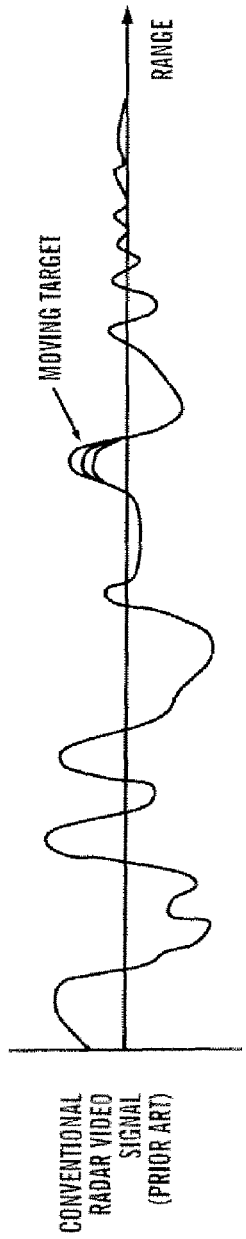
FIG. 22A is a prior art video signal of a conventional radar system.

The video signal of a conventional radar apparatus is depicted in FIG. 22A. The horizontal axis is the range axis and the vertical axis contains information about both the phase and the amplitude of the echo returned from the target T. As discussed in the background of this application, the amplitude and the phase are confounded and especially difficult to separate.

Figure 22B:
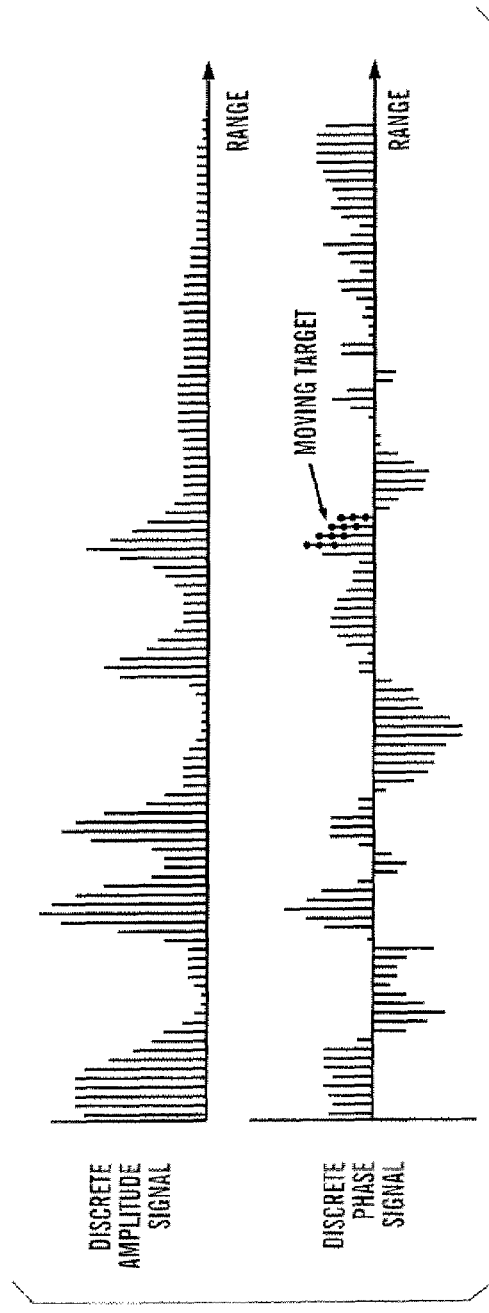
FIG. 22B is a video signal generated in accordance with embodiments of the present invention where the transmitter and receiver are scanned.

Referring to FIG. 22B, by way of example only a representation of how the video signal shown FIG. 22A would appear at the output of the digital processor 102 in measuring system 100(9) in illustrated. Because of the nature of the DFT, the phase, whose mathematical formula was discussed earlier in equations 3–10, and the amplitude, which was also presented earlier in equation 2, are both freely available for subsequent analysis or viewing. The amplitude and phase signals output by the digital processor would be discrete in nature, as represented by the vertical line segments in FIG. 22B, because they are calculated by the DFT. The discrete amplitude and phase signals output from the digital processor could be converted into analog format with digital to analog converters (not shown), before being displayed on monitoring equipment.

The amplitude signal carries information about the reflectivity of the target T, from which its size can be deduced. The amplitude signal can also be used to facilitate tracking of the target T in which the scanning mechanics are incrementally moved about the axis of the target T to localize the precise angular position of the target T by finding the angular position having the greatest amplitude. The phase signal carries the distance and velocity information of the target T as discussed before.

Figure 23:
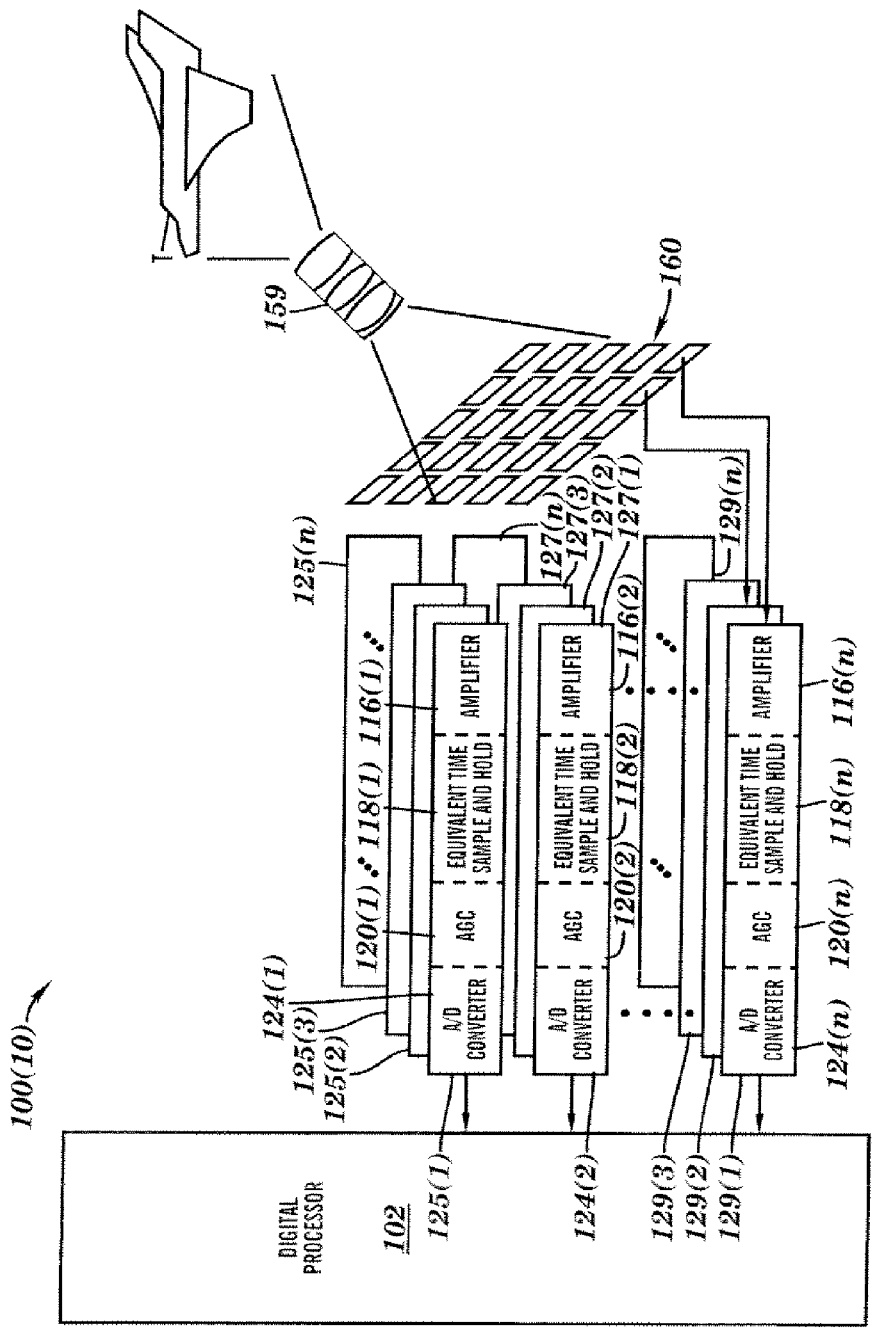
FIG. 23 is a block diagram of a receiving and processing portion of another measuring system where the return signal is imaged onto an array of detectors in accordance with embodiments of the present invention.

Referring to FIG. 23, a measuring system 100(10) in accordance with embodiments of the present invention is illustrated. The structure and operation of the measuring system 100(10), including the transmitting portion which is not illustrated in FIG. 23, is the same as described earlier for the measuring system 100(2), except as described herein. Elements in FIG. 23 which are like elements shown and described in FIG. 8 will have like numbers and will not be shown and described in detail again here.

Referring to FIG. 23, the measuring system 100(10) includes a imaging lens 159 which images the reflected or otherwise returned signal onto an array 160 of receiving transducers. Each of the transducers is coupled to one of an array of receiver processing circuits 125(1)–125(n), 127(1)–127(n), and 129(1)–129(n). Receiver processing circuits 125(1)–125(n), 127(1)–127(n), and 129(1)–129(n) each comprise one of the amplifiers 116(1)–116(n) which is coupled to one of the equivalent-time-sample-and-hold circuits 118(1)–118(n) which is coupled to one of automatic-gain-control circuits 120(1)–120(n) which is coupled to one of the A/D converters 124(1)–124(n) which is coupled to the digital processor 102. The measuring system 100(10) can create a three dimensional image of an object or scene with a high degree of fidelity or speed.

The receiving transducers of the array 160 are small, closely spaced, and located in the image plane of a lens system 159 that focuses transmitted light reflected from a target T, although other configurations can be used. In this way, each element or pixel of the receiving transducers of the array 160 would receive a signal from just one relatively small portion of the target T. When an array of pixels are used and their signals processed according to the present invention a three dimensional representation of the target T can be produced. By way of example, the array 160 can comprise an array of discrete photodiodes or it can comprise a CMOS imager. In any case, the receiving elements must be fast enough to respond to the burst waveform signals reflected by the target T. The array of processing circuits 125(1)–125(n), 127(1)–127(n), and 129(1)–129(n) can comprise the same number of parallel circuits as there are transducer pixels or there can be fewer if signal multiplexing is used, or there can be more if desired in order to speed up the sampling and data collection.

To improve the versatility, it would be expected that the imaging lens 159 and the array 160 would be mounted in a scanning mechanism so that the array 160 can be aimed at a target T in any arbitrary direction. The array of processing circuits can be located within the scanning mount (not shown) or remotely.

To further improve versatility, the transmitting device (not shown) for the measuring system 100(1) can alternately transmit red light, as in red laser light, green light, and blue light, such that a red-green-blue composite three-dimensional representation of the target T can be assembled, provided the receive light sensing array can also respond to these optical wavelengths.

Since it has been shown in previous embodiments how the distance of the target T can be measured in various situations and applications, the velocity of a target T can also be measured by the digital processor by noting the time rate of change of the distance of the target T. In other literature it is shown how a velocity of the target T can be measured by measuring its Doppler frequency shift, which it turns out is mathematically the same as measuring the time rate of change of the received phase. Consider the time varying mathematical term of the transmitted signal:

$$Tx = \cos(2\pi ft) \quad (26)$$

where f is the frequency of modulation, 20 MHz, and t is time. After this signal is reflected from a moving target T, the received signal is $$Rx = \cos[2\pi ft + 2\pi \times 2d(t)/\lambda] \quad (27)$$

where d(t) represents the changing distance of the target as a function of time, and λ is the wavelength of the 20 MHz modulation. The extra factor of 2 accounts for the round trip phase shift. If the target T is moving at v m/s, then d(t)=vt, and equation (27) can be rewritten as:

$$Rx = \cos[2\pi ft + 2\pi \times 2vt/\lambda] \quad (28)$$

The 2π×2vt/λ term of equation (28) represents a phase shift that can be readily measured with the methods of the present invention. Rearranging the terms of equation (28) we get:

$$Rx = \cos[2\pi ft + 2\pi(2v/\lambda)t] \quad (29)$$

$$Rx = \cos[2\pi ft + 2\pi(f_T)t] \quad (30)$$

This time varying phase shift is actually a frequency shift, the additional frequency being $f_T = 2v/\lambda$. This frequency shift is also well established as being the Doppler shift associated with a moving target T, with an incident signal having wavelength $\lambda$.

However, $f_T$ of equation (30) is not immediately available within the methods of the present invention, and the velocity must be computed by calculating the time rate of change of distance. Obtaining distance measurements by the means of the present invention is straightforward, and the timing information, for the time rate of change, is already present in the form of the burst repetition frequency, which is a known and constant rate.

Mathematically, in its simplest form, velocity can be expressed as $$v = (d1-d2)/(t1-t2) \quad (31)$$

where v is the computed velocity, d1 is the distance at time t1, and d2 is the distance at time t2. In a more compact format, equation (31) can be expressed as $$v = \Delta d/\Delta t \quad (32)$$

where $\Delta d = d1-d2$ and is the change in distance occurring in time $\Delta t = t1-t2$.

A single velocity estimate is likely to contain errors due to random noise, and it is highly desirable to take advantage of the averaging techniques inherent in the present invention. A more precise estimate of the velocity is thus $$v_{avg} = \sum_{j=1}^{1599} \Delta d(j)/\Delta t(j) \quad (33)$$

This assumes 1600 distance estimates per second, of which there will be 1599 $\Delta d$'s in this time period. Equation (33) will result in a much more precise velocity estimate than that of equation (32).

An alternate method for computing velocity that yields even better velocity estimates is to use linear regression. Generally, in the one second or less time period over which a velocity of the target T is computed, the velocity will not have changed much, and the relationship between distance and time will be linear. It is then a simple matter to perform a regression computation according to the linear regression formula:

$$v = \Sigma[(time_i - \text{average time})(d_i - \text{average distance})]/\Sigma (time_i - \text{average time})^2 \quad (34)$$

Figure 24:
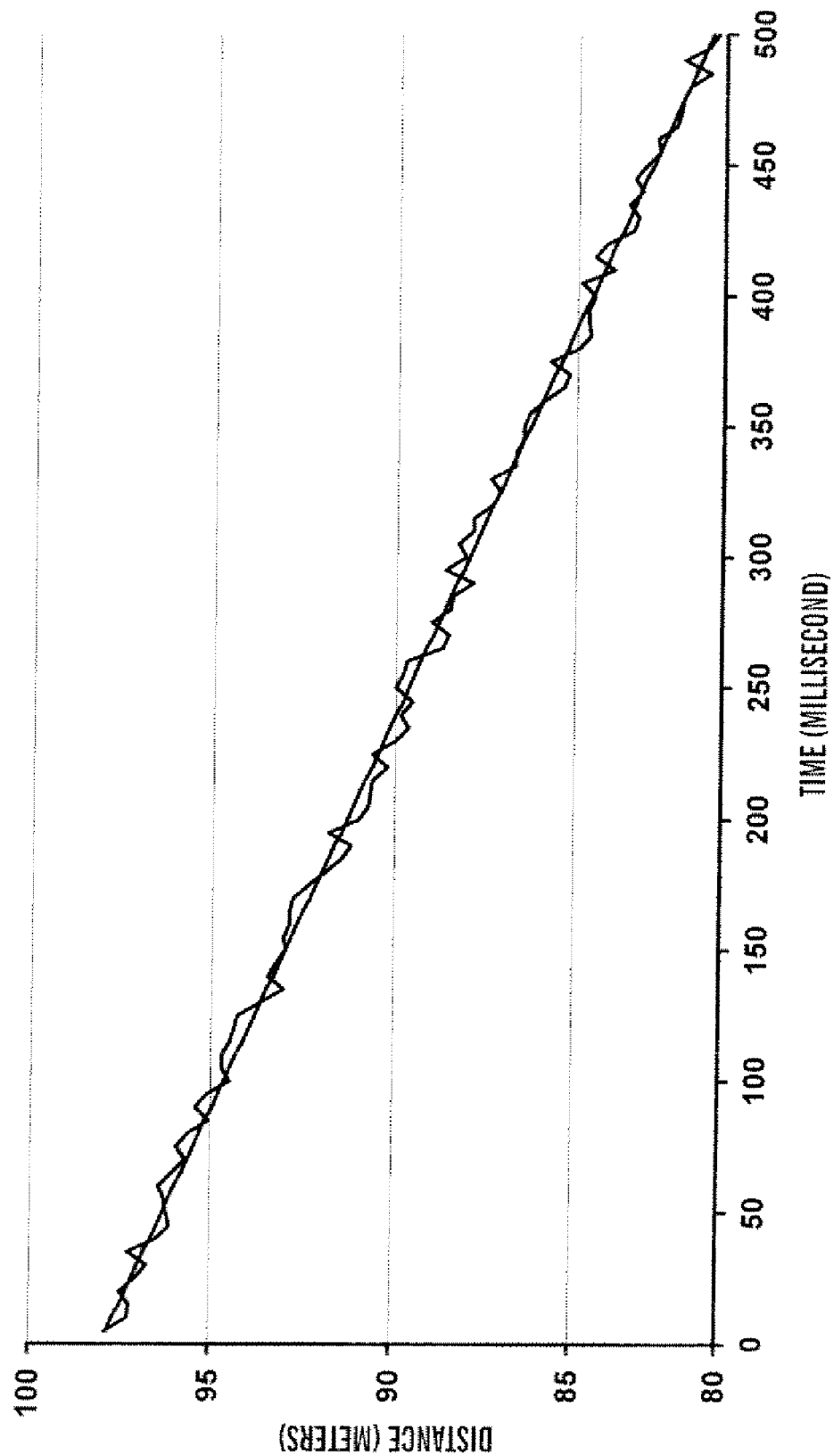
FIG. 24 is a timing graph depicting the time rate of change of a target's distance, and its best-fit line.

This equation represents the slope of the distance—time curve, an example of which is depicted in FIG. 24. Referring to FIG. 24, both the noisy raw distance measurements and the best fit line through the distance measurements obtained with linear regression are illustrated. Computer simulations show that equation (34) results in a velocity distribution whose standard deviation is four times less than those obtained with equation (33).

Additionally, further benefits in terms of flexibility and accuracy optimization could be realized by performing non-linear regression on the arguments of the arctangent function, whose output is then used as the argument to the arctangent function. This additional processing will require a higher performance digital processor, which in turn comes with a higher cost.

If the velocity of the target T is not constant over the time period of interest, then non-linear regression methods can be used to estimate the acceleration of the target T and impulse.

If only a velocity of the target T is being measured, and not the absolute distance of the target T, then the zero-distance phase offset discussed with reference to step 202 in FIG. 25 is not required. This will allow for simplification of the measuring systems and reduced costs.

There are many obvious applications of the velocity measuring method described above, but a subtle one occurs when the velocity of the target T is zero; that is, when the best fit linear regression line is horizontal, having zero slope. In handheld distance measuring systems where the operator is striving to hold the device steady with the laser spot on the target T, a velocity of zero is an automatic indicator that the operator has held the device steady, and that the distance being measured is correct and accurate. In this way the operator will not have to press an additional switch to indicate to the apparatus that it is to collect a distance measurement.

While the preceding embodiments are generally based upon a visible laser diode as the emission source, other visible sources of light can also be used, such as a light emitting diode (LED). LED's and lasers operating in the infrared and ultraviolet can also be used. Indeed, ultraviolet light sources open up the possibility for using fluorescent targets, such that the received light is of a longer wavelength than the transmitted light, thus allowing for improved filtering and reduced cross-talk between the transmitted and received signals within the device. Other laser sources can also be used, provided they can be modulated, either internally or externally, with the coherent burst waveform. Furthermore, the emission carrier need not be of optical wavelengths, but can be millimeter wave, microwave, or even radio frequency.

Another embodiment is where multiple emission sources are used, either concurrently or sequentially, for diversity. In this case, if one carrier is absorbed due to fog, for example, an alternate carrier of the appropriate wavelength may be able to penetrate the fog and allow for accurate operation.

Alternately, if a carrier wavelength is chosen such that it's frequency is on the same order as the described burst modulation frequency, then the modulation can become a binary on-off function, and the sinusoidal burst modulation is replaced by the carrier signal. Such carrier frequencies are in the RF, microwave, and millimeter-wave regime, and this method allows for potentially simpler modulation and demodulation circuitry, without losing accuracy.

An alternate way to resolve the distance ambiguity problem is for the measuring system to use two substantially different modulation frequencies, such that the lower frequency serves as a coarse distance estimator, and the higher modulation frequency is used for fine distance estimation. In order for the low frequency modulation to be used to determine which $\lambda/2$ cycle the high frequency modulation is experiencing, the coarse frequency must be low enough to not have its own ambiguity problem at the maximum target range, yet be high enough to have sufficient accuracy to determine the correct $\lambda/2$ cycle the high frequency modulation is undergoing.

Yet another processing algorithm that the digital processor 102 can use and which can significantly improve the accuracy and simultaneously resolve the ambiguity problem is the use of excess fractions. In excess fractions, two or more modulation frequencies of similar frequency are used, and the phase of each is independently estimated. But then, the phase of each is also compared to one another, and the phase relationships are determined according to the following expression:

$$\text{distance} = (n_1 + \phi_1/2\pi)\lambda_1/2 = (n_2 + \phi_2/2\pi)\lambda_2/2 = (n_3 + \phi_3/2\pi)\lambda_3/2 = \quad (35)$$

where $n_x$ is an unknown number of integral wavelengths at modulation frequency x, $\phi_x$ is the computed phase of the received signal at modulation frequency x, and $\lambda_x$ is the known wavelength of modulation frequency x. While there is always one more variable than the number of equations in the distance formula, a well-crafted processing algorithm can readily solve the $n_x$'s, and arrive at an accurate ambiguity-free distance estimate. The trade-off of this method is additional complexity in the clocking circuitry, as well in the bandpass filters in the receive circuitry.

The receive signal track and hold function can be readily implemented with the use of a low cost analog switch, and a hold capacitor. While the analog switch is ON, the voltage on the capacitor tracks the voltage output by the receive circuit's amplifiers, and when the analog switch is OFF the voltage is nominally held at a constant voltage, that voltage being the instantaneous voltage output by the receive circuit's amplifiers at the time the analog switch is switched OFF. It is desired that the switching ON-to-OFF time of the analog switch be less than 5% of the period of the burst frequency. For a 20 MHz burst frequency, the period is 50 ns, and ideally the switching speed would be under 2.5 ns.

If an additional amount of gain control is required in the receive signal path, an additional gain block can be switched in or out of the receive signal path as desired, under the control of the digital processor. A problem arises in that the signal delay of this additional gain stage must be calibrated before the measurement commences, which of course cannot be done once the distance measurement is underway and it is found that a change in gain is needed. One solution is to install a "NEAR/FAR" switch on the case that the operator places into the "NEAR" position for short distances, up to two meters for example, or "FAR" for longer distances, two meters or more. This switch must be placed into the proper position before the measurement begins, so that the appropriate gain block is switched into the receive signal path, and calibrated accordingly.

An alternate automatic-gain-control method takes advantage of the polarized nature of the light emitted by laser diodes. In this automatic-gain-control method, a liquid crystal with one down-stream polarizing filter is situated in the laser emission path. Normally, the polarization of the laser light is aligned with the polarizing filter and substantially all of the laser light passes through. When it is desirable to reduce the power transmitted to the target, the liquid crystal can be electronically energized, which will rotate the plane of polarization of the laser light, and a portion of the light will be attenuated by the polarizing filter. The amount of rotation, and hence the amount of absorption at the polarizing filter, is electronically controllable. This method can achieve emission attenuations up to a factor of 100, while not materially disturbing the phase relationships of the transmitted and received waveforms.

Yet another automatic-gain-control automatic-gain-control method is the Digital Micromirror Device (DMD) technology of Texas Instruments. A DMD is comprised of an array of micromirrors whose angular position can be switched between two possible positions. A typical array is 10 mm×10 mm in size, with each micro mirror being on the order of 10 μm×10 μm. Each micro mirror can be individually controlled. An automatic-gain-control function can be accomplished by placing the DMD in the light path such that when all of the micro mirrors are in their OFF position, all of the light reflecting from the mirrors exits the aperture. But by moving a percentage of the mirrors, a percentage of the laser beam can be redirected away from the aperture thus reducing the amount of light emitted by the device. The greater the number of micro mirrors being moved, the less intense the emitted laser beam will be. The light redirected by the moved mirrors can be directed into a beam dump to minimize stray light. Alternately, the DMD can be utilized as the optical switch (111) needed during the calibration period. In this mode the redirected light would not go into a beam dump, but onto the photodiode for detection.

Alternately, whether a DMD device is used or another beam steering or switching means is used, a second receive circuit path dedicated solely for referencing could be used. The second path would be substantially the same as the receive circuitry used for the target's received signal, as it is imperative that the signal delay time of both paths be the same. This arrangement allows for referencing flexibility, but comes with additional cost associated with the additional circuitry.

For a fixed position unit with limited geometries and optical dynamic range, multiple references can be taken apriori, in which case conventional AGC methods that occur before the equivalent time sampling functional block can be used.

It is also possible to dynamically change the peak laser power and duty factor while a distance measurement is being made. For longer range distances, the peak burst power can be increased and simultaneously the burst duty factor can be decreased to maintain eye-safe operation. Alternately, for short distances, the peak power can be reduced so the receive circuit electronics do not become saturated, and the burst duty factor can be increased to maintain spot visibility and to increase the equivalent time sample rate to either increase accuracy or decrease measurement duration. During dynamic laser power control, the signal propagation delay in the transmission circuits must remain constant so that the offset calibration remains accurate.

Yet another phase computing algorithm that can be used in place of the discrete Fourier transform by digital processor 102 is the use of non-linear regression curve fitting, such as the Gauss-Newton method, for estimating the received sinusoid's amplitude, offset, frequency, and phase. The frequency is known, thus simplifying the non-linear regression. This method requires more sample points for processing, and is significantly more computationally intensive than the DFT.

A significant advantage of both the regression-based and DFT signal processing methods is that they compute the phase, $\phi$, directly, and not the cosine of $\phi$ as in the analog phase measuring methods discussed in the prior art. Therefore, the periodic precision problems of the prior art, in which the rate of change of the cosine of the phase becomes zero at certain distances, does not exits with the DFT and regression methods.

After the distance or velocity estimate is complete, the resulting data can be displayed on an on-board display 128 and/or sent to a remote computer for storage and further processing, or stored and processed by the device itself. The measuring systems may include a display 128 and operator interface 126 even though not shown in each of the figures.

The device as currently described can be outfitted with accessories or be made part of a larger system with ease. For example, for surveying and geographic mapping applications, it can be outfitted with a compass and inclinometer for measuring direction and elevation, or a GPS receiver.

Furthermore, one or more carriers can be chosen to match or probe the absorptive characteristics of the target T, as in LIDAR systems, and the composition of the target T can be discerned at the same time as its distance and velocity.

The present invention can also be used in conjunction with other technologies. For example, depending upon the precision and accuracy required, this measuring technology can be used for coarse measurements and interferometric methods can be used for fine measurements to obtain submicron accuracy. Any one of a number of pulsed-TOF distance measurement technologies can be used as a coarse measurement, and the present invention can be used to produce a fine measurement to increase the maximum unambiguous range, or if done simultaneously can reduce the amount of time needed to obtain an accurate distance measurement.

To increase the visibility of the laser spot on the target T, it is common in laser gun sighting to flicker the laser emission at a 10 Hz rate, with a high ON duty factor. When applied to the present invention such an emission would have an ON time of, for example, 90 ms, during which time the burst modulation waveform is emitted, followed by an OFF time of 10 ms where the emissions are zero. This ON and OFF emission pattern would repeat and continue until the distance or velocity measurement is successfully taken. Other duty factors and cycle frequencies are also suitable, as long as they are discernible by the human eye.

The embodiment of the actual circuitry can vary greatly depending upon the application. For high performance systems where cost is not critical, the circuitry can be spread across two or more circuit boards to reduce cross-talk, especially between the high-level digital signals and the low-level analog signals found in the vicinity of the detector. Alternately, all of the electronics, both analog and digital, can be mounted onto a single circuit board to reduce cost. With this configuration care should be taken to isolate the low-level analog signals from any other signal, which can be accomplished, for example, by using a two-sided circuit board where the analog circuits are located on one side and the digital circuits are located on the other side.

Applications for the distance and velocity technology include robotics, tank level gauging, automated assembly lines, collision avoidance, autonomous and non-autonomous vehicular positioning for vehicles including, but not limited to, automobiles, trucks, boats, ships, planes, trains, forklifts, and spacecraft. The device can be rigidly mounted to a supporting structure for fixed position applications, or it can be attached to movable objects for semi-portable applications, or it can be completely portable and handheld. Furthermore, this technology can be used for camera auto-focusing, packaged in a small hand-held unit and used as a replacement for the tape measure in do-it-yourself and professional construction projects, projectile fusing, docking, golfing, hunting, archery, surveying equipment, military, para-military, and human-computer-interaction (HCI). In HCI, the present invention is used as a system component for determining the location of one or more people, or of the location of a part of a person, such as the eyes or fingertips, for input into a computer system for gaming programs, or other computer programs requiring precise knowledge of a person's location and/or the location of parts of that person.

Furthermore this invention can be employed in applications where the propagating media has a refractive index significantly different than that of air. For example, with proper calibration it can be used underwater, where the refractive index is 1.33, for distance and velocity measurement. Alternately, it can be used in solid materials, such as fiber optics in which it can be used to measure the distance to a break in the fiber, for example. This application is currently being used with Optical Time Domain Reflectometry (OTDR) instrumentation.

The present invention can be used in a variety of different applications. By way of example only, some of these applications which can be implemented with the measuring systems $10(1)$–$10(10)$ include methods for determining a distance to a target, determining a velocity of a target, determining a measured parameter with a required code identification, avoiding a collision, determining a location of a target, and obtaining an image of a target as described in FIGS. 26–30. These methods can be carried out with a system, such as one or more of the measuring systems $10(1)$–$10(10)$ described herein. The method for determining a distance to a target was described earlier with reference to FIG. 25 and thus will not be described here again.

Figure 26:
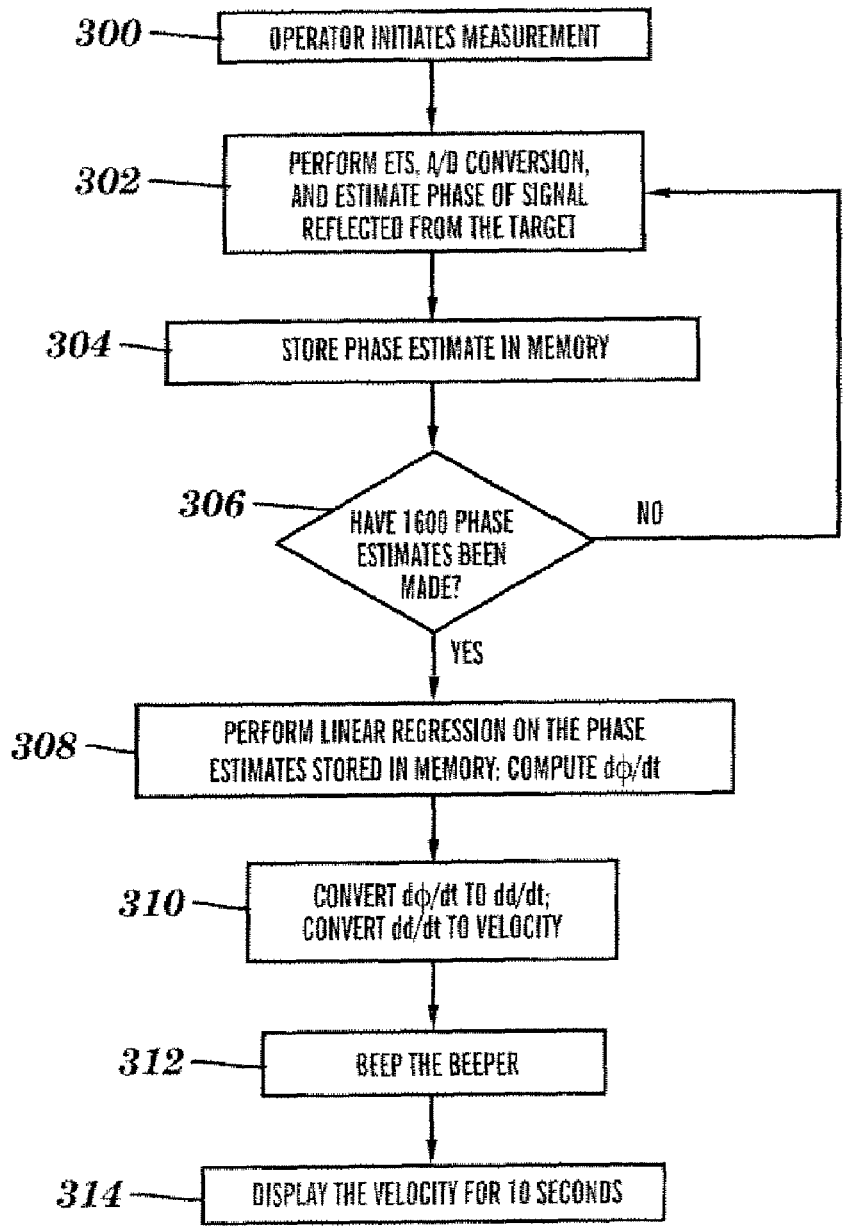
FIG. 26 is a flowchart of the operation of a method for determining a velocity of a target in accordance with embodiments of the present invention.

Referring to FIG. 26, a method for determining a velocity of a target in accordance with embodiments of the present invention is illustrated. In step 300, the operator of one of the measuring systems in accordance with the present invention initiates a measurement by transmitting a signal towards and then receiving a returned signal sent in response to the transmitted signal or a reflection or echo back of the transmitted signal back from the target T. In step 302, the received signal is equivalent time sampled by an equivalent-time-sample-and-hold circuit 118(1), converted from an analog to a digital signal by an A/D converter 124(1), and the phase of the sampled signal is estimated by the digital processor 102 as described in greater detail earlier. In step 304, the digital processor 102 stores the phase estimate in memory.

Next, in step 306 the digital processor 102 determines if a set number of phase estimates has been made. In this example, the set number is 1600, although other larger or smaller numbers, such as two phase estimates, could be used. If the set number of phase estimates have not been made, then the No branch is taken back to step 302. If the set number of phase estimates have been made, then the Yes branch is taken to step 308.

In step 308, the digital processor 102 perform linear regression on the phase estimates stored in memory, although other types of processing could be done on the phase estimates, such as a simple averaging. Next, in step 310 the digital processor 102 computes $d\phi/dt$, converts $d\phi/dt$ to $dd/dt$, and then converts $dd/dt$ to velocity. In step 312, an indication device, such as a beeper beeping or a message on display 128, could signal that a velocity measurement has been obtained. In step 314, the obtained velocity measurement is shown on display 128.

Figure 27:
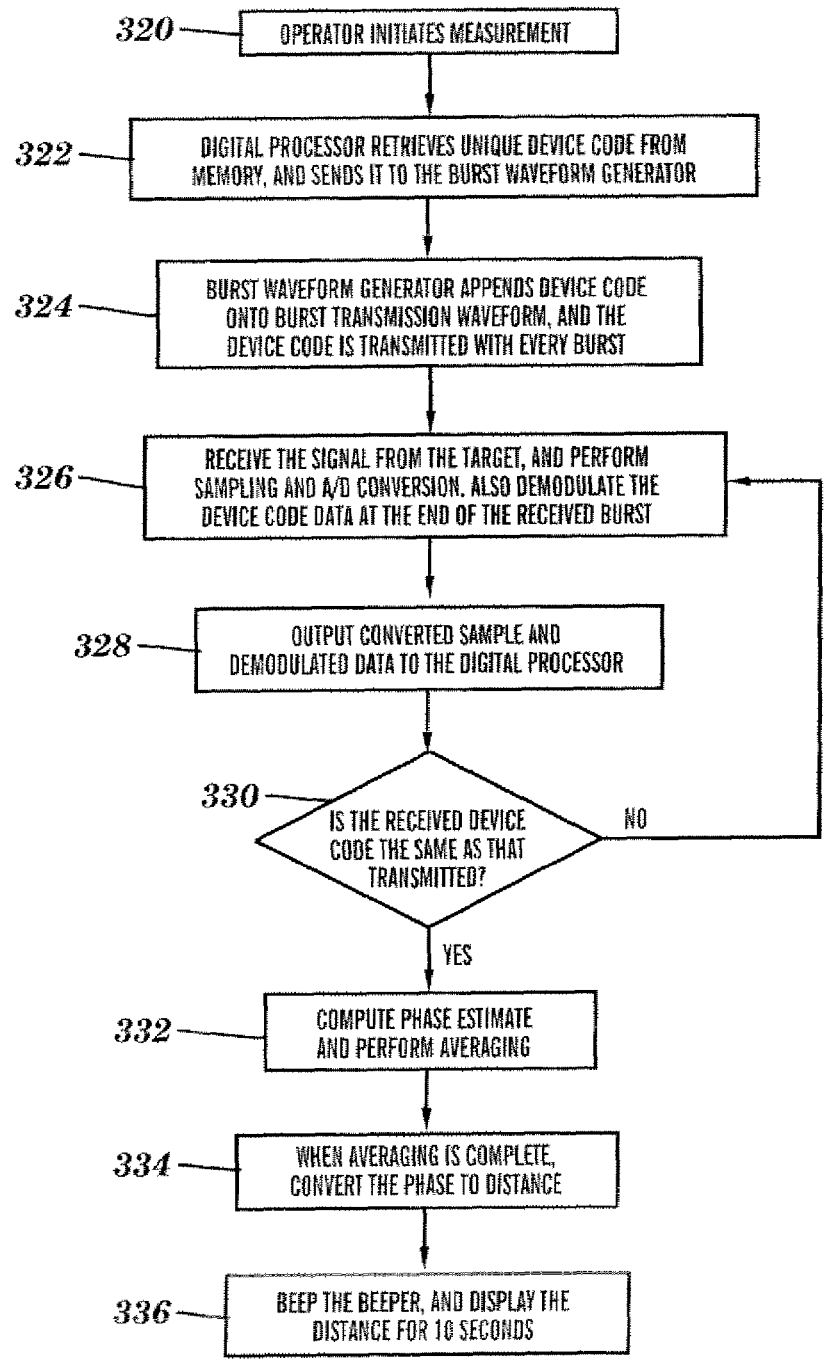
FIG. 27 is a flowchart of the operation of a method for determining a measured parameter with a required code identification in accordance with embodiments of the present invention.

Referring to FIG. 27, a method for determining a measured parameter with a required code identification in accordance with embodiments of the present invention is illustrated. In step 320, the operator of one of the measuring systems in accordance with the present invention initiates a measurement. In step 322, the digital processor 102 retrieves unique device code from memory and sends it to the burst waveform generator 104, although other types of signal generators could be used.

In step 324, the burst waveform generator 104 appends a device code or other data onto a burst transmission waveform and the device code is transmitted with every burst. In step 326, a reflection or echo of the transmitted signal back is received from the target T.

In step 326, the received signal is equivalent time sampled by an equivalent-time-sample-and-hold circuit 118(1) and converted from an analog to a digital signal by an A/D converter 124(1). Additionally, the digital processor 102 demodulates the device code at the end of the received signal. In step 328, the converted sample signal and the demodulated device code are provided to the digital processor 102.

In step 330, the digital processor 102 determines if the demodulated device code substantially matches the transmitted device code. If the demodulated device code does not substantially match the transmitted device code, then the No branch is taken back to step 326. If the demodulated device code does substantially matches the transmitted device code, then the Yes branch is taken to step 332.

In step 332, the phase of the sampled signal is estimated by the digital processor 102 as described in greater detail earlier. Additionally, averaging of multiple phase estimates can be conducted by the digital processor 102. In step 334, the digital processor 102 converts the phase estimate to distance when the averaging is completed.

In step 336, an indication device, such as a beeper beeping or a message on display 128, could signal that a verified code has been received and the distance of the target T could be shown on display 128.

Figure 28:
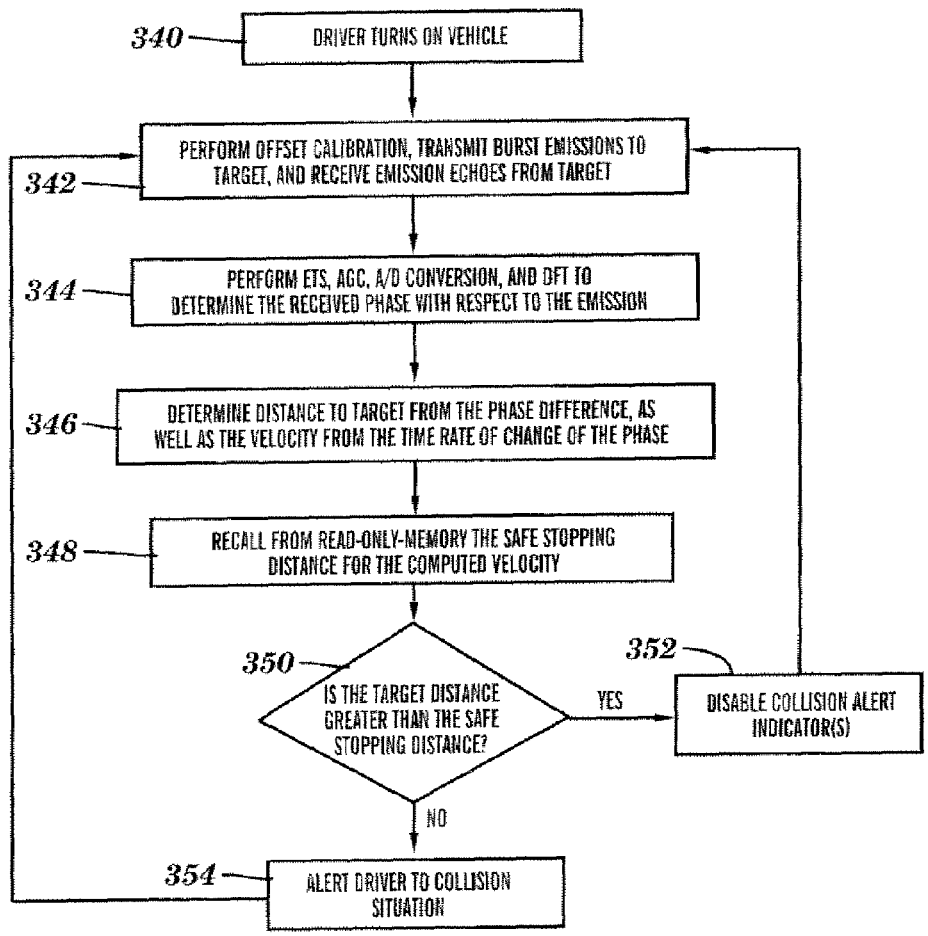
FIG. 28 is a flowchart of the operation of a method for avoiding a collision in accordance with embodiments of the present invention.

Referring to FIG. 28, a method for avoiding a collision in accordance with embodiments of the present invention is illustrated. In step 340, a driver turns on vehicle which has a measuring system for collision avoidance in accordance with embodiments of the present invention.

In step 342, the digital processor 102 performs a phase offset calibration, as described in greater detail earlier, transmits a signal towards a target, such as the bumper of another vehicle, and then receives a reflection or echo back of the transmitted signal back from the target T or a returned signal sent in response to the transmitted signal also as described in greater detail earlier.

In step 344, the received signal is equivalent time sampled by an equivalent-time-sample-and-hold circuit 118(1), an amplitude of the sample signal is increased by an automatic-gain-control circuit 120(1), the gain-adjusted, sampled signal is converted from an analog to a digital signal by an A/D converter 124(1), and the phase of the sampled signal is estimated by the digital processor 102 as described in greater detail earlier. In step 346, the digital processor 102 determines the distance to the target T and the velocity of the vehicle based on the time rate of change of the phase estimates.

In step 348, the safe stopping distance for the computed velocity is recalled from a Read-Only-Memory in the digital processor 102. In step 350, the digital processor 102 determines if the distance to the target T is greater than the safe stopping distance. If the distance to the target T is greater than the safe stopping distance, then the Yes branch is taken to step 352. In step 352, the display 128 is used to alert the driver that a collision is not imminent.

If the distance to the target T is not greater than the safe stopping distance, then the No branch is taken to step 354. In step 354, the display 128 is used to signal the driver of the vehicle of a potential collision situation and could indicate where that collision would take place.

Figure 29:
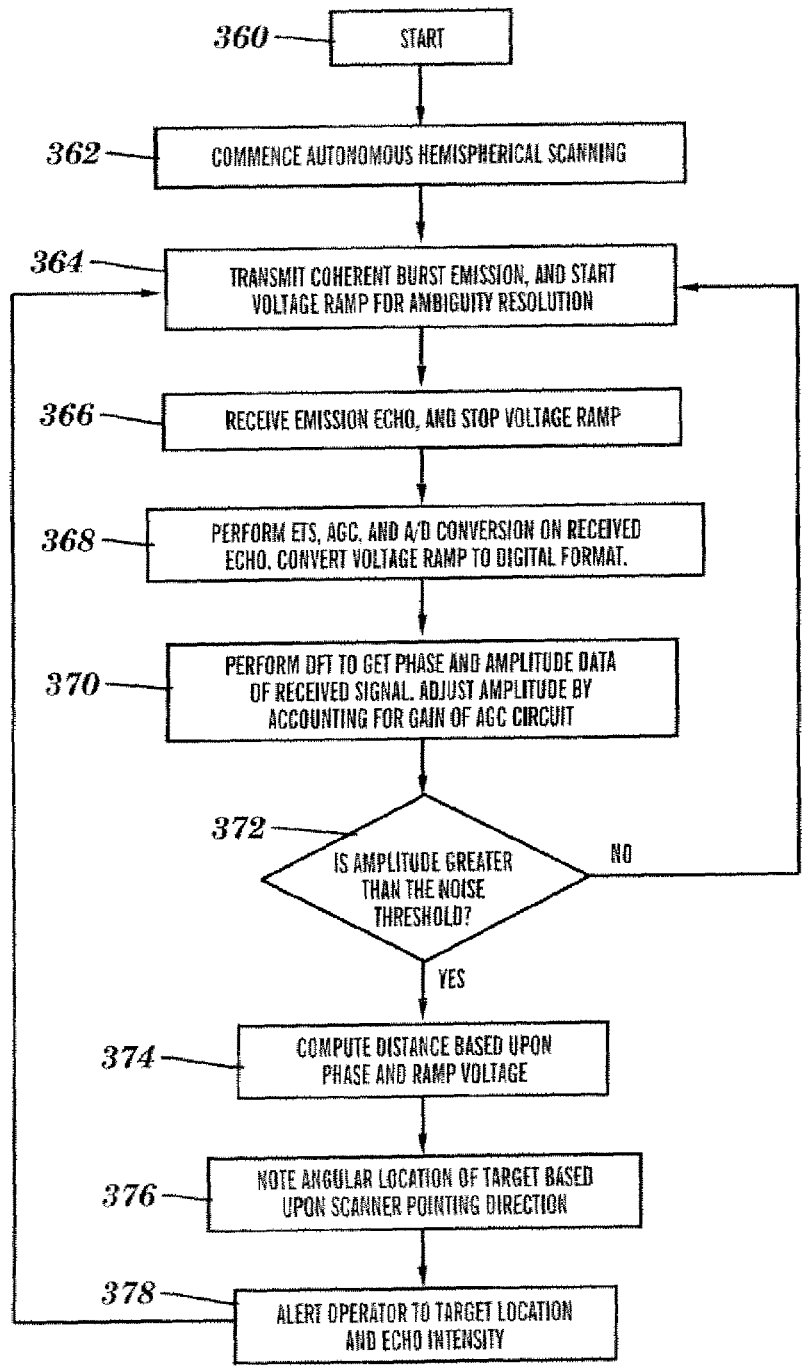
FIG. 29 is a flowchart of the operation of a method for determining a location of a target in accordance with embodiments of the present invention.

Referring to FIG. 29, a method for determining a location of a target in accordance with embodiments of the present invention is illustrated. The method starts in step 360 and in step 362 autonomous hemispherical scanning is commenced, although angular volumes greater or less than a hemisphere can also be scanned.

In step 364, coherent burst emission are transmitted towards the hemisphere and a voltage ramp for ambiguity resolution is started as described in greater detail earlier. Next, in step 366 an emission echo is received and the voltage ramp is stopped as described in greater detail earlier.

Next, in step 368 the received echo is equivalent time sampled by an equivalent-time-sample-and-hold circuit 118 (1), an amplitude of the sampled echo is increased by an automatic-gain-control circuit 120(1), the gain-adjusted, and sampled echo is converted from an analog to a digital signal by an A/D converter 124(1) as described in greater detail earlier. Additionally, the ramp voltage is converted to a digital signal for the digital processor 102.

In step 370, the digital processor 102 performs a discrete Fourier transform to get the phase and amplitude of the sampled echo, although other techniques of obtaining the phase and amplitude, such as using linear regression, could be used. The digital processor 102 also adjusts the obtained amplitude by accounting for the gain of the automatic-gain-control circuit 120(1).

In step 372, the digital processor 102 determines if the obtained amplitude is greater than a noise threshold which is stored in memory in digital processor 102, although the threshold could be obtained in other manners, such as input by an operator using the operator interface 126. If the if the obtained amplitude is not greater than a noise threshold, then the No branch is taken back to step 364. If the obtained amplitude is greater than a noise threshold, then the Yes branch is taken to step 374.

In step 374, the digital processor 374 compute distance based upon the obtained phase and ramp voltage and in step 376 the digital processor notes the angular location of the target based upon the direction the system was pointing into the hemisphere. In step 378, the operator is alerted to the target location and echo intensity on a display 128, although other manners of providing this information could be used.

Figure 30:
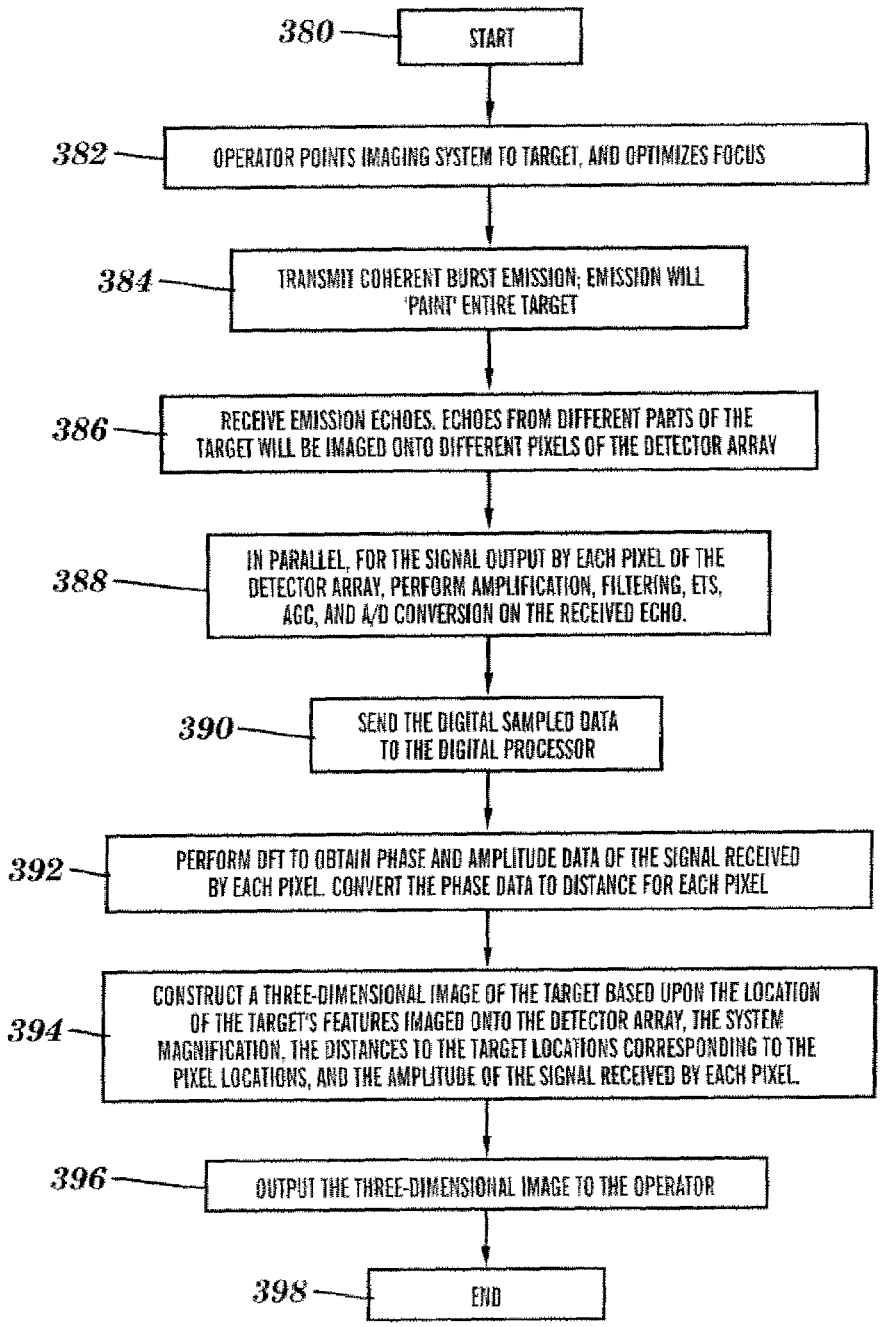
FIG. 30 is a flowchart of the operation of a method for obtaining a 3D image of a target in accordance with embodiments of the present invention.

Referring to FIG. 30, a method for obtaining an image of a target, in accordance with embodiments of the present invention is illustrated. In step 380, the method starts and in step 382 an operator points the system towards a target T and optimizes focus.

In step 384, coherent burst emissions are transmitted to substantially cover or 'paint' the entire target T. In step 386, emission echoes from different parts of the target T will be imaged onto different pixels of a detector array.

In step 388, in parallel the signal output by each pixel of the detector array, is amplified and filtered, is equivalent-time-sample-and held, has a gain applied, and is converted from an analog to a digital signal as described in greater detail earlier. In step 390, the digital data from the array of signal processors is sent to the digital processor 102. In step 392, the digital processor 102 performs a discrete Fourier transform on the digital signal received from each pixel and converts the phase data to distance for each of the pixels, although other techniques on the data could be used, such as the use of linear regression.

In step 394, the digital processor 102 generates a three-dimensional image of the target T based upon the location of the features of the target imaged onto the detector array, the magnification, the distances to the target locations corresponding to the pixel locations, and the amplitude of the signal received by each pixel, although other types of images, such as two dimensional images could be generated.

In step 396, the three dimensional image is shown on the display 128, although the image could be shown or stored in other manners.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for measuring a parameter of a target, the method comprising:
    transmitting at least one signal towards a target;
    receiving at least one of a return signal sent in response to a detection of the transmitted signal at the target and at least a portion of the transmitted signal back from the target;
    equivalent time sampling at two or more times of at least one portion of the received signal to obtain a sampled signal, wherein a time period between the times for sampling is greater than a period of the at least one transmitted signal;
    determining a measured parameter based on at least one of an amplitude of the sampled signal and a phase of the sampled signal.

2. The method as set forth in claim 1 wherein the measured parameter is a distance to the target.

3. The method as set forth in claim 1 further comprising generating a signal for the transmitting.

4. The method as set forth in claim 3 further comprising filtering the generated signal, wherein the filtering generates a sinusoidal signal for the transmitting.

5. The method as set forth in claim 3 wherein generating a signal further comprises encoding data on the signal for transmitting.

6. The method as set forth in claim 1 wherein the transmitted signal is a coherent burst modulation waveform.

7. The method as set forth in claim 6 wherein the coherent burst modulation waveform has a power of less than about 5 mW.

8. The method as set forth in claim 7 wherein the coherent burst modulation waveform has an average power of less than about 1 mW.

9. The method as set forth in claim 1 further comprising amplifying and filtering the received portion of the transmitted signal back from the target.

10. The method as set forth in claim 1 wherein the sampling further comprises sampling multiple portions of the received signal and the determining further comprises determining the measured parameter based on an average of the phase differences between the transmitted signal and the sampled portions of the received signal.

11. The method as set forth in claim 10 wherein the sampled multiple portions of the received signal comprise at least twenty samples.

12. The method as set forth in claim 10 wherein the sampling multiple portions of the received signal is conducted in parallel and further comprising adjusting an amplitude of the multiple sampled portions of the received signal in parallel and convening the multiple, gain adjusted, sampled portions of the received signal to digital signals in parallel, wherein the determining a measured parameter is based on an average of the phase differences between the transmitted signal and the multiple sampled portions of the digital signals.

13. The method as set forth in claim 1 further comprising determining a phase offset from a baseline, wherein the measured parameter is based on the phase offset and the phase difference.

14. The method as set forth in claim 1 further comprising using a look-up table to correct for one or more errors in the measured parameter.

15. The method as set forth in claim 1 further comprising determining a refractive index of a medium in which the transmitted signal propagates, wherein the measured parameter is based on the refractive index of the medium and the phase difference.

16. The method as set forth in claim 15 wherein determining the refractive index further comprises obtaining a temperature reading and a pressure reading of the medium, wherein the refractive index is based on the temperature reading and the pressure reading.

17. The method as set forth in claim 1 wherein the transmitting further comprises adding a code on to the transmitted signal and further comprising preventing the determining a measured parameter until the received code on the received signal substantially matches the added code.

18. The method as set forth in claim 1 wherein the measured parameter is a distance to the target, the method further comprising:
    comparing the measured distance against a threshold distance; and
    providing a collision alert when the comparing indicates the measured distance is less than the threshold distance.

19. A system for measuring a parameter of a target, the system comprising:
    a transmission system which transmits at least one signal towards a target;
    a receiving system that receives at least one of a return signal sent in response to a detection of the transmitted signal at the target and at least a portion of the transmitted signal back from the target;
    an equivalent time sampling system that at two or more times samples at least one portion of the received signal to obtain a sampled signal, wherein a time period between the times for sampling is greater than a period of the at least one transmitted signal; and
    a parameter processing system that determines a measured parameter based on at least one of an amplitude of the sampled signal and a phase of the sampled signal.

20. The system as set forth in claim 19 wherein the measured parameter is a distance to the target.

21. The system as set forth in claim 19 further comprising a signal generator that generates a signal for the transmission system.

22. The system as set forth in claim 21 further comprising a filter that filters the generated signal and generates a sinusoidal signal for the transmission system.

23. The system as set forth in claim 21 wherein the signal generator further comprises a data encoder that encodes data on the signal for transmitting.

24. The system as set forth in claim 19 wherein the transmission system transmits a coherent burst modulation waveform as the transmitted signal.

25. The system as set forth in claim 19 wherein the coherent burst modulation waveform has a power of less than about 5 mW.

26. The system as set forth in claim 25 wherein the coherent burst modulation waveform has an average power of less than about 1 mW.

27. The system as set forth in claim 19 further comprising an amplifier that amplifies and filters the received portion of the transmitted signal back from the target.

28. The system as set forth in claim 19 wherein the sampling system samples multiple portions of the received signal and the parameter processing system determines the measured parameter based on an average of the phase differences between the transmitted signal and the sampled signals.

29. The system as set forth in claim 28 wherein the sampled multiple portions of the received signal comprise at least twenty samples.

30. The system as set forth in claim 28 wherein the sampling system samples the multiple portions of the received signal in parallel and further comprising a plurality of gain control systems that adjust an amplitude of each of the multiple sampled portions of the received signal in parallel and a plurality of analog-to-digital converters that convert the multiple sampled portions of the received signal to digital, wherein the parameter processing system determines the measured parameter based on an average of the phase differences between the transmitted signal and the multiple digital, gain adjusted, sampled portions of the received signal.

31. The system as set forth in claim 19 further comprising a calibration system that determines a phase offset from a baseline, wherein the parameter processing system determines the measured parameter is based on the phase offset and the phase difference.

32. The system as set forth in claim 19 wherein the parameter processing system further comprises a stored look-up table used to correct for one or more errors in the measured parameter.

33. The system as set forth in claim 19 further comprising a sensing system used in determining a refractive index of a medium in which the transmitted signal propagates, wherein the parameter processing system determines the measured parameter based on the refractive index of the medium and the phase difference.

34. The system as set forth in claim 33 wherein sensing system comprises:
at least one temperature sensor that obtains at least one temperature reading; and
at least one pressure sensor that obtains at least one pressure reading of the medium;
wherein the parameter processing system determines the refractive index based on the temperature reading and the pressure reading.

35. The system as set forth in claim 19 wherein the transmission system adds a code on to the transmitted signal and wherein the parameter processing system prevents the determination of the measured parameter until the received code on the received signal substantially matches the added code.

36. The system as set forth in claim 19 wherein the measured parameter is a distance to the target, the parameter processing system compares the measured distance against a threshold distance and provides a collision alert when the comparison indicates the measured distance is less than the threshold distance.

37. The method as set forth in claim 1 wherein the measured parameter is a distance to the target and the determining further comprises determining the distance based on the phase difference between the transmitted signal and the sampled signal.

38. The method as set forth in claim 1 wherein the measured parameter is a velocity of the target and the determining further comprises determining the velocity based on the phase difference between at least two of the sampled signals.

39. The system as set forth in claim 19 wherein the measured parameter is a distance to the target and the parameter processing system determines the distance based on the phase difference between the transmitted signal and the sampled signal.

40. A method for measuring the distance of a target, the method comprising:
transmitting at least one coherent burst signal towards a target;
receiving a portion of the transmitted signal back from the target;
equivalent time sampling at two or more times at least one portion of the received signal to obtain a sampled signal, wherein a time period between the times for sampling is greater than a period of the at least one coherent burst signal; and
determining the distance based on the sampled signal and a phase difference between the transmitted signal and the sampled signal.

41. The method as set forth in claim 40 further comprising generating a signal for the transmitting.

42. The method as set forth in claim 40 further comprising amplifying and filtering the received portion of the transmitted signal back from the target.

43. The method as set forth in claim 40 wherein the sampling further comprises sampling multiple portions of the received signal and the determining further comprises determining the distance based on an average of the phase differences between the transmitted signal and the sampled portions of the received signal.

44. The method as set forth in claim 40 further comprising using a discrete Fourier transform to determine the phase difference between the transmitted and received signal.

45. A system for measuring the distance of a target, the system comprising:
a transmission system which transmits at least one coherent burst signal towards a target;
a receiving system that receives a portion of the transmitted signal back from the target;
an equivalent time sampling system that samples at two or more times at least one portion of the received signal to obtain a sampled signal, wherein a time period between the times for sampling is greater than a period of the at least one coherent burst signal; and
a distance processing system that determines the distance based on the sampled signal and a phase difference between the transmitted signal and the sampled signal.

46. The system as set forth in claim 45 further comprising a signal generation system that generates a signal for the transmission system.

47. The system as set forth in claim 45 further comprising an amplification and filtering system that amplifies and filters the received portion of the transmitted signal back from the target.

48. The system as set forth in claim 45 wherein the sampling system samples multiple portions of the received signal and the distance processing system determines the distance based on an average of the phase differences between the transmitted signal and the sampled portions of the received signal.

49. The system as set forth in claim 45 wherein the distance processing system uses a discrete Fourier transform to determine the phase difference between the transmitted and received signal.

50. The method as set forth in claim 43 wherein the sampling multiple portions of the received signal is conducted in parallel and further comprising adjusting an amplitude of the multiple sampled portions of the received signal in parallel and converting the multiple, gain adjusted, sampled portions of the received signal to digital signals in parallel, wherein the determining a measured parameter is based on an average of the phase differences between the transmitted signal and the multiple sampled portions of the digital signals.

51. The system as set forth in claim 48 wherein the sampling system samples the multiple portions of the received signal in parallel and further comprising a plurality of gain control systems that adjust an amplitude of each of the multiple sampled portions of the received signal in parallel and a plurality of analog-to-digital converters that convert the multiple sampled portions of the received signal to digital, wherein the parameter processing system determines the measured parameter based on an average of the phase differences between the transmitted signal and the multiple digital, gain adjusted, sampled portions of the received signal.

* * * * *